United States Patent
Jones et al.

(10) Patent No.: US 12,410,765 B2
(45) Date of Patent: Sep. 9, 2025

(54) CATALYTIC DECOMPOSITION REACTORS

(71) Applicant: Firehawk Aerospace, Inc., Carrollton, TX (US)

(72) Inventors: Ronald D. Jones, Melbourne, FL (US); Michael Joseph Baier, Garland, TX (US); Justin Otto Karl, Titusville, FL (US)

(73) Assignee: Firehawk Aerospace, Inc., Addison, TX (US)

( * ) Notice: Subject to any disclaimer, the term of this patent is extended or adjusted under 35 U.S.C. 154(b) by 0 days.

(21) Appl. No.: 18/085,925

(22) Filed: Dec. 21, 2022

(65) Prior Publication Data

US 2023/0193857 A1     Jun. 22, 2023

Related U.S. Application Data

(60) Provisional application No. 63/292,215, filed on Dec. 21, 2021.

(51) Int. Cl.
| | |
|---|---|
| *F02K 9/50* | (2006.01) |
| *B01J 8/00* | (2006.01) |
| *B01J 8/02* | (2006.01) |
| *B01J 37/02* | (2006.01) |
| *B22F 10/28* | (2021.01) |

(Continued)

(52) U.S. Cl.
CPC ............ *F02K 9/50* (2013.01); *B01J 8/008* (2013.01); *B01J 8/02* (2013.01); *B01J 37/0215* (2013.01); *B22F 10/28* (2021.01); *B33Y 10/00* (2014.12); *C01B 13/0203* (2013.01); *C01B 21/02* (2013.01); *F02K 9/425* (2013.01); *F02K 9/68* (2013.01); *F23C 10/01* (2013.01); *F23C 13/00* (2013.01); *F23C 13/02* (2013.01); *F23C 13/04* (2013.01); *F23C 13/06* (2013.01);

(Continued)

(58) Field of Classification Search
CPC ...... F02K 9/44; F02K 9/50; F02K 9/68; F02K 9/72; F23C 13/00; F23C 13/02; F23C 13/04; F23C 13/06; F23C 13/08; F23C 10/01; B01J 8/008; B01J 8/02; B01J 37/0215; B01J 2208/00884; B01J 2208/00938; B22F 10/28; B22F 2301/00; B33Y 10/00; C01B 13/0203; C01B 21/02
See application file for complete search history.

(56) References Cited

U.S. PATENT DOCUMENTS 3,695,041 A * 10/1972 Eggers ............... C06B 47/08
                                                                60/264
4,385,489 A *  5/1983 Abbott ............... F02K 9/50
                                                                60/776

(Continued)

OTHER PUBLICATIONS

Price, T. W., The Status of Monopropellant Hydrazine Technology, Feb. 15, 1968, NASA, Technical Report 32-7227 (Year: 1968).*

(Continued)

*Primary Examiner* — Kyle Robert Thomas
(74) *Attorney, Agent, or Firm* — Fish & Richardson P.C.

(57) ABSTRACT

A catalyst bed includes a structure defining a plurality of channels configured to receive flow of fluid to be chemically catalyzed. The plurality of channels are oriented at least partially non-parallel to an overall flow direction of the flow from inputs of the plurality of channels to outputs of the plurality of channels. A catalyst is exposed at an exterior of the structure.

56 Claims, 31 Drawing Sheets

(51) Int. Cl.

| | |
|---|---|
| *B33Y 10/00* | (2015.01) |
| *C01B 13/02* | (2006.01) |
| *C01B 21/02* | (2006.01) |
| *F02K 9/42* | (2006.01) |
| *F02K 9/68* | (2006.01) |
| *F23C 10/01* | (2006.01) |
| *F23C 13/00* | (2006.01) |
| *F23C 13/02* | (2006.01) |
| *F23C 13/04* | (2006.01) |
| *F23C 13/06* | (2006.01) |
| *F23C 13/08* | (2006.01) |

(52) U.S. Cl.
CPC ..... *F23C 13/08* (2013.01); *B01J 2208/00884* (2013.01); *B01J 2208/00938* (2013.01); *B22F 2301/00* (2013.01)

(56) References Cited

U.S. PATENT DOCUMENTS

| | | | | |
|---|---|---|---|---|
| 6,302,683 | B1* | 10/2001 | Vestin | F23C 13/02 |
| | | | | 431/170 |
| 9,453,479 | B1 | 9/2016 | Jones | |
| 9,567,875 | B2* | 2/2017 | Chaen | F01K 7/16 |
| 10,286,599 | B2 | 5/2019 | Jones | |
| 10,309,346 | B2 | 6/2019 | Jones | |
| 2005/0181939 | A1 | 8/2005 | Xu et al. | |
| 2009/0007541 | A1* | 1/2009 | Kawaguchi | F02K 9/425 |
| | | | | 60/220 |
| 2009/0120060 | A1 | 5/2009 | Coste | |
| 2009/0215911 | A1 | 8/2009 | Wang et al. | |
| 2013/0230721 | A1 | 9/2013 | Coupland | |
| 2017/0120335 | A1 | 5/2017 | DeMuth et al. | |
| 2017/0175609 | A1* | 6/2017 | Masoudi | C04B 38/0006 |
| 2018/0036945 | A1 | 2/2018 | Lereboullet et al. | |
| 2018/0169937 | A1 | 6/2018 | Jones | |
| 2018/0171933 | A1* | 6/2018 | Besnard | B64G 1/401 |
| 2020/0240365 | A1* | 7/2020 | Elzein | F02K 9/972 |

OTHER PUBLICATIONS

Gibbon et al., "Energetic Green Propulsion for Small Spacecraft," Presented at the 37th AIAA/ASME/SAE/ASEE Joint Propulsion Conference, Salt Lake City, UT, Jul. 8-11, 2011, 9 pages.

Hendley et al., "Catalytic Decomposition of Nitrous Oxide for Use in Hybrid Rocket Motors," JPP, May 2021, 37(3): 1-5.

Invitation to Pay Additional Fees and, Where Applicable, Protest Fees in International Application No. PCT/US2022/53643, mailed on Mar. 14, 2023, 3 pages.

Lohner et al., "Nitrous Oxide Monopropellant Gas Generator Development," Stanford University, 2008, 13 pages.

Wilson et al., "Catalytic Decomposition of Nitrous Oxide Monopropellant for Hybrid Motor Re-Ignition," Presented at the 48th AIAA/ASME/SAE/ASEE Joint Propulsion Conference and Exhibit, Jul. 30-Aug. 1, 2012, Atlanta, GA, 14 pages.

Wilson, "Catalytic Decomposition of Nitrous Oxide Monopropellant for Hybrid Motor Ignition," Thesis, Utah State University, 2013, 131 pages.

Zakirov et al., "An Update on Surrey Nitrous Oxide Catalytic Decomposition Research," Proceedings of the 15th AIAA/USU Conference on Small Satellites, Orbital Maneuvering, SSC01-XI-2, 2001, 9 pages.

Zakirov et al., "N2O Propulsion Research at Tsinghua: 2003," Presented at the 2nd Int. Conference on Green Propellants for Space Propulsion, Cagliari, Sardinia, Italy, Jun. 7-8, 2004, 6 pages.

Zakirov et al., "Restartable Hybrid Rocket Motor Using Nitrous Oxide," Proceedings of the 57th International Astronautical Congress, Oct. 2-6, 2006, Valencia, Spain, 6 pages.

Zakirov et al., "Surrey Research on Nitrous Oxide Catalytic Decomposition for Space Applications," Proceedings of the 14th AIAA/USU Conference on Small Satellites, Advanced Subsystems and Components II, SSC00-XI-6, Jan. 2000, 9 pages.

Zakirov, "Investigation into Nitrous Oxide Propulsion Option for Small Satellite Applications," Dissertation, University of Surrey, Aug. 2001, 312 pages.

International Search Report and Written Opinion in International Appln. No. PCT/US022/053643, mailed on May 15, 2023, 24 pages.

International Preliminary Report on Patentability in International Application No. PCT/US0222/053643, mailed on Jul. 4, 2024, 15 pages.

* cited by examiner

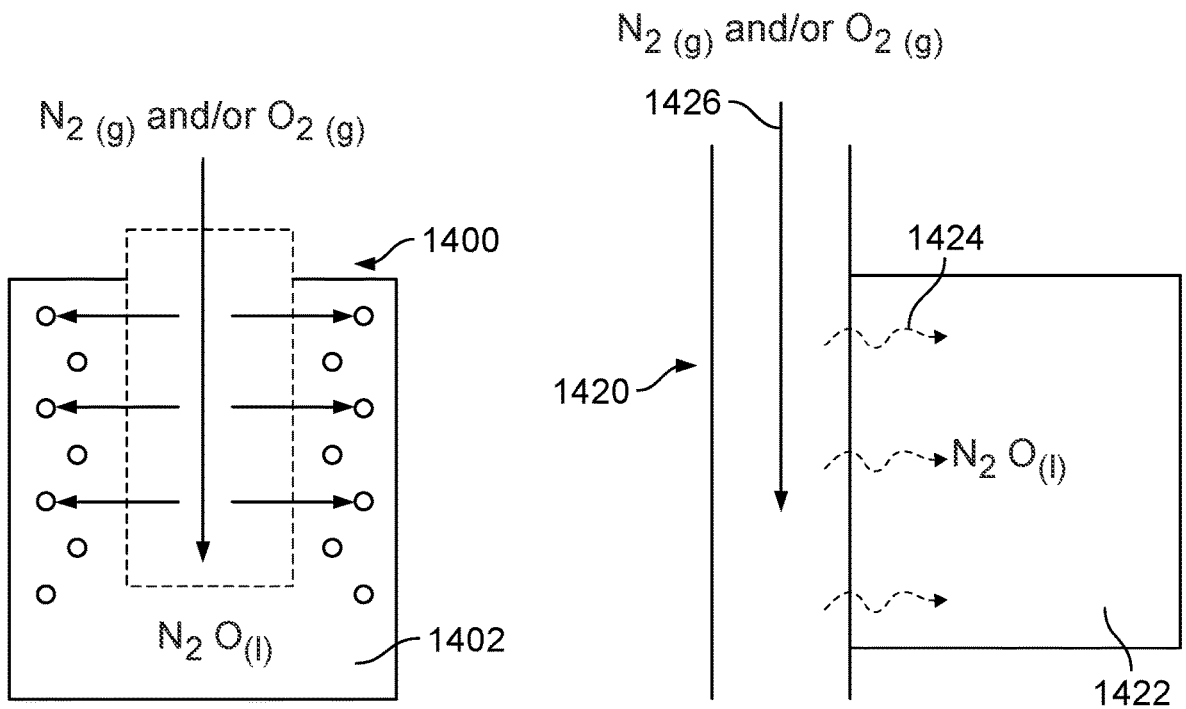
FIG. 14A
FIG. 14B
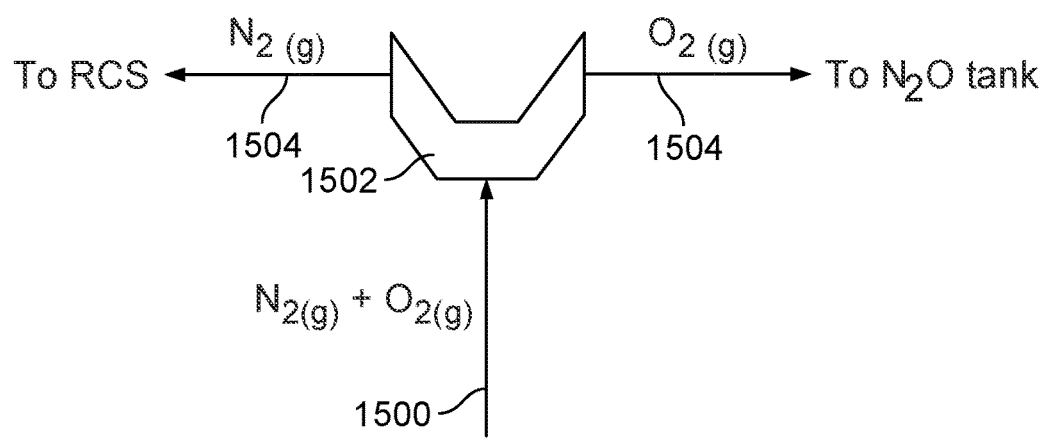
FIG. 15

2300

```
┌─────────────────────────────────────────────┐
│  Atomize a flow of a decomposable fluid to  │
│   produce a nitrous oxide spray       2302  │
└─────────────────────────────────────────────┘
                      │
                      ▼
┌─────────────────────────────────────────────┐
│          Heat the spray of the              │
│          decomposable fluid           2304  │
└─────────────────────────────────────────────┘
                      │
                      ▼
┌─────────────────────────────────────────────┐
│ Chemically catalyze a decomposition reaction of the │
│ heated spray of the decomposable fluid to produce   │
│ two or more gaseous decomposition products.         │
│                                            2308    │
└─────────────────────────────────────────────┘
```

Chemically catalyzing a decomposition reaction of a decomposable fluid to produce two or more gaseous decomposition products, the decomposable fluid originating at a tank
2402

Provide at least one of pressure or heat to bulk fluid in the tank using at least one of the two or more gaseous decomposition products.
2404

2500

> Additively manufacturing a structure of the catalyst bed, the structure defining a plurality of channels configured to receive flow of fluid to be chemically catalyzed, wherein the plurality of channels are oriented at least partially non-parallel to an overall flow direction of the flow from inputs of the plurality of channels to outputs of the plurality of channels, and wherein a catalyst is exposed at an exterior of the structure.
> 2502

FIG. 25

CATALYTIC DECOMPOSITION REACTORS

CROSS-REFERENCE TO RELATED APPLICATION

This application claims the benefit of the priority date of U.S. Provisional Patent Application Ser. No. 63/292,215, filed on Dec. 21, 2021, the entirety of which is hereby incorporated by reference.

FIELD OF THE DISCLOSURE

The present disclosure relates to catalytic decomposition, e.g., of nitrous oxide and other decomposable gases, for ignition, propulsion, and other purposes.

BACKGROUND

Various types of chemical rocket engines are currently in use. In a hybrid rocket propulsion system, a first propellant is stored in the solid or semi-solid phase, while a second propellant is stored in either the liquid or gaseous phase. In most hybrid rocket propulsion systems, the solid propellant is the fuel, and the liquid or gas propellant is the oxidizer. In a hot gas generator propulsion system, heated gases are ejected via a rocket nozzle to directly provide thrust. Nitrous oxide ($N_2O$) is a powerful self-pressurizing liquid oxidizer.

SUMMARY

Some implementations according to this disclosure include a catalyst bed. The catalyst bed includes a structure defining a plurality of channels configured to receive flow of fluid to be chemically catalyzed. The plurality of channels are oriented at least partially non-parallel to an overall flow direction of the flow from inputs of the plurality of channels to outputs of the plurality of channels. A catalyst is exposed at an exterior of the structure.

Implementations of this and other described catalyst beds can have one or more of at least the following characteristics.

In some implementations, the structure includes a support and the catalyst coating the support.

In some implementations, a composition of the support is different at different portions of the structure.

In some implementations, a body of the structure is formed of the catalyst.

In some implementations, a composition of the catalyst is different at different portions of the structure.

In some implementations, the plurality of channels twist circumferentially with respect to the overall flow direction.

In some implementations, the plurality of channels are arranged annularly around a port extending through the structure.

In some implementations, the structure has an open cell shape in which gaps are oriented both axially along the overall flow direction and radially transverse to the overall flow direction.

In some implementations, cross-sections along a length of the structure include progressively-rotated versions of a template cross-section.

In some implementations, the plurality of channels have a plurality of first ports arrayed at a first plane and a plurality of second ports arrayed at a second plane. A density of the first ports at the first plane is different from a density of the second ports at the second plane.

In some implementations, the plurality of channels fan out from the plurality of first ports to the plurality of second ports.

In some implementations, the structure is formed by additive manufacturing.

In some implementations, the catalyst is exposed on surfaces of the plurality of channels.

In some implementations, a geometry of the structure is different at different portions of the structure.

In some implementations, a density of the plurality of channels is different at different cross-sections of the structure in planes perpendicular to the overall flow direction.

In some implementations, an extension direction of at least one of the plurality of channels is different at different portions of the structure.

In some implementations, a type of lattice formed by the structure is different at different portions of the structure.

In some implementations, the structure has a stochastic lattice geometry.

In some implementations, the structure has a triply periodic minimal surface geometry.

In some implementations, the structure includes at least one of a refractory metal or a ceramic.

Some implementations according to this disclosure include another catalyst bed. The catalyst bed includes a structure defining a plurality of channels configured to receive flow of fluid to be chemically catalyzed. A geometry of the structure is different at different portions of the structure. A catalyst is exposed at an exterior of the structure.

Implementations of this and other described catalyst beds can have one or more of at least the following characteristics.

In some implementations, a wall thickness of the geometry is different at different portions of the structure.

In some implementations, a density of a plurality of channels defined by the structure is different at different cross-sections of the structure.

In some implementations, an extension direction of at least one channel defined by the structure is different at different portions of the structure.

In some implementations, a type of lattice formed by the structure is different at different portions of the structure.

In some implementations, a cross-sectional dimension of at least one channel defined by the structure is different at different portions of the structure.

In some implementations, a geometric parameter of the structure is graded from a first end of the structure to a second, opposite end of the structure.

Some implementations according to this disclosure include another catalyst bed. The catalyst bed includes a structure defining a plurality of channels configured to receive flow of fluid to be chemically catalyzed. A composition of the structure is different at different portions of the structure. A catalyst is exposed at an exterior of the structure.

Implementations of this and other described catalyst beds can have one or more of at least the following characteristics.

In some implementations, the structure includes a monolithic support and the catalyst coating the monolithic support. The composition of the monolithic support is different at different portions of the monolithic support.

In some implementations, a body of the structure is formed of the catalyst. A composition of the catalyst is different at different portions of the body.

Some implementations include a method of making a catalyst bed. For example, methods according to this disclosure can produce any of the catalyst beds described above. In some implementations, the method includes additively manufacturing a structure of the catalyst bed, the structure defining a plurality of channels configured to receive flow of fluid to be chemically catalyzed. The plurality of channels are oriented at least partially non-parallel to an overall flow direction of the flow from inputs of the plurality of channels to outputs of the plurality of channels. A catalyst is exposed at an exterior of the structure.

Implementations of this and other described methods can have one or more of at least the following characteristics.

In some implementations, additively manufacturing the structure includes manufacturing a plurality of layers of the structure layer-by-layer. Manufacturing the plurality of layers layer-by-layer includes causing one or more of the plurality of layers to have different compositions, such that a composition of the structure is different at different portions of the structure.

In some implementations, the structure includes a metal. Additively manufacturing the structure includes: (i) providing a layer of a powder of the metal in a powder bed; (ii) selectively heating powder in the layer, to produce a fused cross-section of the metal that defines the plurality of channels; and (iii) repeating (i) and (ii) for a plurality of layers to produce the structure.

In some implementations, selectively heating powder in the layer includes selectively heating the powder using a laser or an electron beam.

In some implementations, the structure includes a material including a ceramic, a metal, or both the ceramic and the metal. Additively manufacturing the structure includes (i) providing a layer of a powder of the material in a powder bed; (ii) selectively depositing a binder on the layer, to produce a bound cross-section of the material that defines the plurality of channels; (iii) repeating (i) and (ii) for a plurality of layers to produce an initial structure including the binder and the powder; (iv) removing the binder from the initial structure; and (v) sintering the initial structure with the binder removed, to produce the structure.

In some implementations, the structure includes a material including a ceramic, a metal, or both the ceramic and the metal. Additively manufacturing the structure includes: (i) mixing a powder of the material with a photocurable resin, to produce a slurry; (ii) providing a layer of the slurry in a slurry bed; (iii) selectively illuminating the layer of the slurry, to cure the layer of the slurry in a cross-section that defines the plurality of channels; (iv) repeating (ii) and (iii) for a plurality of layers to produce an initial structure; (v) removing the photocurable resin from the initial structure; and (vi) sintering the initial structure with the photocurable resin removed, to produce the structure.

In some implementations, the method includes, subsequent to sintering the initial structure to produce the structure, coating the exterior of the structure with the catalyst.

In some implementations, the metal includes the catalyst.

In some implementations, the structure includes a material including a ceramic, a metal, or both the ceramic and the metal. Additively manufacturing the structure includes: (i) providing a portion of the material onto an underlying layer; (ii) using directed energy to melt the portion of the material and attach the portion of the material to the underlying layer; and (iii) repeating (i) and (ii) for a plurality of additional portions of the material, to form the structure.

In some implementations, the plurality of channels twist circumferentially with respect to the overall flow direction.

In some implementations, the plurality of channels are arranged annularly around a port extending through the structure.

In some implementations, the structure has an open cell shape in which gaps are oriented both axially along the overall flow direction and radially transverse to the overall flow direction.

In some implementations, cross-sections along a length of the structure include progressively-rotated versions of a template cross-section.

In some implementations, the plurality of channels have a plurality of first ports arrayed at a first plane and a plurality of second ports arrayed at a second plane. A density of the first ports at the first plane is different from a density of the second ports at the second plane.

In some implementations, the plurality of channels fan out from the plurality of first ports to the plurality of second ports.

In some implementations, the method includes coating the structure with the catalyst using at least one of a slurry dip method, an electrodeposition method, an electroplating method, or a vapor deposition method.

In some implementations, the catalyst is exposed on surfaces of the plurality of channels.

In some implementations, a geometry of the structure is different at different portions of the structure.

In some implementations, a density of the plurality of channels is different at different cross-sections of the structure in planes perpendicular to the overall flow direction.

In some implementations, an extension direction of at least one of the plurality of channels is different at different portions of the structure.

In some implementations, a type of lattice formed by the structure is different at different portions of the structure.

In some implementations, the structure has a stochastic lattice geometry.

In some implementations, the structure has a triply periodic minimal surface geometry.

Some implementations according to this disclosure include a catalyzing reactor system. The system includes an inlet valve configured to fluidically couple a tank for storing a decomposable fluid to a reaction chamber; an injector arranged to receive the decomposable fluid from the inlet valve and inject a spray of the decomposable fluid through the reaction chamber; a heating element disposed in the reaction chamber and arranged to heat the spray of the decomposable fluid; and a catalyst bed disposed in the reaction chamber and including a catalyst, the catalyst bed arranged such that heated spray of the decomposable fluid contacts the catalyst and the catalyst promotes decomposition of the heated spray of the decomposable fluid into two or more gaseous decomposition products.

Implementations of this and other described catalyzing reactor systems can have one or more of at least the following characteristics.

In some implementations, the system includes a distribution plate disposed in the reaction chamber between the heating element and the catalyst bed, the distribution plate configured to promote dispersion of the heated spray of the decomposable fluid before the heated spray of the decomposable fluid interacts with the catalyst bed.

In some implementations, the system includes a heat-resistant ceramic liner disposed on inner walls of the reaction chamber.

In some implementations, a heating power of the heating element is such that interaction between the heated spray of the decomposable fluid and the catalyst bed heats the catalyst bed to at least 300° C.

In some implementations, the system includes a control system configured to perform operations that include: monitoring a temperature of the catalyst bed during thermal decomposition of the heated spray of the decomposable fluid; and in response to determining that the temperature of the catalyst bed satisfies a condition, at least one of adjusting an intensity of the heating element, or adjusting a flow rate of the decomposable fluid.

In some implementations, the catalyst bed includes a plurality of ceramic pellets coated with the catalyst.

In some implementations, the catalyst bed includes a structure coated with the catalyst, the structure defining a plurality of channels through the structure.

In some implementations, the catalyst bed includes a structure having a three-dimensional lattice structure, the three-dimensional lattice structure including gaps both axially along an overall flow direction of the heated spray of the decomposable fluid and radially transverse to the overall flow direction; and the catalyst coating the structure.

In some implementations, the catalyst bed includes a structure defining a plurality of channels that twist circumferentially with respect to an overall flow direction of the heated spray of the decomposable fluid; and the catalyst coating the structure.

In some implementations, the catalyst bed includes a structure defining a plurality of channels configured to receive flow of the spray of the decomposable fluid. The plurality of channels are oriented at least partially non-parallel to an overall flow direction of the flow from inputs of the plurality of channels to outputs of the plurality of channels. The catalyst is exposed at an exterior of the structure.

In some implementations, the catalyst bed includes an additively-manufactured structure.

In some implementations, the catalyst includes a reactive metal.

In some implementations, the injector and the heating element are configured such that the heated spray of the decomposable fluid is gaseous when the heated spray of the decomposable fluid interacts with the catalyst bed.

In some implementations, the system includes a solid fuel grain mass defining a port; and a nozzle arranged to direct the two or more gaseous decomposition products into the port.

In some implementations, a first gaseous decomposition product of the two or more gaseous decomposition products includes oxygen gas.

In some implementations, the system includes a divert attitude control system (DACS), the DACS including the solid fuel grain mass.

In some implementations, the solid fuel grain mass includes a plurality of concentric ring-shaped layers of fuel grain material surrounding the port.

In some implementations, the system includes a flow path that fluidically couples the tank to the port and that bypasses the catalyst bed.

In some implementations, the system includes a nozzle configured to produce thrust by ejection of at least one of the two or more gaseous decomposition products.

In some implementations, the system includes a reaction control system (RCS) or divert attitude control system (DACS) that includes the nozzle.

In some implementations, the system includes a coupling component configured to provide at least one of pressure or heat to a pressure system component using at least one of the two or more gaseous decomposition products.

In some implementations, the coupling component includes a heat exchanger that is arranged to thermally couple the pressure system component to the at least one of the two or more gaseous decomposition products.

In some implementations, the coupling component includes an injector arranged to inject the at least one of the two or more gaseous decomposition products into the pressure system component.

In some implementations, the system includes a gas separator configured to separate a first gaseous decomposition product of the two or more gaseous decomposition products from a second gaseous decomposition product of the two or more gaseous decomposition products and to direct the first gaseous decomposition product to the injector.

In some implementations, the first gaseous decomposition product includes oxygen.

In some implementations, the pressure system component includes the tank, a valve, a fluid line, or a pressure regulator.

In some implementations, the catalyst bed is a secondary catalyst bed. An output of the secondary catalyst bed directs at least one of the two or more gaseous decomposition products into the coupling component. The system further includes a primary catalyst bed having a second output that directs at least one further gaseous decomposition product from the primary catalyst bed into another component distinct from the coupling component.

In some implementations, the component into which the at least one further gaseous decomposition product from the primary catalyst bed is directed includes a solid fuel grain mass configured to undergo combustion. The at least one further gaseous decomposition product includes oxygen gas.

In some implementations, the decomposable fluid includes nitrous oxide.

In some implementations, the heating element includes a metal catalyst arranged to contact the contact the spray of the decomposable fluid.

In some implementations, the system includes a turbine arranged to receive at least one of the two or more gaseous decomposition products.

In some implementations, the system includes a second heating element arranged to heat the decomposable fluid before the decomposable fluid is received at the injector.

In some implementations, the system includes a second heating element exterior to a reactor wall of the system.

In some implementations, the second heating element includes a band-style heater.

Some implementations according to this disclosure include a method. The method includes atomizing a flow of a decomposable fluid to produce a spray of the decomposable fluid; heating the spray of the decomposable fluid; and chemically catalyzing a decomposition reaction of the heated spray of the decomposable fluid to produce two or more gaseous decomposition products.

Implementations of this and other described methods can have one or more of at least the following characteristics.

In some implementations, the method includes directing flow of the heated spray of the decomposable fluid through holes of a distributor such that the flow of the heated spray of the decomposable fluid becomes more evenly distributed across a diameter of a reaction chamber.

In some implementations, heating the spray of the decomposable fluid includes heating the spray of the decomposable fluid such that interaction between the heated spray of the decomposable fluid and a catalyst bed heats the catalyst bed to at least 300° C.

In some implementations, the method includes: monitoring a temperature of a catalyst bed during thermal decomposition of the heated spray of the decomposable fluid; and in response to determining that the temperature of the catalyst bed satisfies a condition, adjusting at least one of an intensity at which the spray of the decomposable fluid is heated or a flow rate of the decomposable fluid.

In some implementations, heating the spray of the decomposable fluid includes converting the spray of the decomposable fluid into a gaseous form.

In some implementations, the method includes directing at least one of the two or more gaseous decomposition products into a port of a solid fuel grain mass.

In some implementations, the at least one of the two or more gaseous decomposition products includes oxygen gas. The method includes causing combustion of the oxygen gas and the solid fuel grain mass.

In some implementations, the method includes, after initiation of the combustion, directing flow of the decomposable fluid into the port of the solid fuel grain mass through a flow path that bypasses a catalyst bed in which the decomposition reaction occurs.

In some implementations, the method includes ejecting at least one of the two or more gaseous decomposition products out of a nozzle so as to produce thrust.

In some implementations, the method includes providing at least one of pressure or heat to a pressure system component using at least one of the two or more gaseous decomposition products.

In some implementations, the method includes providing the heat to the pressure system component by flowing the at least one of the two or more gaseous decomposition products through a heat exchanger that is thermally coupled to the pressure system component.

In some implementations, the method includes providing the pressure to the pressure system component by injecting the at least one of the two or more gaseous decomposition products into the pressure system component.

In some implementations, the method includes separating a first gaseous decomposition product of the two or more gaseous decomposition products from a second gaseous decomposition product of the two or more gaseous decomposition products; and injecting the first gaseous decomposition product into the pressure system component.

In some implementations, the first gaseous decomposition product includes oxygen.

In some implementations, the flow of the decomposable fluid originates at a tank. The pressure system component includes the tank, a valve, a fluid line, or a pressure regulator.

In some implementations, the decomposable fluid includes nitrous oxide.

In some implementations, heating the spray of the decomposable fluid includes heating the spray of the decomposable fluid using a heating element. Chemically catalyzing the decomposition reaction includes chemically catalyzing the decomposition reaction using a metal catalyst exposed at a surface of the heating element.

In some implementations, the method includes jump-starting a turbine using at least one of the two or more gaseous decomposition products.

Some implementations according to this disclosure include a vehicle. The vehicle includes a tank for storing a decomposable fluid; a primary catalyst bed fluidically coupled to the tank; a secondary catalyst bed fluidically coupled to the tank; and a combustion chamber including a solid fuel grain mass, the combustion chamber fluidically coupled to an output of the primary catalyst bed.

Implementations of this and other described vehicles can have one or more of at least the following characteristics.

In some implementations, the secondary catalyst bed has a smaller thermal mass than the primary catalyst bed.

In some implementations, the vehicle includes a flow path coupling the tank to the combustion chamber. The flow path bypasses the primary catalyst bed.

In some implementations, the vehicle includes a coupling component fluidically coupled to an output of the secondary catalyst bed. The coupling component is configured to provide at least one of pressure or heat to a pressure system component using at least one gaseous decomposition product resulting from decomposition of the decomposable fluid at the secondary catalyst bed.

In some implementations, the coupling component includes a heat exchanger that is arranged to thermally couple the pressure system component to the at least one gaseous decomposition product.

In some implementations, the coupling component includes an injector arranged to inject the gaseous decomposition product into the pressure system component.

In some implementations, the injector includes a barbotage injector.

In some implementations, the vehicle includes a gas separator configured to separate a first gaseous decomposition product of the at least one gaseous decomposition product from a second gaseous decomposition product of the at least one gaseous decomposition product, and to direct the first gaseous decomposition product into the injector.

In some implementations, the first gaseous decomposition product includes oxygen gas.

In some implementations, the pressure system component includes the tank, a valve, a fluid line, or a pressure regulator.

In some implementations, the vehicle includes a nozzle fluidically coupled to an output of the secondary catalyst bed, the nozzle configured to produce thrust by ejection of at least one gaseous decomposition product resulting from decomposition of the decomposable fluid at the secondary catalyst bed.

In some implementations, the vehicle includes a reaction control system (RCS) or a divert attitude control system (DACS) including the nozzle.

In some implementations, the vehicle includes a second combustion chamber fluidically coupled to an output of the secondary catalyst bed or the output of the primary catalyst bed.

In some implementations, the vehicle includes a divert attitude control system (DACS) including the second combustion chamber.

In some implementations, the second combustion chamber has a dual-endburning configuration.

In some implementations, the vehicle includes one or more nozzles configured to eject combustion products from combustion in the second combustion chamber.

In some implementations, the vehicle includes a gas accumulator coupled to an output of the secondary catalyst bed, the gas accumulator configured to store at least one gaseous decomposition product resulting from decomposition of the decomposable fluid at the secondary catalyst bed.

In some implementations, the vehicle includes a casing in which the tank, the primary catalyst bed, the secondary catalyst bed, and the combustion chamber are housed.

In some implementations, the vehicle is a missile or a rocket.

In some implementations, the vehicle is a plane or a spacecraft.

In some implementations, the combustion chamber includes a solid fuel grain mass defining a port. The vehicle includes a flow path fluidically coupling an output of the primary catalyst bed to the port.

In some implementations, the vehicle includes a nozzle in fluidic communication with the port, the nozzle configured to generate thrust by ejection of combustion products from the port.

Some implementations according to this disclosure describe another catalyzing reactor system. The system includes an inlet valve configured to fluidically couple a tank for storing a decomposable fluid to a reaction chamber; a catalyst bed disposed in the reaction chamber and including a catalyst, the catalyst bed arranged such that spray of the decomposable fluid from the tank contacts the catalyst and the catalyst promotes decomposition of the spray of the decomposable fluid into two or more gaseous decomposition products; and a tank coupling component configured to provide at least one of pressure or heat to bulk fluid in the tank using at least one of the two or more gaseous decomposition products.

Some implementations according to this disclosure describe another method. The method includes chemically catalyzing a decomposition reaction of a spray of a decomposable fluid to produce two or more gaseous decomposition products, the spray of the decomposable fluid originating at a tank; and providing at least one of pressure or heat to bulk fluid in the tank using at least one of the two or more gaseous decomposition products.

Some implementations according to this disclosure describe another catalyzing reactor system. The system includes a tank for storing a decomposable fluid; a catalyst bed fluidically coupled to the tank; an effervescent injector including a gas flow channel, a liquid flow channel, and one or more orifices between the gas flow channel and the liquid flow channel. The gas flow channel is fluidically coupled to an output of the catalyst bed and is configured to receive at least one gaseous decomposition product resulting from catalytic decomposition of the decomposable fluid at the catalyst bed. The liquid flow channel is fluidically coupled to the tank and is configured to receive the decomposable fluid from the tank. The one or more orifices are configured such that the at least one gaseous decomposition product flows from the gas flow channel into the liquid flow channel and aerates the decomposable fluid. The system includes a combustion chamber fluidically coupled to an output of the liquid flow channel.

Implementations according to this disclosure can help to realize one or more advantages. In some implementations, the use of catalytic decomposition gases to initiate hybrid rocket ignition can make the ignition more reliable and/or repeatable. In some implementations, the catalytic decomposition can be triggered more readily by heating a liquid or gas to be decomposed. In some implementations, more effective heating, conversion to a gas, and eventual decomposition can be achieved by atomization of a liquid into a spray of droplets. In some implementations, decomposition products can be re-routed back to a source tank to help regulate pressure and/or temperature. In some implementations, particular catalyst bed geometries can provide a variety of advantages, such as more compact overall dimensions of the catalyst bed, to allow for placement in more compact reactors; higher catalytic surface area per unit mass of monolithic support, leading to more complete decomposition; decreased pressure drop of fluid flowing through the catalyst bed, thereby resulting in higher output gas pressures and increased thrust or oxidation strength; increased flow residence time, leading to more complete decomposition; and improved catalyst bed thermal properties.

The details of one or more implementations are set forth in the accompanying drawings and the description below. Other aspects, features and advantages will be apparent from the description and drawings, and from the claims.

BRIEF DESCRIPTION OF THE DRAWINGS

FIGS. 14A-14B are diagrams illustrating example tank coupling components.

FIG. 15 is a diagram illustrating example gas separation.

FIG. 23 is a diagram illustrating an example catalysis method.

FIG. 25 is a diagram illustrating an example method of making a catalysis bed.

DETAILED DESCRIPTION

This disclosure relates to catalytic decomposition reactors. Fluids can be passed through a catalyst bed to catalyze decomposition of the fluids, and the resulting decomposition products can be used for various purposes, such as thrust, ignition, and/or system regulation, e.g., pressure and/or temperature regulation. Some catalyst bed configurations, such as catalyst bed geometries provided by additive manufacturing (AM) processes, can promote more efficient catalysis, increasing the catalytic yield and allowing for the use of catalytic decomposition reactors in systems that may not be compatible with the use of other catalyst bed configurations. Such systems can include, for example, a vehicle, a rocket or missile, or another type of system. In some catalytic reactors, a liquid such as liquid nitrous oxide ($N_2O$) is sprayed, heated, and catalyzed to promote decomposition of the liquid into constituent gases, such as nitrogen and oxygen.

Figure 1:
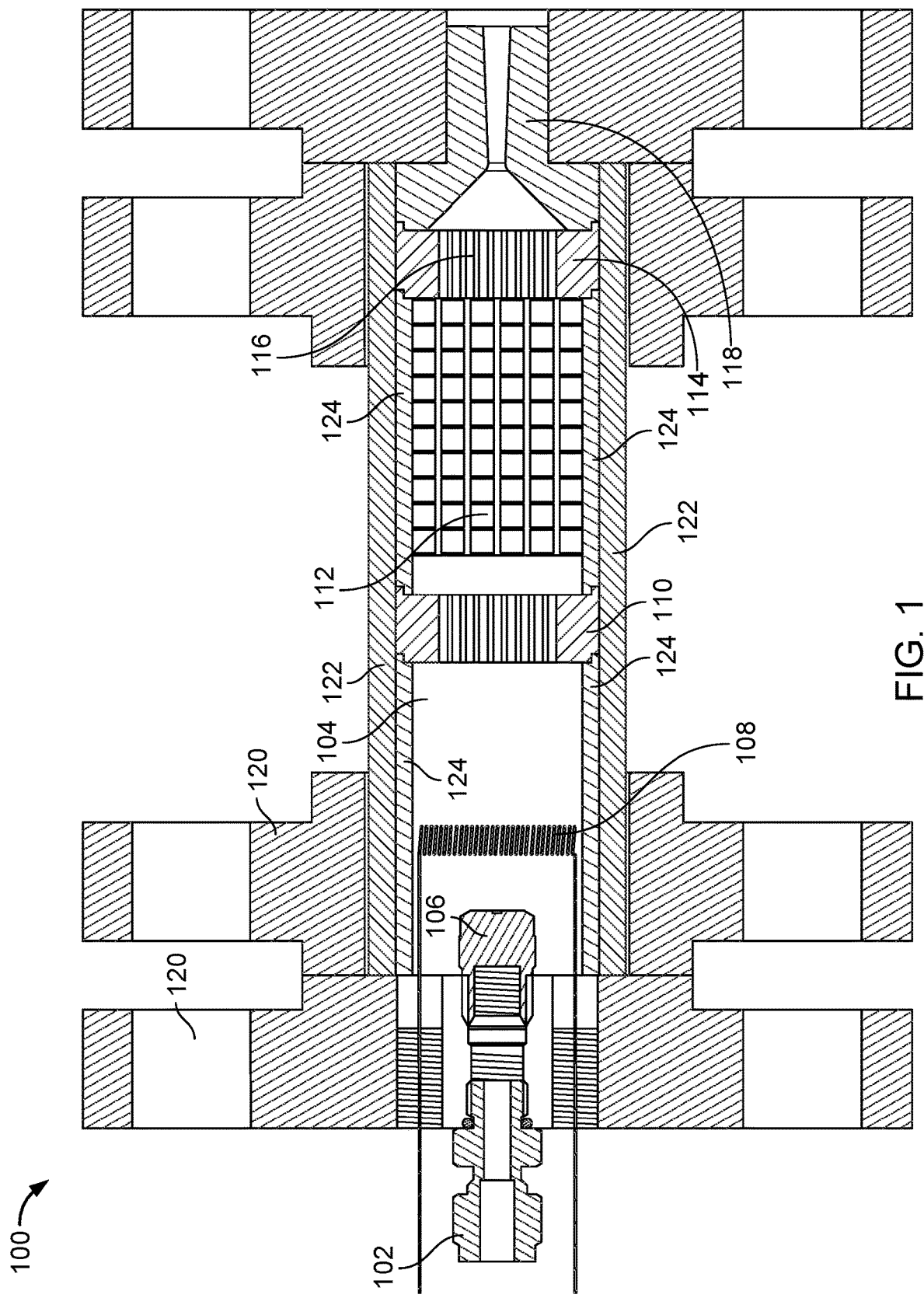
FIG. 1 is a diagram illustrating an example catalytic decomposition reactor.

FIG. 1 shows an overview of an example catalytic decomposition reactor 100, the components of which are each described in more detail below. On one side of the reactor 100, a nitrous oxide inlet 102 couples a source of liquid nitrous oxide (not shown) to a reaction chamber 104 in an interior of the reactor 100. Before entering the reaction chamber 104, the nitrous oxide passes through an injector 106 (e.g., an atomizer) that converts the flow of nitrous oxide into a spray of nitrous oxide droplets that are injected into the reaction chamber 104. The spray of nitrous oxide droplets is heated by a heating element 108. This heat can help to activate thermal decomposition when the reactor 100 is not yet in a self-sustained reaction mode, such as when the reactor 100 is initially started from a cold state. The heat may further promote catalytic decomposition, e.g., at least when the reactor 100 is in a self-sustained reaction mode.

The catalytic decomposition reactor 100, and other examples described throughout this disclosure, are described as using nitrous oxide as a fluid that is catalytically decomposed. However, catalytic reactors (and associated systems) based on other decomposable fluids are also within the scope of this disclosure. For example, some implementations employ hydrogen peroxide ($H_2O_2$), hydrazine ($N_2H_4$), or ammonium dinitramide (ADN). $H_2O_2$ can be decomposed into gaseous oxygen and water vapor; $N_2H_4$ can be decomposed into gaseous nitrogen, gaseous hydrogen, and gaseous ammonia; and ADN can be decomposed into gaseous oxygen, gaseous nitrogen, and water vapor. Further examples of decomposable fluids include hydroxylammonium nitrate-based fluids. References herein to nitrous oxide-based systems and methods, such as the description relating to each of FIGS. 1-25, should be understood as encompassing corresponding systems and methods that use these and/or other fluids for decomposition, to perform any or all the same functions as described for $N_2O$-based systems, using any or all of the same elements as described for $N_2O$-based systems, with "nitrous oxide," its catalysts, and its decomposition products $O_2$ and $N_2$ in the descriptions of FIGS. 1-25 being replaced by these and/or other decomposable fluids, the fluids' catalysts, and the fluids' decomposition products.

In addition, the fluid need not—though can be—pure/undiluted (e.g., anhydrous), but, rather, can in some implementations be mixed with, and/or form a compound with, another fluid. For example, an aqueous form of the fluid can be used, the fluid can be mixed with a stabilizing agent and/or another type of agent, etc.

Structural components of the reactor 100 (e.g., supporting flanges 120 and outer reactor walls 122) can be formed of any material that can withstand the heat and pressure that will be generated in the reactor 100. The material can be configured to withstand temperatures of up to 1640° C., or another target temperature depending on the expected operational characteristics of the reactor 100. For example, in some implementations, the structural components are composed of stainless steel. In addition, in some implementations, a heat-resistant liner 124 lines at least some inner walls of the reaction chamber 104, to help shield the structural components from the highest temperatures that are present. In some implementations, the heat-resistant liner 124 is a heat-resistant ceramic, such as mullite, alumina, and/or cordierite. In some implementations, a carbon-carbon composite is included. Heat-resistant metal alloys can instead or additionally be used, such as nickel austenitic alloys, nickel-based alloys, molybdenum titanium alloys, or other classes of alloys. In various implementations, the heat-resistant liner 124 can include a separate component installed on the inner walls (e.g., a sheet of material bonded or otherwise attached to the inner walls) and/or a coating on the inner walls, e.g., thermal barrier film.

Sizes of the reactor 100 can vary depending on the implementation. The diameter of the reactor 100 can be configured to support a given mass flow rate of the nitrous oxide, using a target "bed loading" parameter (target mass flow rate divided by cross-sectional area of the catalyst bed, the latter of which at least partly dictates a diameter of the reactor 100 as a whole). In some implementations, the reactor 100 has a diameter between 1.5 and 2 inches, e.g., for a bed loading of approximately 15 $kg/m^2$-s or less; however, other sizes are also within the scope of this disclosure.

The heated nitrous oxide—which may, at this point in its flow, be wholly or partially gaseous as opposed to in liquid droplet form—passes through a distribution plate 110. The distribution plate 110 disperses the nitrous oxide spray more uniformly across a diameter of the reaction chamber 104. After passing through the distribution plate 110, the nitrous oxide interacts with a catalyst bed 112 that includes a chemical catalyst. The catalyst bed 112 is supported by a catalyst bed support 114.

The catalyst—for example, a reactive metal such as rhodium, ruthenium, and/or iridium, and/or another platinum group metal—promotes catalytic decomposition of the nitrous oxide at a lower temperature than would otherwise be necessary. In the case of nitrous oxide, the decomposition reaction produces oxygen ($O_2$) and nitrogen ($N_2$) gases.

The oxygen and nitrogen gases (in some implementations, further distributed by distributing features 116 of the catalyst bed support 114) pass through an outlet 118. The form of the outlet 118, and types of any additional features following the outlet 118, depend on the particular application(s) in which the reactor 100 is being used. For example, the gases can be used to propel a rocket as a "hot gas" propulsion system, such as in space. The gases can be used as an oxidizer in a hybrid rocket engine, e.g., by interaction with a solid fuel grain. The gases can instead or additionally be fed back into the reactor 100 to attain desired heats and/or pressures. The use of nitrous oxide in a hybrid rocket propulsion system or a liquid bi-propellant rocket engine allows the elimination of expensive, complex pumping systems such as turbopumps from the system's design. $N_2O$ can be used for various purposes, for example, to power ignition, for thermal control, for reaction control, for pressurization, and/or for other systems on mobile systems such as missiles, launch vehicles, or spacecraft. Implementations for each of these purposes, or combinations of these purposes, are described in further detail below.

Figure 2:
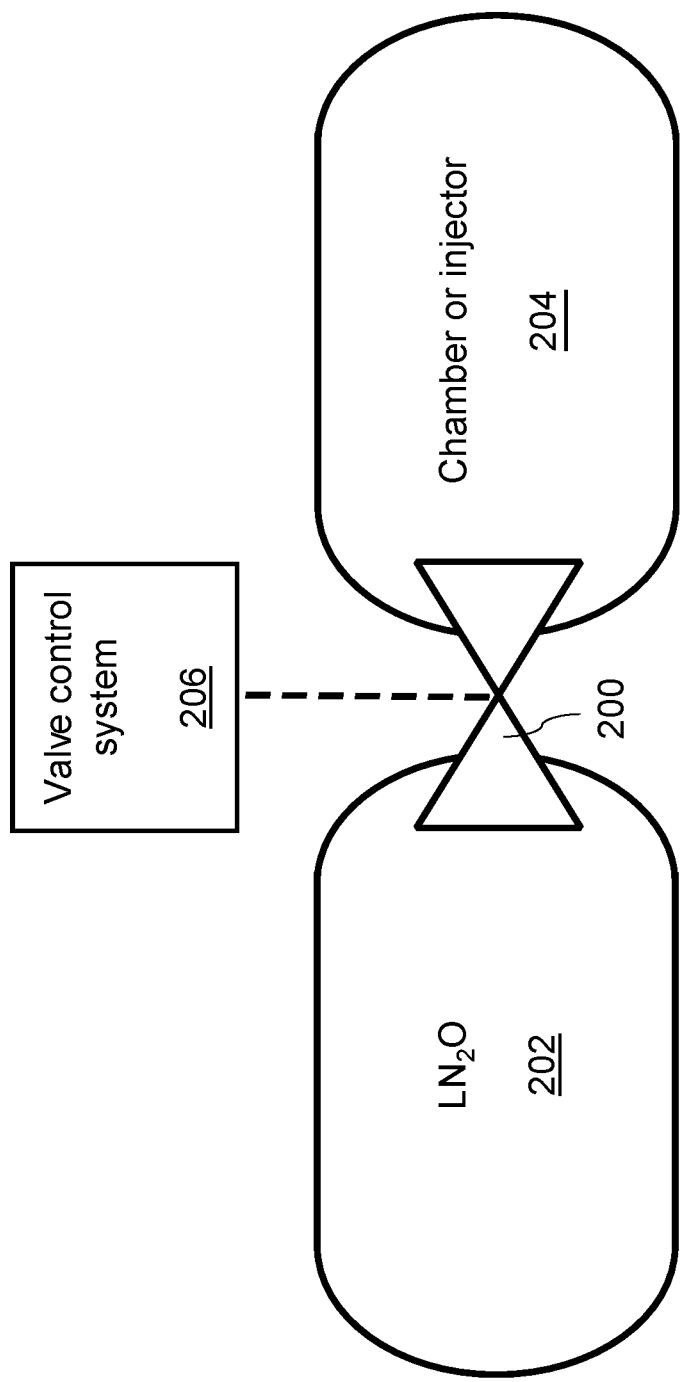
FIG. 2 is a diagram illustrating an example tank and inlet valve.

As shown in FIG. 2, an inlet valve 200 (e.g., the nitrous oxide inlet 102) fluidically couples a tank 202 of the liquid to be processed (e.g., nitrous oxide) to another component 204. The other component 204 can be the reaction chamber itself or can be a component that will process the nitrous oxide before the nitrous oxide passes into the reaction chamber, such as an injector (e.g., an atomizer) or a heater. Various valve types for the inlet valve 200 are within the scope of this disclosure, such as a ball valve, a butterfly valve, a gate valve, a plug valve, or another valve type. For examples, pressures within the tank 202 can be between 750 psia and 850 psia when the nitrous oxide inside the tank 202 is near ambient temperatures. As described in further detail below, the tank 202 can be pressurized by injection of gases, such as helium and/or gases from the catalytic decomposition reaction.

The inlet valve 200 is coupled (e.g., electrically coupled) to a valve control system 206 that is configured to control the inlet valve 200. For example, the valve control system 206 can, by sending appropriate signals to the inlet valve 200, open or close the inlet valve 200. The valve control system 206 can be an independent system or can be included in another control system of the reactor. For example, the valve control system 206 can be a module of an overall control system of the reactor. If the inlet valve 200 is capable of flow rate regulation (as opposed to binary open/closed control), the valve control system 206 can, by sending appropriate signals to the inlet valve 200, control the flow rate of nitrous oxide into the other component 204, which can be useful in various ways. Like other parameters of the reactor 100, the target flow rate can vary depending on the specific application in which the reactor 100 is being used. An example steady-state flow rate of nitrous oxide might be 15 g/s, which might be variable between 0 and 20-25 g/s over the course of operations.

For example, it may be useful to have a relatively low flow rate when the reactor is started up from an initial cold state, to avoid overwhelming the reactor with more nitrous oxide than can be feasibly heated and decomposed without the catalyst being already at an elevated temperature. When the catalyst is hot, the catalyst can accommodate an increased flow rate of nitrous oxide, which can be supplied through the inlet valve 200. Accordingly, in some implementations, the valve control system 206 is configured to receive data indicative of a reaction chamber temperature and/or a catalyst bed temperature (e.g., from one or more temperature sensors positioned in the reaction chamber and/or in thermal contact with the catalyst bed). The valve control system 206 is further configured to adjust the flow rate of nitrous oxide based on the temperature through provision of appropriate control signals to the inlet valve 200. For example, the valve control system 206 can be configured to adjust the flow rate based on the temperature such that higher temperatures lead to higher flow rates. The valve control system 206 can increase the flow rate when it determines that a temperature condition is satisfied (e.g., a measured temperature is greater than a threshold temperature).

As another example of useful flow rate control, in some implementations the flow rate can be adjusted to, directly or indirectly, adjust the thrust of a rocket that includes the reactor. In a hot gas propulsion system, increasing or decreasing the nitrous oxide flow rate will correspondingly increase or decrease the amount of gas generated and, correspondingly, increase or decrease the amount of thrust, because the thrust is directly dependent on the amount of gas being ejected from the rocket. In a hybrid rocket engine where the generated gas is used for oxidation, the regression rate of fuel is correlated positively with the amount of oxidizer, such that an increase/decrease in flow rate causes a corresponding increase/decrease in generated oxidizing gas, an increase/decrease in fuel regression rate and, finally, an increase/decrease in generated thrust. Accordingly, in some implementations, the valve control system 206 is configured to receive a signal indicative of an "increase thrust" command or a "decrease thrust" command (e.g., from a primary control system), and to increase or decrease the flow rate accordingly. In some implementations, the valve control system 206 is configured to receive a command indicating a particular target thrust and to determine, and set, a corresponding target flow rate that will cause the target thrust. The determination of the target flow rate can be based on a stored relationship between thrust and flow rate.

Figure 3A:
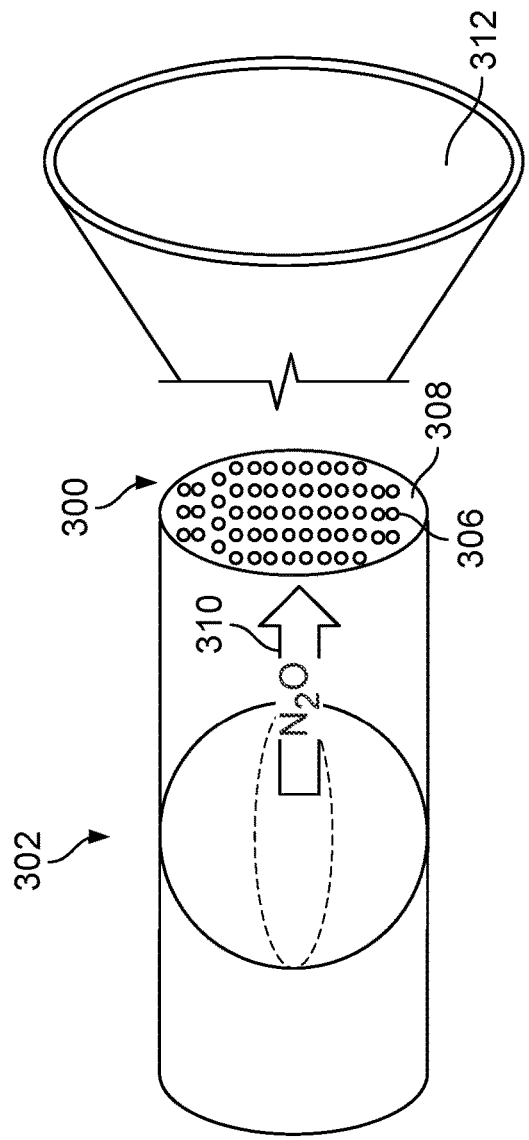
FIGS. 3A-3B are diagrams illustrating example atomizers.

An injector 300 or 320 (e.g., injector 106) receives flow of the liquid to be decomposed (e.g., nitrous oxide) from the inlet valve. In some implementations, as shown in FIG. 3A, the injector 300 is built into the inlet valve 302 itself, e.g., as an array of orifices 306 formed in an injecting flange 308 of the inlet valve 302 (in this example, a ball valve). Nitrous oxide 310 passing through the inlet valve 302 encounters the array of orifices 306 and is converted into a spray 312 of fine nitrous oxide droplets. The droplets are more readily evaporated into a gas than are non-atomized liquids, promoting subsequent decomposition. In some implementations the nitrous oxide 310 is converted into a vortex of atomized droplets. The swirling flow of the vortex can increase the residence time during which the liquid is decomposed (e.g., thermally decomposed) into constituent hot gases, thereby allowing for more thorough decomposition.

Figure 3B:
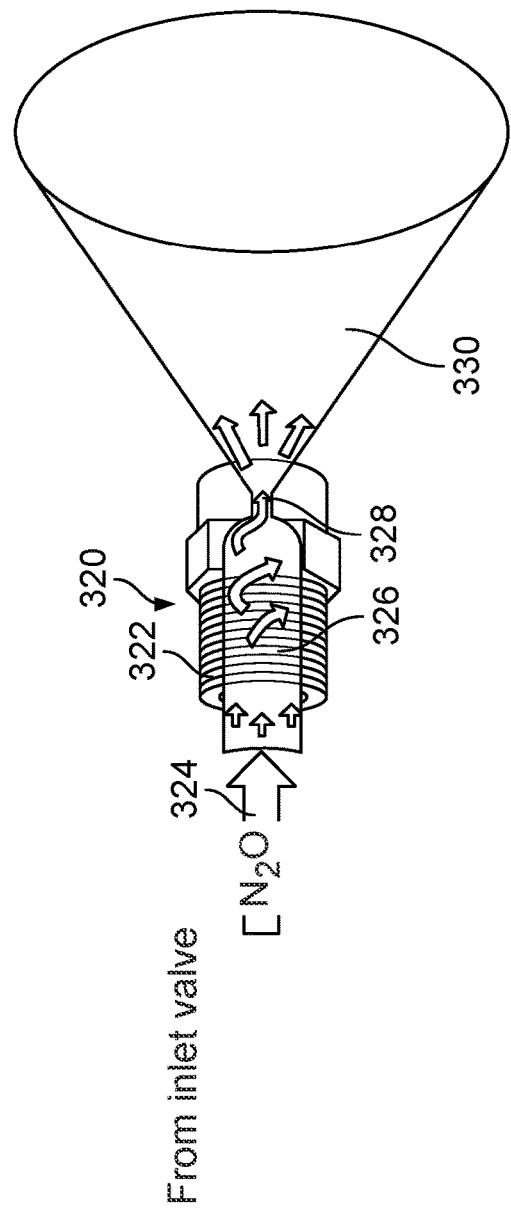

In some implementations, as shown in FIG. 3B, the injector 320 is a discrete component such as a spray nozzle. For example, the injector 320 can include a plain-orifice nozzle, a shaped-orifice nozzle, a surface-impingement nozzle, a pressure-swirl nozzle, or another nozzle type. In order to better distribute sprayed nitrous oxide across an entire diameter of the reaction chamber, in some implementations it is preferable to use a full-cone spray nozzle such as an axial-flow full-cone spray nozzle 322. Nitrous oxide 324 from the inlet valve is directed through a swirl chamber 326 and out an outlet 328 to produce a spray 330 of fine nitrous oxide droplets.

Spray parameters such as droplet size, spray angle, and spray pattern can be adjusted, by appropriate selection and configuration of the injector 300, 320, to improve nitrous oxide decomposition. Smaller droplet sizes can promote more thorough decomposition; however, other parameters, such as the allowable pressure drop, nitrous oxide flow rate, and reactor and injector geometries, are also relevant for selection of droplet size. Spray pattern can depend on, among other possible factors, a type of heating element that will interact with the nitrous oxide spray, to make heating more effective and uniform. Types of spray pattern include full-cone, hollow-cone, and flat-fan, each of which can be used in various implementations according to this disclosure. In some implementations, the injector 300, 320 is configured to produce a uniform filled circular spray.

Figure 4:
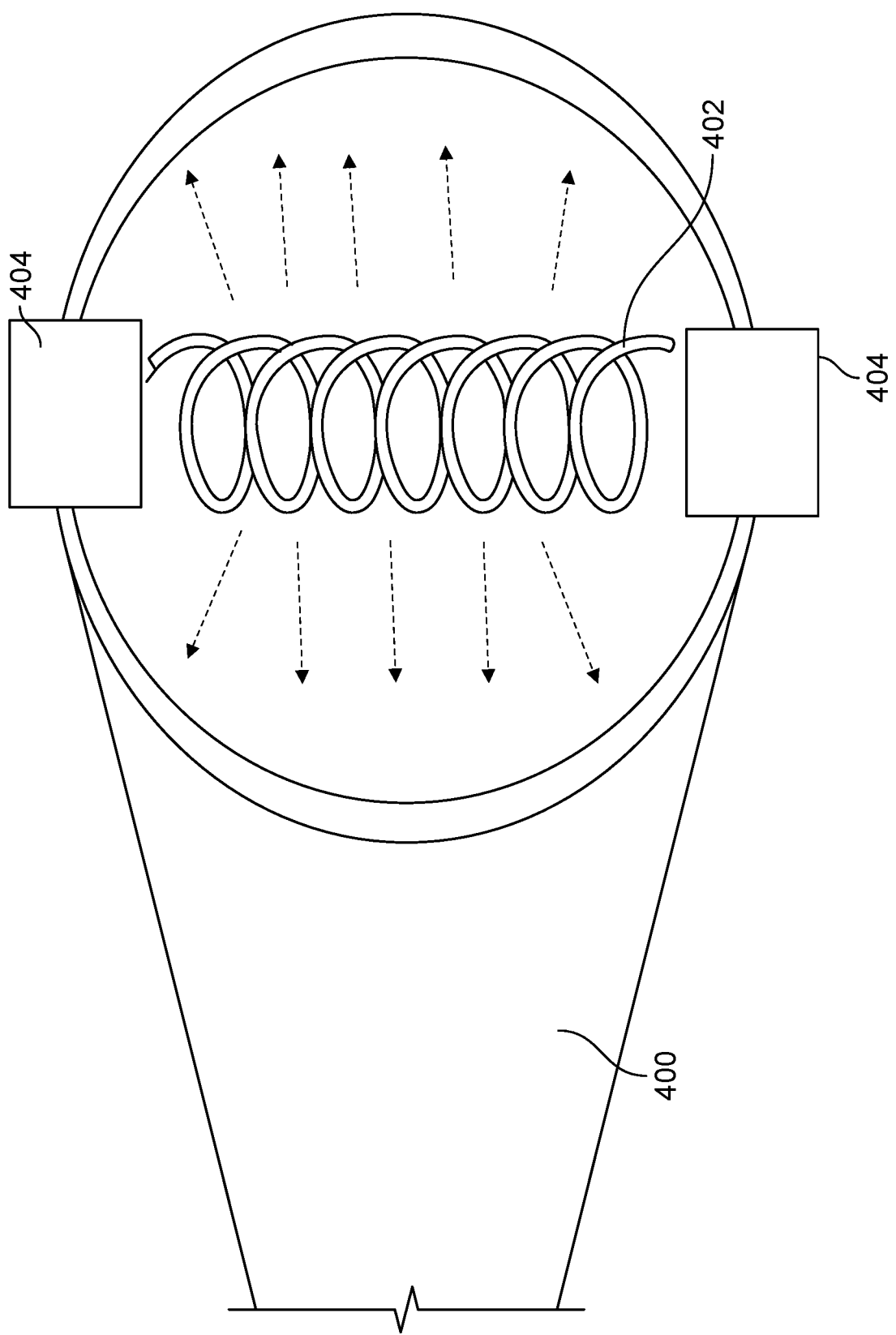
FIG. 4 is a diagram illustrating an example heating element.

As shown in FIG. 4, after optional atomization, the spray 400 (e.g., nitrous oxide spray) interacts, in some implementations, with a heating element 402 (e.g., the heating element 108). In this example, the heating element 402 includes a heating coil such as a nichrome heating coil. Resistive heating occurs in the heating coil from currents transmitted through the heating coil, and the heat diffuses to the spray 400. Other types of heating element 402 include cartridge heaters, glow plugs, and other heater types. In some implementations, the intensity of the heating element 402 is set such that at least some of the nitrous oxide spray 400 undergoes thermal decomposition directly during heating by the heating element. In some implementations, the intensity of the heating element 402 is set such that the nitrous oxide spray 400 is heated without substantially decomposing (until later interaction with a catalyst, as described below). In some implementations, the intensity of the heating element 402 is set such that at least some of the nitrous oxide spray 400 becomes gaseous during heating by the heating element, from its prior liquid droplet form.

Spray heating and catalyst use are motivated by the thermodynamics of fluid decomposition. For example, in the case of nitrous oxide, nitrous oxide is stable at room temperature and atmospheric pressure, but it undergoes a highly exothermic and self-sustaining decomposition into gaseous nitrogen and oxygen at high temperatures. The relevant reaction is

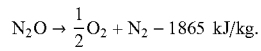

$$N_2O \rightarrow \frac{1}{2}O_2 + N_2 - 1865 \text{ kJ/kg}.$$

However, this reaction requires high temperatures, for example, 700° C. or higher, which may not be compatible with certain reactor designs and materials. Also, these high temperatures can induce the alternative decomposition path

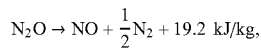

$$N_2O \rightarrow NO + \frac{1}{2}N_2 + 19.2 \text{ kJ/kg},$$

which, because it does not produce oxygen, may not be useful for hybrid rocket engine applications in which the reaction products are to be used for oxidation. Moreover, this alternative decomposition path is endothermic and, therefore, may not be self-sustaining.

Figure 5:
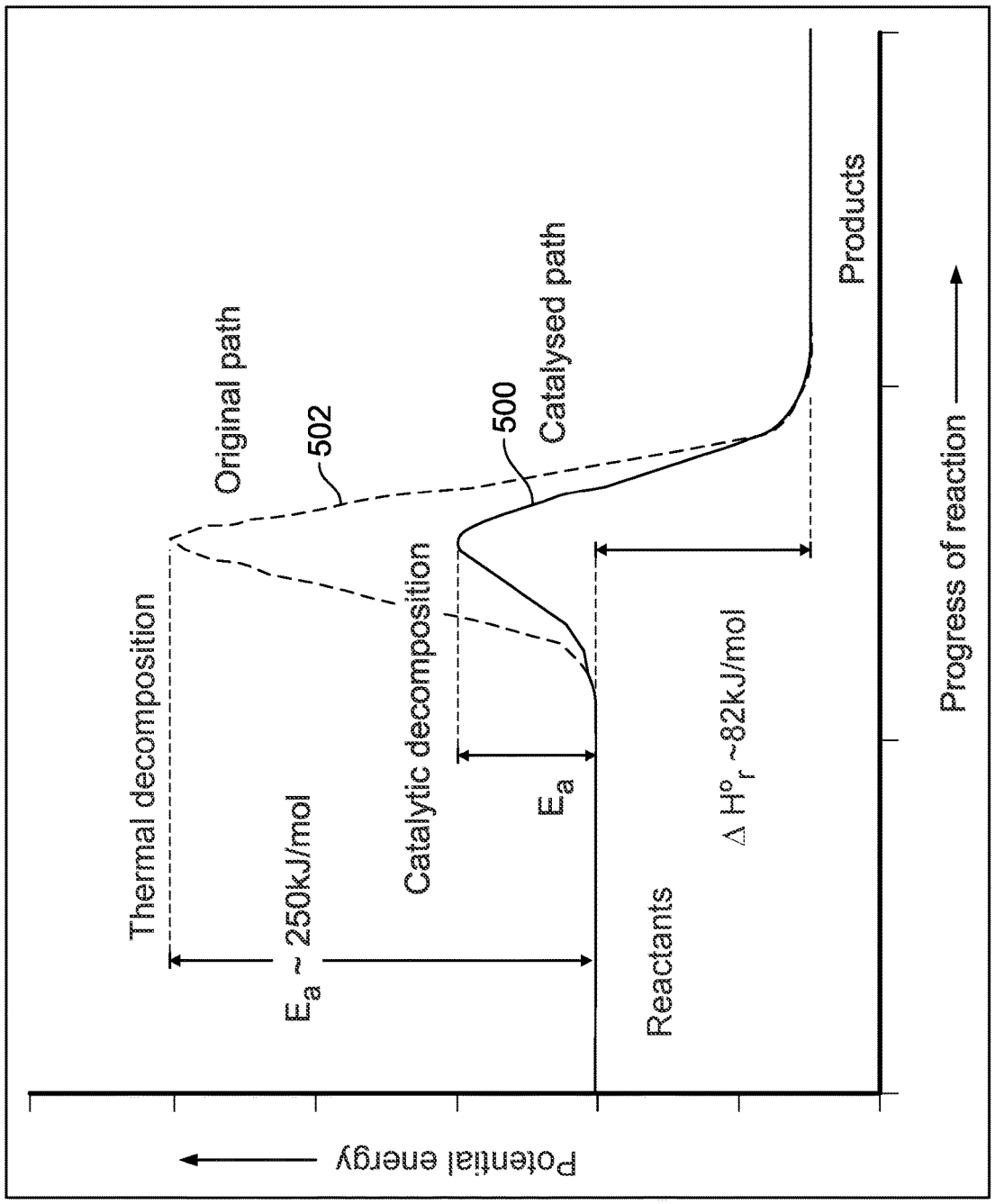
FIG. 5 is a plot illustrating nitrous oxide decomposition reactions.

As shown in FIG. 5, the catalytic decomposition energy curve 500 (decomposition path in the presence of a decomposition catalyst) requires significantly less activation energy EA than the purely thermal decomposition energy curve 502. For example, catalytic decomposition can occur at temperatures between 300° C. and 400° C., or higher. The use of catalysts, by lowering the activation energy, can facilitate decomposition reactors that require less energy input, e.g., less electrical pre-heat time and/or energy. In addition, the use of catalysts, can allow more flexibility in reactor design and materials (e.g., allowing the use of materials that can withstand temperatures of 400° C. but not 700° C.). Moreover, the lower reaction temperatures associated with catalytic decomposition can reduce or eliminate the alternative decomposition path that produces NO, improving decomposition output. These benefits of catalytic decomposition are not limited to the case of nitrous oxide but, rather, may also be applicable to the other decomposable gases within the scope of this disclosure, such as hydrogen peroxide ($H_2O_2$), hydrazine ($N_2H_4$), and ammonium dinitramide (ADN).

In this context, in some implementations, heating of the decomposable fluid spray can be useful because the heated decomposable fluid spray preheats the catalyst bed. In the absence of preheating, in some implementations, the reaction chamber may not be at temperatures capable of supporting decomposition, even in the context of a catalyst. For example, in some implementations heated nitrous oxide brings the catalyst bed up to a desired temperature (e.g., an activation temperature corresponding to the activation energy EA, such as between 300° C. and 400° C.) in a preheating time of less than thirty seconds or less than one minute, such as between thirty seconds and one minute. As described in more detail below, in some implementations the heating element is enabled when the reactor is initially turned on or when a temperature condition of the reactor is not yet met, and the heating element is later disabled when catalytic thermal decomposition is fully self-sustaining and additional heat input is unnecessary.

Referring back to FIG. 4, in some implementations the heating element 402 includes a catalytic component. For example, the heating coil can be composed of a wire material that is itself a catalyst, such as ruthenium, a ruthenium alloy, rhodium, or a rhodium alloy such as platinum/rhodium. Alternatively, or in addition, a catalyst 404 can simply be placed in proximity to the heating element 402, such as a coating/layer on the heating element 402 (e.g., as a coating on a nichrome heating element) or as a portion of catalyst material adjacent to the heating element 402. Whether integrated into the heating element 402 or separate as a separate catalyst 404, the optional catalyst at this stage of the reactor works in concert with heat from the heating element 402 to induce at least partial decomposition of the nitrous oxide spray 400, exothermically generating heat that allows one or more temperatures inside the reactor (e.g., a catalyst bed temperature) to more quickly reach temperatures at which catalytic decomposition is self-sustaining. In some implementations, heat from the heating element 402 is itself sufficient to induce at least some thermal decomposition, even in the absence of a catalyst. The heating element 402 can also convert some or all of the liquid nitrous oxide in the spray into gaseous nitrous oxide.

In some implementations, instead of or in addition to the heating element 402 arranged to heat the spray 400, the catalytic reactor 100 (e.g., a catalytic reactor system) includes at least one pre-heater (not shown) arranged to heat the decomposable fluid prior to formation of the spray 400, e.g., when the decomposable fluid is in a storage tank and/or when the decomposable fluid is being transported from the tank to the injector 106 to form the spray 400. The inclusion of a pre-heater can aid in raising the temperature of the decomposable fluid to achieve a self-sustaining decomposition reaction.

Figure 6:
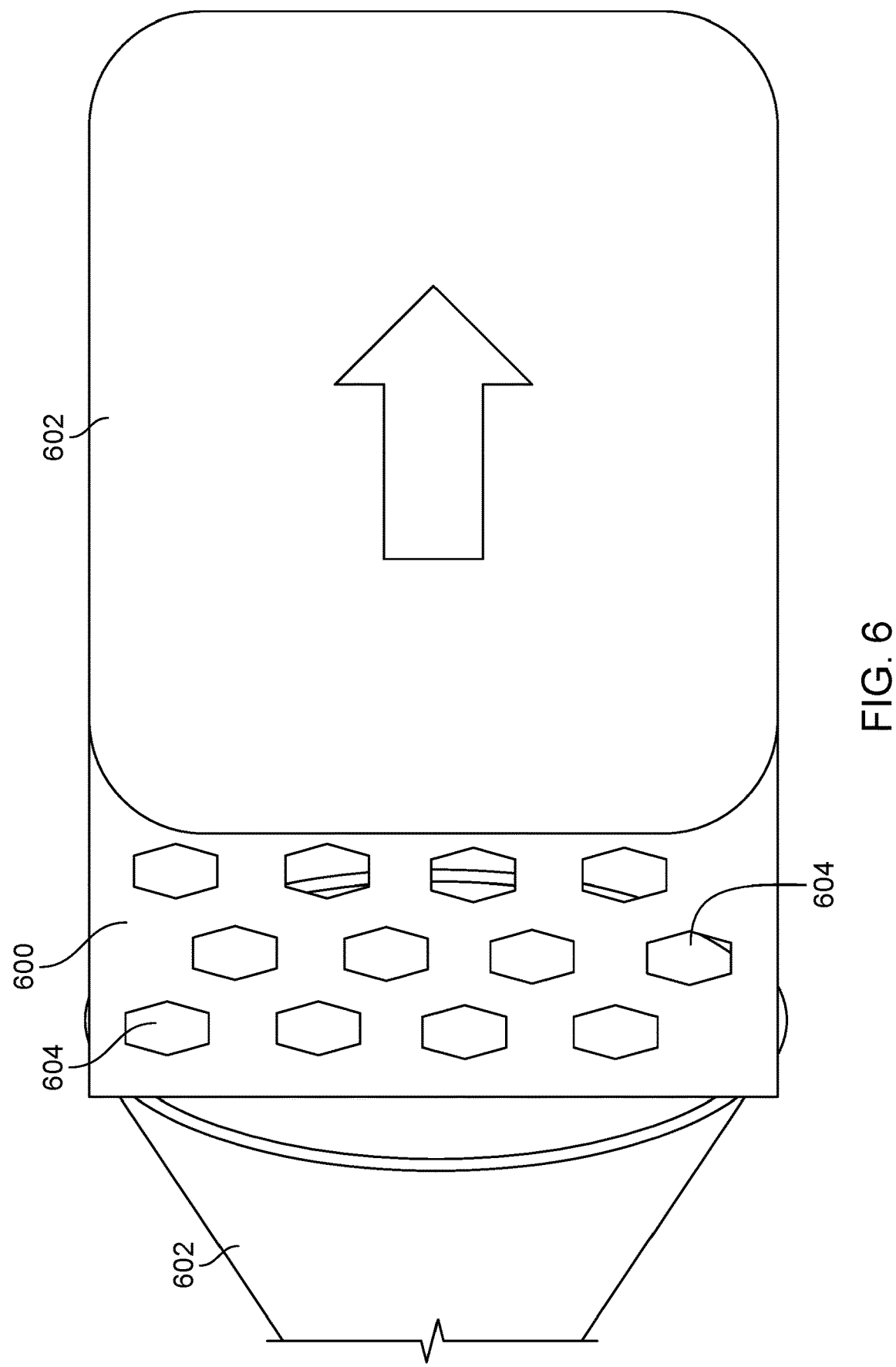
FIG. 6 is a diagram illustrating an example distribution plate.

In some implementations, as shown in FIG. 6, an optional distribution plate 600 (e.g., the distribution plate 110) is included in the reaction chamber to more uniformly distribute the liquid, liquid/gas, or gas spray 602 before the spray 602, such as nitrous oxide, interacts with the catalyst bed. The distribution plate 600 includes a series of holes through which the spray 602 passes, so as to break up and distribute local concentrations of the spray 602. In the example of FIG. 6, the distribution plate 600 has a honeycomb structure defining hexagonal holes 604. In some implementations, the distribution plate includes an array of holes of another shape, such as an array of circular holes. The distribution plate 600 is configured to guide flow of the spray 602 without inducing a significant pressure drop in the spray 602 across the distribution plate 600. For example, holes in the distribution plate can have widths less than 5 mm, such as between 1 mm and 2 mm; however, other widths are also within the scope of this disclosure.

With or without a preceding distribution plate, the heated liquid, liquid/gas, or gaseous spray, such as nitrous oxide, interacts with a catalyst bed including a catalyst, such as catalyst bed 112. In some implementations, the spray is wholly gaseous when the spray begins interacting with the catalyst bed, due to ambient reaction chamber temperatures/pressures and/or the specific heating effects of a heating element. The catalyst promotes decomposition of the nitrous oxide into nitrogen gas and oxygen gas, as described in reference to FIG. 5. Various implementations of the catalyst bed are within the scope of this disclosure. Note that the following implementations need not be separate but, rather, can be combined, so that, for example, a catalyst bed can include both catalyst-coated pellets and a catalyst-coated lattice structure, or another combination of catalyst bed structures.

Figure 7A:
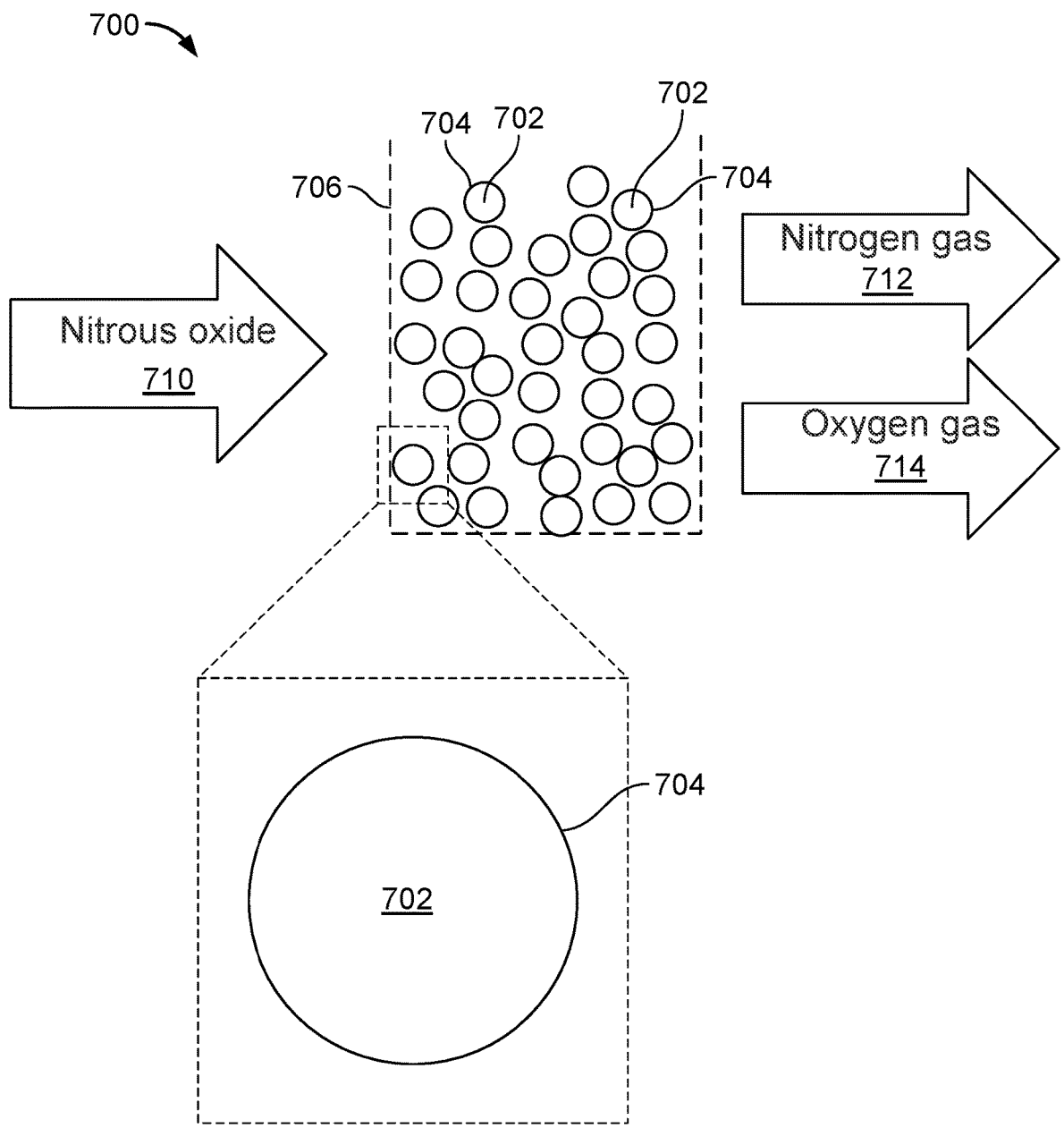
FIGS. 7A-7H are diagrams illustrating example catalysis beds.

For example, as shown in FIG. 7A, in some implementations the catalyst bed is a packed-bed reactor 700. The packed-bed reactor includes a dense packing of heat-resistant pellets 702 coated with a catalyst 704, the heat-resistant pellets 702 held by a catalyst bed support 706. The catalyst bed support 706 can be, for example, a frame on which the packing of heat-resistant pellets 702 rests or a receptacle in which the heat-resistant pellets 702 reside. In some implementations, the packing is random, while in other implementations the packing is structured/systematic. Liquid, liquid/gas, or gaseous nitrous oxide 710 interacts with the catalyst 704 in the catalyst and is catalytically decomposed into nitrogen gas 712 and oxygen gas 714.

Because the catalyst bed support 706 is exposed to high temperatures during thermal decomposition, in some implementations the catalyst bed support 706 is a heat-resistant material such as one of the heat-resistant materials described in reference to the heat-resistant liner 124, or another heat-resistant material. The heat-resistant pellets 702 are also exposed to these high temperatures and, correspondingly, are composed of materials that are capable of withstanding them. In some implementations, the heat-resistant pellets 702 are composed of one or more heat-resistant ceramics, such as alumina, silica-aluminum, mullite, cordierite, and/or silicon carbide. The heat resistant-pellets 702 can have a variety of sizes in different implementations, such as between 3 mm and 4 mm in diameter and/or length. Pellet geometries include, for example, spheres, ellipsoids, and hollow cylinders. In some implementations, a weight percentage of the catalyst 704 for the combined pellet and catalyst is between 0.1% and 10%, e.g., 0.5% or 5%. Other weight percentages of the catalyst 704 are also within the scope of this disclosure, e.g., weight percentages higher than 10%, such as weight percentages up 30%, 40%, 50%, or higher.

The catalyst 704 itself coats the heat-resistant pellets 702 and can be any catalyst that both catalyzes the decomposition of the liquid, liquid/gas, or gas used in the reactor and can withstand the temperatures associated with that decomposition. In the case of nitrous oxide, examples of catalysts include materials including platinum group metals such as iridium, osmium, palladium, platinum, rhodium, and ruthenium, and/or alloys/compounds thereof. Instead of or in addition to these and other metallic catalysts, in some implementations one or more metal oxide catalysts is used, such as cobalt oxide and/or cerium oxide.

Figure 7B:
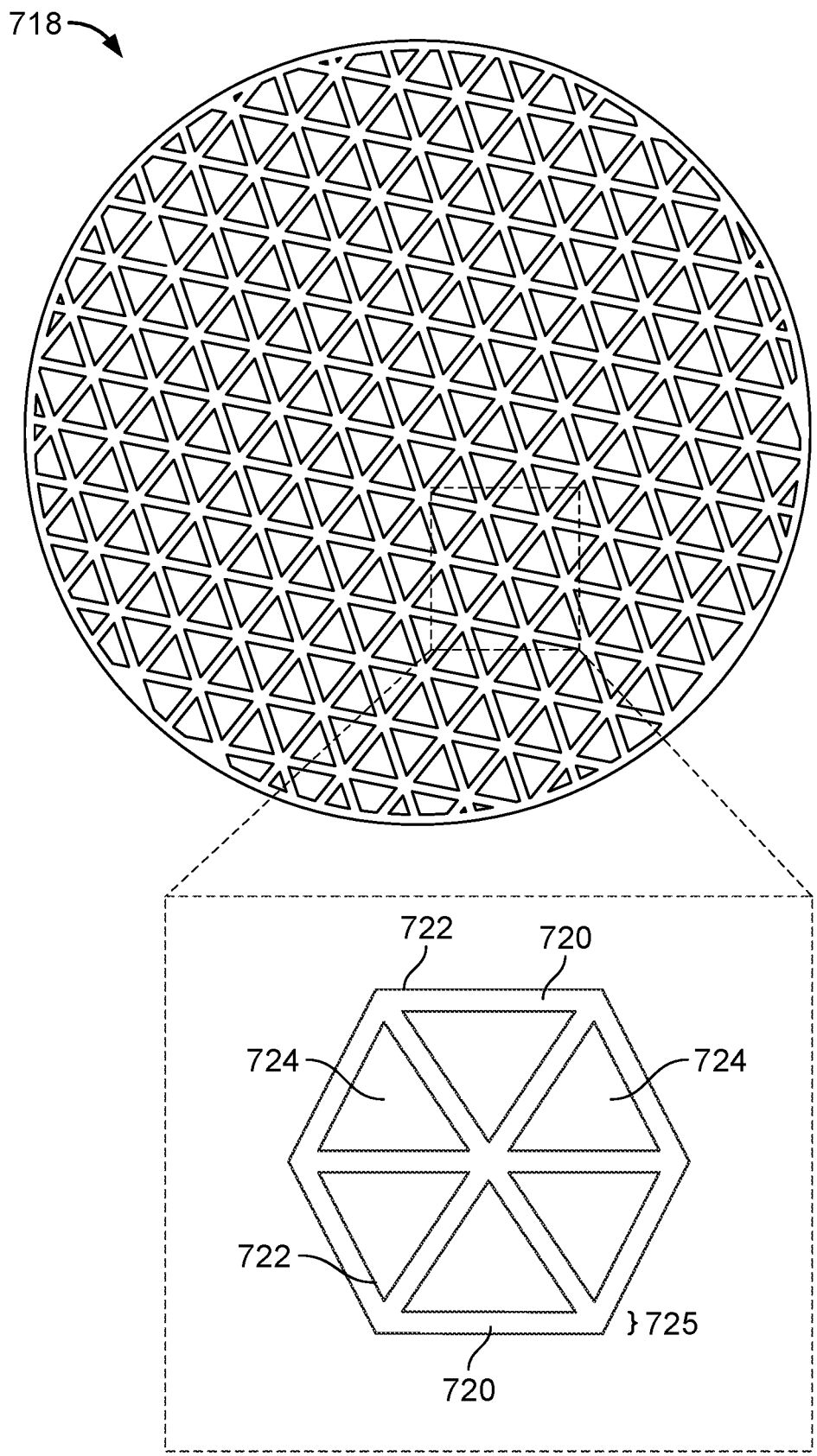

In some implementations, as shown in FIG. 7B, the catalyst bed 718 includes a monolithic support 720 having many channels/holes (e.g., channels 724) coated by the catalyst 722, the liquid, liquid/gas, or gas (such as nitrous oxide) flowing through the channels. Shapes of the channels, in various implementations, include circular, square, triangular, and/or hexagonal, among other possible shapes. Because of the channels, a surface area of catalyst in contact with a flow path of the nitrous oxide is significantly increased, aiding in decomposition.

The monolithic support 720 is composed of one or more heat-resistant materials such as ceramics, e.g., any of the heat-resistant materials described throughout in this disclosure. For example, mullite has a crystal structure that remains more constant with changing temperature compared to some other possible materials, such as alumina. Accordingly, the surface area change, with increasing temperature, for catalysts coating the mullite can be less than when using alternative monolithic support materials. In some implementations, the monolithic support 720 is composed of one or more heat-resistant metals, such as iron, chromium, aluminum, rare metals, stainless steel (e.g., austenitic stainless steel), or a combination thereof. For example, the monolithic support 720 can be composed of a refractory metal such as niobium, molybdenum, tantalum, tungsten, and/or rhenium.

In some implementations, to make the monolithic support 720, a heat-resistant material in paste form (e.g., a metallic paste, a ceramic paste, or a metal/ceramic paste) is extruded through a die such as a honeycomb die, the die creating the channels/holes in the heat-resistant material. The heat-resistant material is solidified and, if necessary, sliced in cross-section to form the monolithic support 720. The monolithic support is then coated with the catalyst 722, e.g., by wash-coating, immersion, deposition, wet impregnation, precipitation, colloidal coating, and/or slurry coating. Dimensions of the monolithic support 720 and catalyst 722 can vary in various implementations.

Although many monolithic supports are fabricated by extrusion, in some implementations additive manufacturing of the monolithic support or other portions of the catalyst bed (e.g., the entire catalyst bed) allows for catalyst bed geometries that would be impractical or impossible to produce using conventional methods. Additive manufacturing (also referred to as 3D printing or freeform fabrication) refers to the process of joining materials to make objects, e.g., from 3D model data, as opposed to subtractive manufacturing methodologies such as extrusion. These additively-manufactured structures are typically fabricated layer by layer. For example, in various implementations, catalyst bed structures can be fabricated by fused deposition, stereolithography, selective laser or electron-beam sintering, powder bed printing, and/or inkjet printing.

These geometries can result in various improvements. First, these geometries can provide improved specific surface area. Catalytic activity is directly related to catalyst surface area; because catalyst coats the monolithic support (e.g., channels defined by/in the monolithic support), catalytic activity accordingly is directly related to monolithic support surface area. For a given catalyst bed geometry, simply lengthening the catalyst bed provides increased surface area, but this comes at the cost of additional mass and volume. In some cases, a more useful parameter is the specific surface area (the surface area per unit mass) of a given catalyst bed/monolithic support geometry. The geometries described in this disclosure, which can be obtained using additive manufacturing, can provide increased specific surface area.

Second, increased residence time of the nitrous oxide interacting with the catalyst leads to correspondingly increased catalytic decomposition. The geometries described in this disclosure (e.g., a series of channels that swirl at least partially circumferentially) can provide increased residence times, in some implementations without significantly-increased mass and/or volume of the monolithic support.

Third, in some implementations it can be desirable for the pressure drop of nitrous oxide passing through the catalyst bed to be low, e.g., less than a target pressure drop. This target pressure drop can vary in different cases, for example, depending on the pressure in the nitrous oxide supply tank. The catalyst bed geometries described in this disclosure can provide reduced pressure drop, helping achieve the target pressure drop and/or allowing for variation in other reactor parameters, such as the tank pressure.

Fourth, the geometries described in this disclosure can provide improved catalyst bed thermal properties, such as decreased thermal mass. Catalyst beds with high thermal mass require additional energy to heat to a target temperature, such as a target temperature to initiate catalytic decomposition. Because the geometries described herein can provide the same catalyzing effectiveness with a reduced mass, thermal management of the catalyst bed can be correspondingly made easier. For example, a length of time needed to heat the catalyst bed to a target temperature from a cold state can be correspondingly reduced.

Catalyst bed loading (mass flow rate of nitrous oxide flowing into the catalyst bed, divided by the cross-section area of the catalyst bed) is a parameter that can guide catalyst bed design. For a given catalyst bed, if the flow rate is increased beyond what the catalyst bed can support (e.g., can catalyze), then poor conversion efficiencies can result, leading to reduced energy output and possible quenching of the reactor. Supported catalyst bed loading is closely tied to other parameters of the catalyst bed, such as catalyst composition, flow residence time, specific surface area, and catalyst bed length. The catalyst bed geometries described in this disclosure, such as the example catalyst bed geometries shown in FIGS. 7C and 7E-7G (in some implementations fabricated using additive manufacturing), can provide increased supported catalyst bed loading, which can allow for (i) increased flow rates for a given catalyst bed size/mass, e.g., to support stronger combustion through increased provision of oxidants, and/or (ii) more space/mass effective reactors, e.g., smaller reactors that can support catalyst bed loadings that otherwise would require larger reactors. This can make these catalyst bed geometries more useful for any system in which space/mass is a consideration, such as flight systems in which reducing inert mass provides improvements in system performance. These catalyst bed geometries can be included in any of the catalyst bed geometries shown/disclosed herein.

Also, additive manufacturing can allow for increased flexibility in overall catalyst bed shape. Catalyst beds with non-standard form factors can be fabricated in order to adhere to application-specific shape requirements. For example, additively-manufactured catalyst beds can be dome-shaped or have annular channels to meet the space constraints of a given system.

Figure 7C:
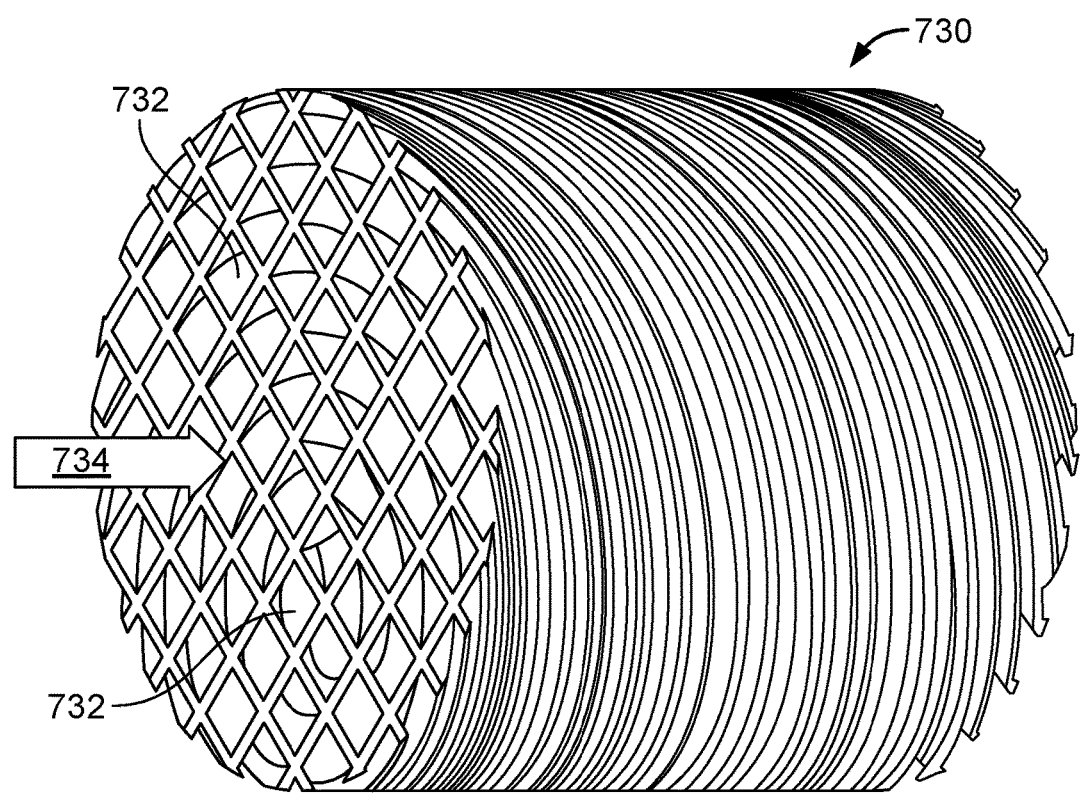

For example, as shown in FIG. 7C, in some implementations a monolithic support 730 defines channels (e.g., channels 732) that are at least partially non-axially oriented, e.g., at least partially oriented non-parallel to an overall flow direction of nitrous oxide through the channels. For example, the channels can be at least partially circumferentially oriented. One or more catalysts (not shown) coat the monolithic support 730. In this example, the channels twist partially circumferentially with respect to an overall flow direction 734 of the nitrous oxide (the axial direction). This increases the length of the flow path (and consequently the residence time) for the nitrous oxide through the catalyst bed, for more complete decomposition through increased interaction with the catalyst. The twisting channels would be difficult or impossible to fabricate using standard monolithic support manufacturing methods such as extrusion.

Figure 7D:
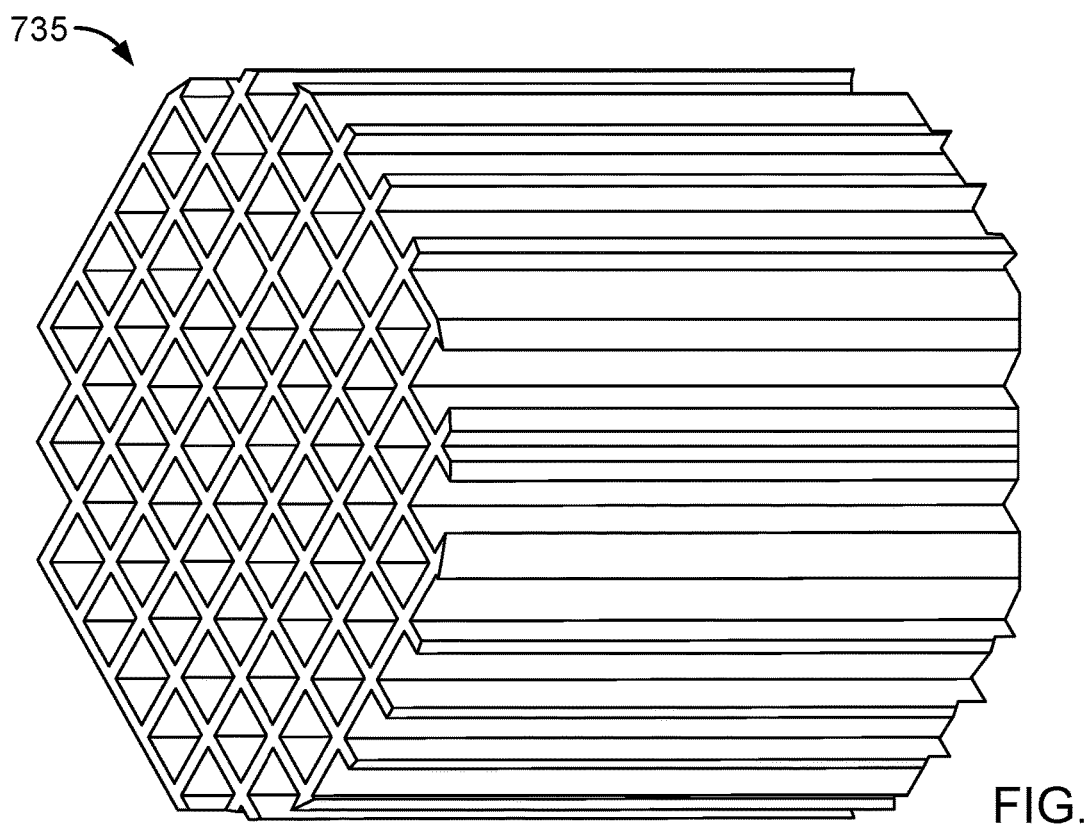

For comparison, note that cross-sections along the monolithic support 730 result from revolving the template cross-section of an alternative monolithic support 735, shown in FIG. 7D, along the catalyst bed length. The alternative monolithic support 735 can be fabricated by standard extrusion methods. Although monolithic support 730 and monolithic support 735 occupy the same volume or substantially the same volume, have the same mass or substantially the same mass, and have the same cross-sectional geometry (discounting rotation/revolution), the monolithic support 730 has 2-4 times the surface area as the monolithic support 735, depending on revolution pitch. This provides significantly increased nitrous oxide residence time. Alternatively, or in addition, a mass/volume of the monolithic support (e.g., a length of the monolithic support) can be reduced compared to the monolithic support 735, while maintaining the same or higher decomposition effectiveness as the monolithic support 735.

Figure 7E:
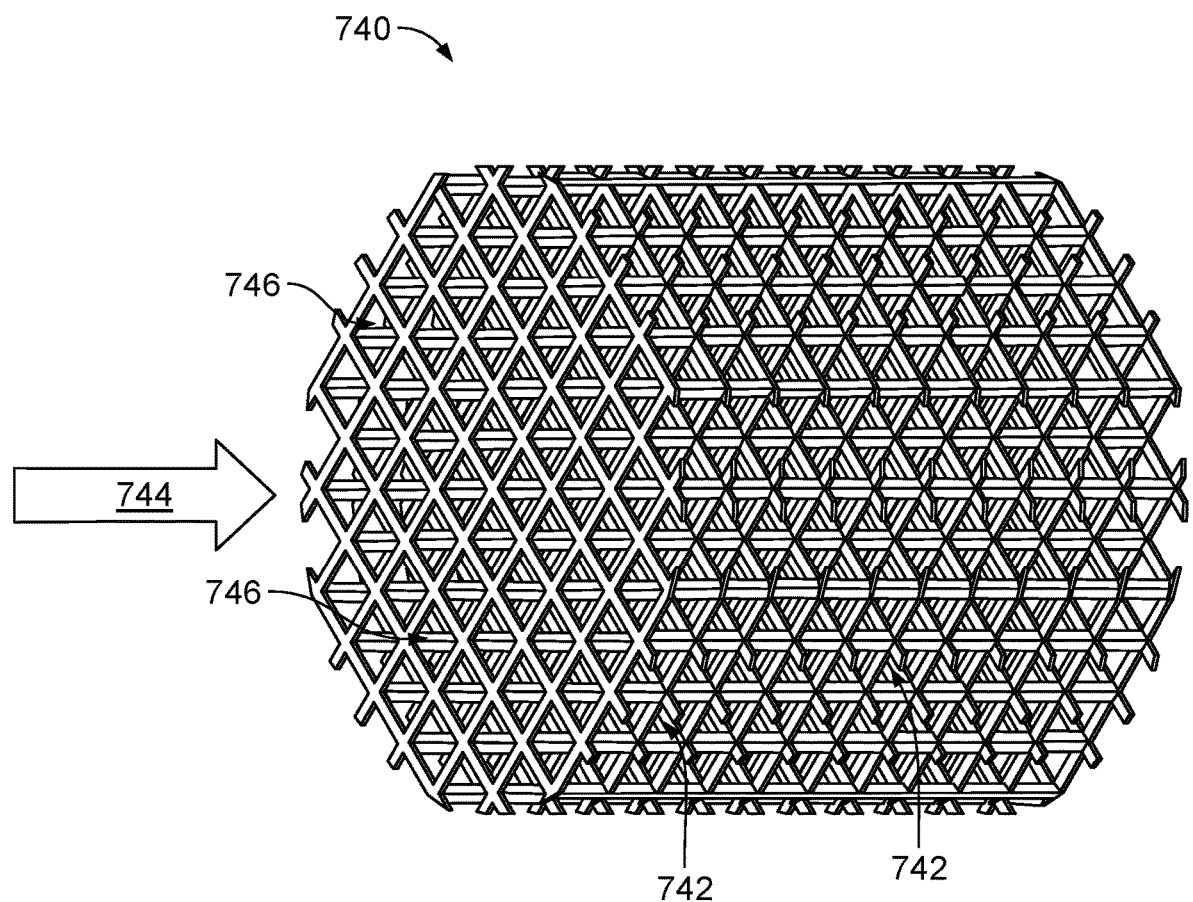

As another example, as shown in FIG. 7E, in some implementations a monolithic support 740 includes radial channels (e.g., radial channels 742) that are oriented transverse to an overall flow direction 744 of the nitrous oxide. One or more catalysts (not shown) coat the monolithic support 740. In this example, the monolithic support 740 also includes axial channels (e.g., axial channels 746), defined by gaps in the monolithic support 740, that are oriented parallel to the overall flow direction 744. The monolithic support 740 accordingly has an open cell structure, sometimes referred to as a foam-like structure. In various implementations, channels of additively-manufactured catalyst beds can be oriented in any arbitrary direction or combination of directions.

The open cell structure (e.g., the inclusion of channels extending in multiple directions) increases a surface area of the catalyst coating (e.g., relative to a structure having a channels extending along only a single direction, such as the honeycomb structure of FIG. 7D), for more complete decomposition through increased interaction with the catalyst. Also, the removal of channel walls compared to a standard extruded honeycomb catalyst bed can result in a more dynamic flow field, again promoting decomposition. Additionally, the overall surface area of the catalyst can be maintained or increased while the total mass of the monolithic support is reduced, because channel walls have been removed compared to in the standard extruded honeycomb catalyst bed, reducing the total mass of the catalyst bed.

The open cell lattice structure of the monolithic support 740 can be manufactured additively but, in some cases, would be difficult or impossible to fabricate using standard manufacturing methods such as extrusion. In some implementations, an open-cell lattice structure, or another additively-manufactured lattice structure as described herein, is itself composed of one or more catalysts, such as reactive metals, without the necessity for an underlying non-catalytic monolithic support. The catalytic lattice can be manufactured additively. Nitrous oxide contacting the catalytic lattice has its decomposition catalyzed.

Various types of additively-manufactured lattice structure are within the scope of this disclosure for use as the monolithic support on which a catalyst is coated, and/or for use as a structure formed of the catalyst itself. Some implementations include a strut/beam-based lattice having unit cells formed of beams/struts arranged in a generally repeating geometry (in some cases with varying lattice parameters across the monolithic support, as described in further detail below). Non-limiting examples of such lattices include body/face center cubic, diamond, octet, Kelvin cell, and Weaire-Phelan.

Some implementations include a surface/sheet-based lattice. Examples of such lattices includes lattices having a geometry defined through an implicit mathematical formula. For example, in a gyroid lattice, the surface is defined by the equation $\sin(x)\cos(y)+\sin(y)\cos(z)+\sin(z)\cos(x)=0$. Other examples of surface/sheet-based lattices include Lidinoid and SplitP geometries. Gyroid, Lidinoid, and SplitP geometries are examples of triply periodic minimal surface (TPMS) geometries, which in some cases are high surface area structures providing a high surface area-to-volume ratio and/or a high specific surface area. Other TPMS and/or high surface area geometries are also within the scope of this disclosure.

Some implementations include a stochastic lattice having a random or pseudo-random geometry, e.g., a non-periodic geometry. The geometry of such lattices can be formed by beams/struts as described in reference to strut/beam-based lattices. Some implementations of stochastic lattices have an open-cell foam structure.

Figure 7F:
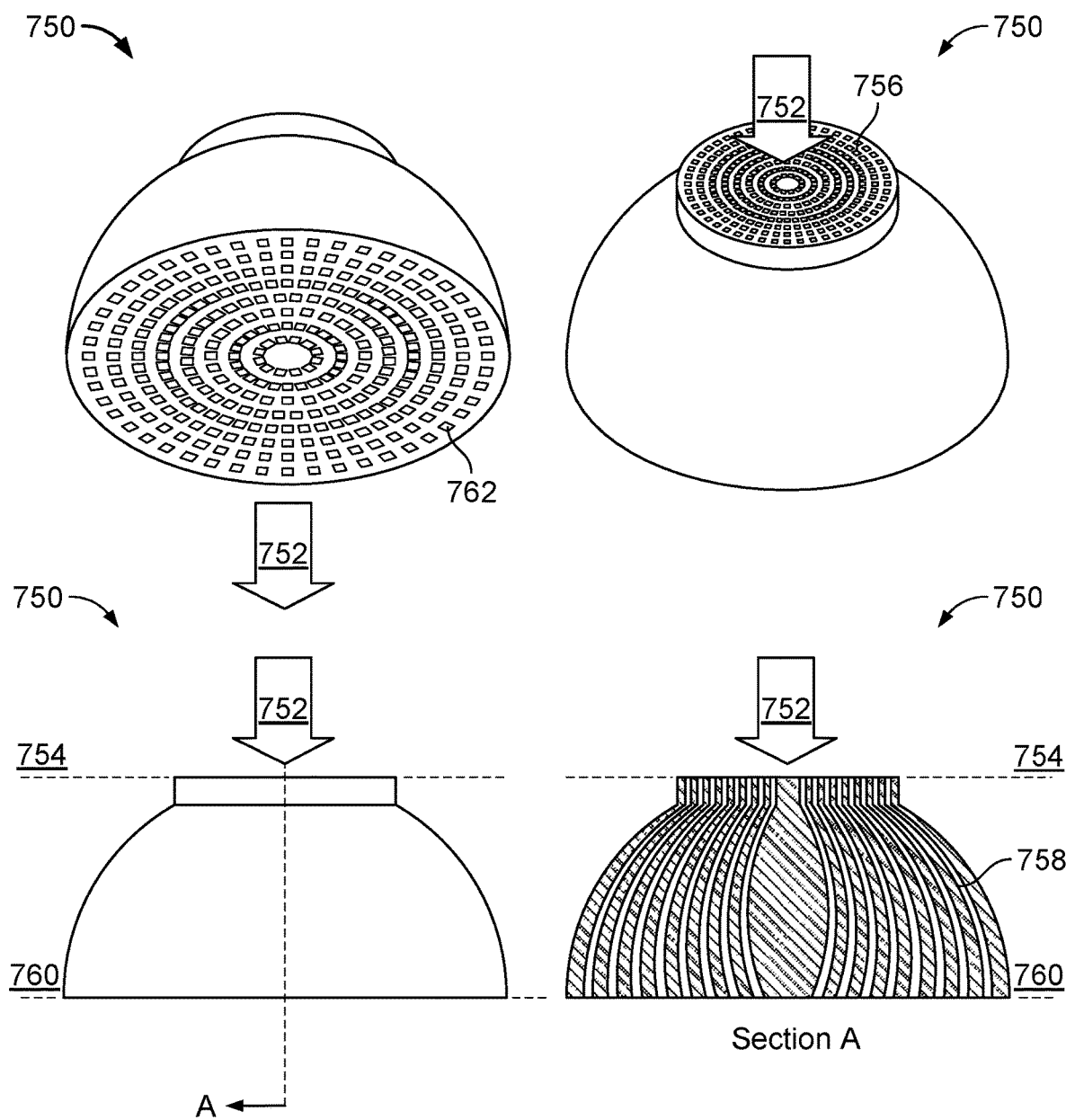

As another example of catalyst bed geometries facilitated by additive manufacturing, as shown in various views in FIG. 7F, a monolithic support 750 has an overall dome shape. Along an overall flow path 752, nitrous oxide enters the monolithic support 750 at a first plane 754 having multiple channel entrance ports 756, travels through channels 758, and exits the monolithic support 750 at a second plane 760 having multiple channel exit ports 762. A density of entrance ports 756 at the first plane 754 is greater than a density of exit ports 762 at the second plane 760. Within the monolithic support 750, the channels 758 fan out at least partially radially with respect to an axial direction that is aligned with the overall flow path 752; the channels 758 are oriented at least partially in a non-axial direction. The dome shape of the monolithic support 750 allows the monolithic support 750 to be compatible with systems having geometries incompatible with more standard cylindrical monolithic supports. In addition, the curved paths of the channels 758 provide increased effective path length and residence time of nitrous oxide passing through the channels 758 compared to an alternative straight-line path, improving nitrous oxide decomposition.

Figure 7G:
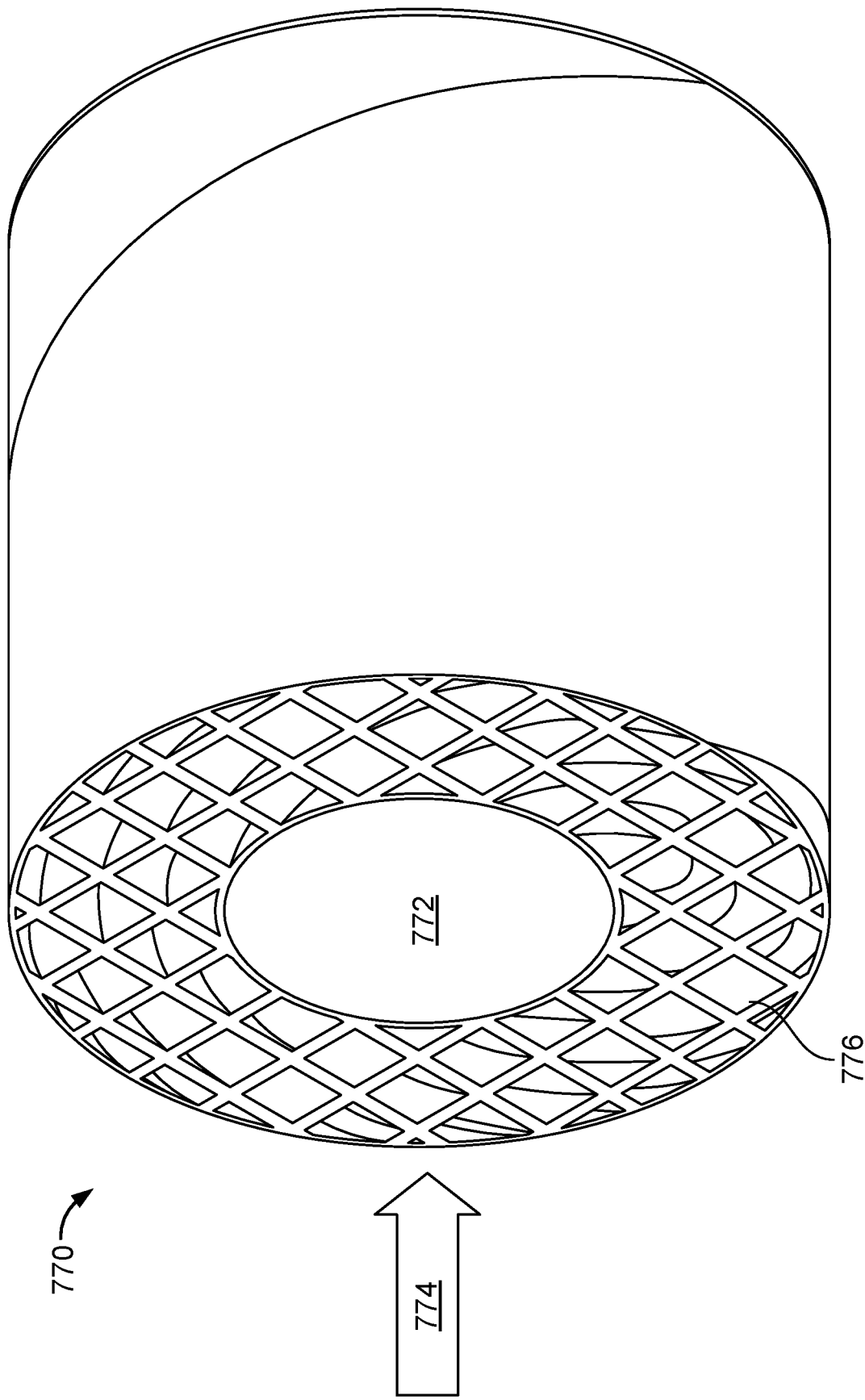

As another example of catalyst bed geometries facilitated by additive manufacturing, as shown in FIG. 7G, a monolithic support 770 defines a port 772 extending along an axial direction of the monolithic support 770, the axial direction aligned with an overall flow direction 774. Channels 776 extend at least partially annularly around the port 772 with a swirling trajectory. Cross-sections along at least part of the monolithic support 770 result from revolving a constant template cross-section along the catalyst bed length. These swirling, annular channels 776 provide increased nitrous oxide residence time for the same monolithic support length and, accordingly, improved decomposition. An interior of the port 772 can be occupied by other components, allowing for more flexible design of systems in which the monolithic support 770 is integrated.

Moreover, additive manufacturing can facilitate improved catalyst beds even when the catalyst bed does not feature channels oriented at least partially non-parallel to an overall flow direction of fluid flow, e.g., as shown in FIG. 7B. For example, in some cases, additive manufacturing can allow for dimensions of a geometry of the catalyst bed that would be infeasible using non-additive methods, such as extrusion. For example, as shown in FIG. 7B, in some implementations a dimension 725 of a wall of the monolithic support 720 (e.g., a width of a sidewall that separates two channels 724 from one-another) can have a small value that would be infeasible using extrusion, for example, less than 0.1 mm, e.g., between 0.05 and 0.1 mm. In some implementations, this and/or other additively-manufactured geometries can facilitate high channel densities, e.g., a cross-sectional channel density of at least 200 per $cm^2$ or at least 300 per $cm^2$ (in some implementations, less than 400 or less than 500 per $cm^2$). Based on these and/or other dimensions facilitated by additive manufacturing, some implementations of a catalyst bed according to the present disclosure can have a high surface area even in the absence of channels oriented at least partially non-parallel to an overall flow direction of fluid flow. These dimensions can also apply to dimensions of the other monolithic supports described herein. However, these are example dimensions; other implementations according to this disclosure can have other dimensions.

In some implementations, the geometry of the monolithic support changes across different portions of the monolithic support. FIG. 7F illustrates an example of such a monolithic support: the spatial density and orientations of the channels 758 change along the direction of the overall flow path 752. Examples of geometric parameters that can be different in different regions of the monolithic support include: channel/opening density (e.g., density of channels/openings in a cross-sectional area of the monolithic support, such as a cross-sectional area in a plane perpendicular to an overall flow direction of fluid or a plane parallel to the overall flow direction of fluid); geometry of each channel/opening (e.g., a shape and/or dimension (e.g., diameter or width) of the cross-section of each channel/opening); wall thickness (e.g., dimension 725); type of lattice/structure; and/or channel extension direction, for example, to have curved channels. Any one or more of these geometric parameters can vary, for example, axially (e.g., parallel to the overall flow direction), radially (e.g., perpendicular to the overall flow direction), and/or in another direction or combination of directions. The density of a lattice that forms the monolithic support can vary across different portions of the lattice, for example, to have larger or smaller unit cells and/or larger or smaller periodic or quasi-periodic structures. In some implementations, the geometry is uniform throughout the monolithic support.

In another example of an additively-manufactured monolithic support having a varying geometry, the monolithic support has a structure (e.g., a honeycomb structure or a lattice structure) in which a first end (e.g., a first end along the direction of fluid flow) has thicker walls and, correspondingly, smaller channel diameters, and in which the wall thickness tapers gradually from the first end to the second, opposite end, resulting in thinner walls and larger channel diameters at the second end. Varying monolithic support geometry can provide catalyst beds that promote, for example, increased residence time, lower pressure drops for fluid passage through the catalyst beds, increased fluid decomposition, and/or improved spatial efficiency, e.g., by allowing the catalyst bed to be better optimized for the fluid conditions at each location in the catalyst bed.

In addition, or alternatively, in some implementations, a composition of the monolithic support (or a composition of a catalyst in the case where the catalyst forms the body of the catalyst bed, as described below) varies across the catalyst bed. For example, in some implementations, different material(s) can be used at different locations in the monolithic support, and/or relative concentration(s) of material(s) can be different at different locations in the catalyst bed. For example, a first material with a lower high-temperature limit, but capable of being formed into very narrow portions to support high channel density, can be used in a first portion of the catalyst bed, while a second material with a higher high-temperature limit but poorer structural strength (corresponding to decreased channel density) can be used in a second portion of the catalyst bed, to optimize for overall increased fluid decomposition and/or another objective.

The geometry and/or composition of the monolithic support can change gradually, e.g., to provide graded lattice geometry (e.g., wall thickness, unit cell spacing and/or size, etc.,) and/or graded material composition. In some implementations, the geometry and/or composition change abruptly, e.g., with adjoining section(s) of the monolithic support having significantly different geometry and/or composition.

Varying geometry and/or composition of the monolithic support can be facilitated by additive manufacturing. For example, using additive manufacturing, varying geometry can be provided by altering the layer-by-layer fabrication of the monolithic support. In addition, using additive manufacturing, varying composition can be provided by altering the composition of a slurry, powder, etc., that forms a given layer in the layer-by-layer fabrication. In some cases, the obtained varied geometry and/or composition may be incompatible with, or prohibitively difficult to obtain using, non-additive manufacturing techniques, such as extrusion, for the materials and/or geometries used for catalyst beds.

Note that, although this disclosure describes various "monolithic" supports, in some cases catalysis supports can be formed from multiple bodies. For example, multiple separate bodies can be fabricated (e.g., using additive manufacturing and/other manufacturing methods), and the separate bodies can be combined (e.g., adhered to one another) to provide an overall catalysis support. These multi-body supports can have any of the characteristics that, in this disclosure, are illustrated/described in the context of monolithic supports.

Moreover, any of the geometries, dimensions, and properties described herein for monolithic supports for catalyst beds—such as the geometries illustrated in FIGS. 7A-7G, varying geometries for different portions of the catalyst bed, and/or varying composition—can, in some implementations, be formed of one or more catalyst materials themselves, rather than being used for a monolithic support (e.g., a non-catalytic monolithic support) coated in a catalyst. The catalyst material can form the primary body of the catalyst bed. Forming the body of the catalyst bed from one or more catalyst materials can reduce or eliminate the requirement to perform a coating process, as the body of the catalyst bed—e.g., an additively-manufactured body—is already catalytic in the absence of further coating. For example, catalytic metals as described above (e.g., a platinum group metal) can be additively manufactured into the catalyst bed structures described herein.

Figure 7H:
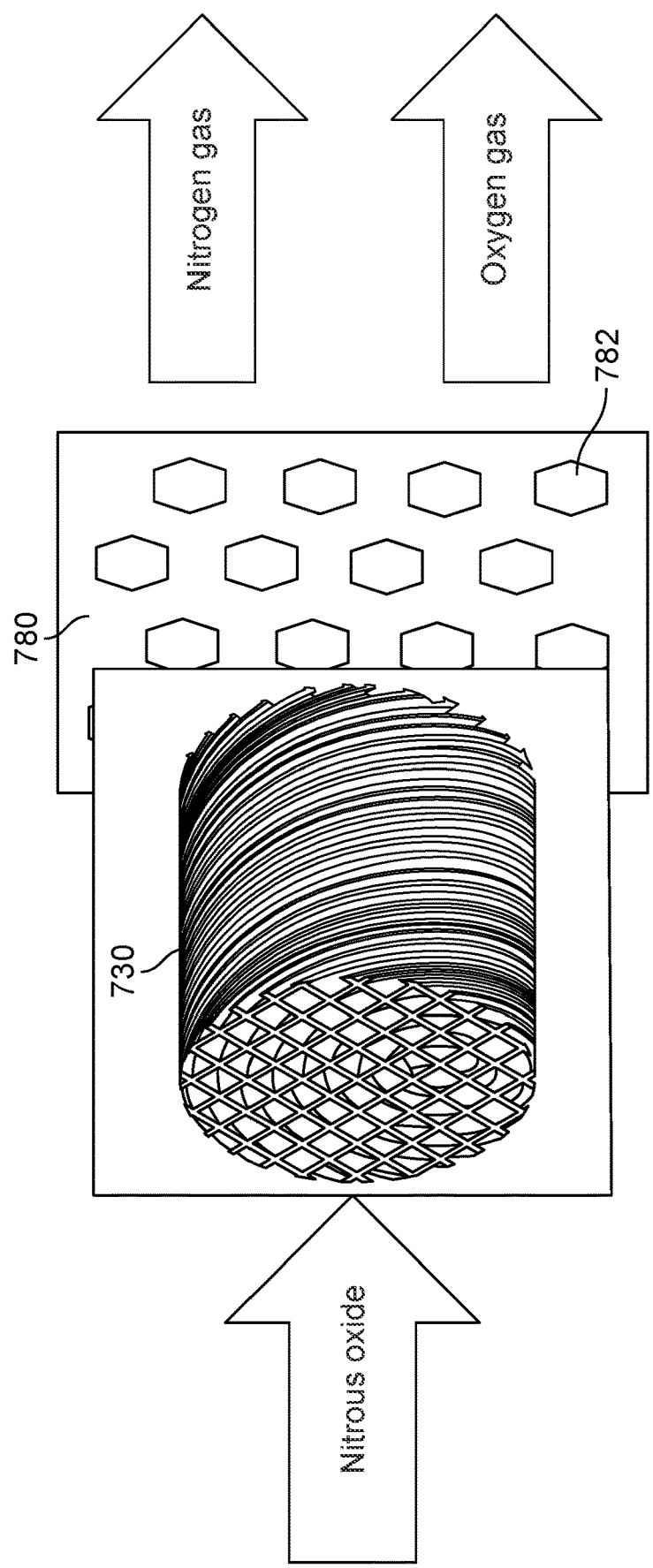

FIG. 7H shows a support plate 780 attached to the monolithic support 730, which is coated in one or more catalysts (not shown), or otherwise exposes one or more catalysts, to form a catalyst bed. The support plate 780 can be included in any of the catalyst bed implementations described in this disclosure to reduce or prevents shifting of the catalyst bed in the reactor. For example, the support plate 780 can be attached to both the catalyst bed and to walls of the reactor. In this example, the support plate 780 itself includes a series of holes 782 through which gas products of the decomposition pass, to better distribute the gases over a diameter of the reactor as described in reference to the distribution plate 600. In some implementations, a separate distribution plate, not necessarily integrated into a support plate, is included after the catalyst bed in the liquid, liquid/gas, or gas flow path so as to serve the same function. The support plate 780, because it experiences high temperatures from the catalyst bed, is composed of a heat-resistant material as described for the catalyst bed support 706.

Figure 21:
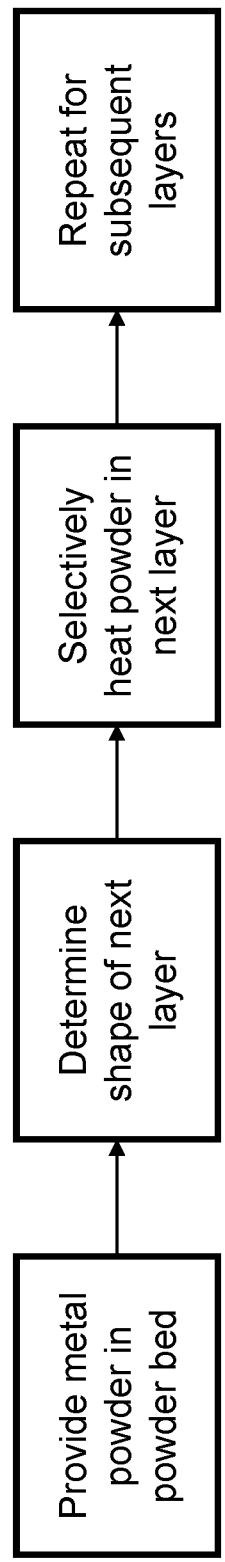
FIG. 21 is a diagram illustrating an example process for additive manufacturing of catalyst bed structures.

The catalyst bed structures described with respect to FIGS. 7A-7H can be included in any implementation according to this disclosure that includes one or more catalyst beds, such as the systems of FIGS. 1, 9, 10, 11, 13, 16, 17, and/or 19A-19B, and/or can be included in conjunction with any of the systems described in this disclosure that are associated with gaseous decomposition products, such as the systems of FIGS. 14A-14B, 15, 18A-18B, and/or 19A-19B, The additive manufacturing used in some implementations to fabricate the catalyst beds can take various forms. As shown in FIG. 21, in some implementations, when the catalyst bed structure is formed from a metal (either as a support structure on which a catalyst is coated, or with a metal catalyst itself being formed into the shape of a support structure, such as a lattice or channeled body), the metal is made into a fine powder consistency. The metal powder is provide into a powder bed. Layer-by-layer, a control system determines a shape of the next layer, and the control system controls a laser or an electron beam to selectively heat appropriate locations in each layer to produce a solidified, fused cross-section. As this process is repeated for multiple layers, an overall three-dimensional structure is fabricated. If the metal is itself a catalyst (e.g., rhodium or ruthenium), then the structure can be used directly for catalysis.

Figure 22A:
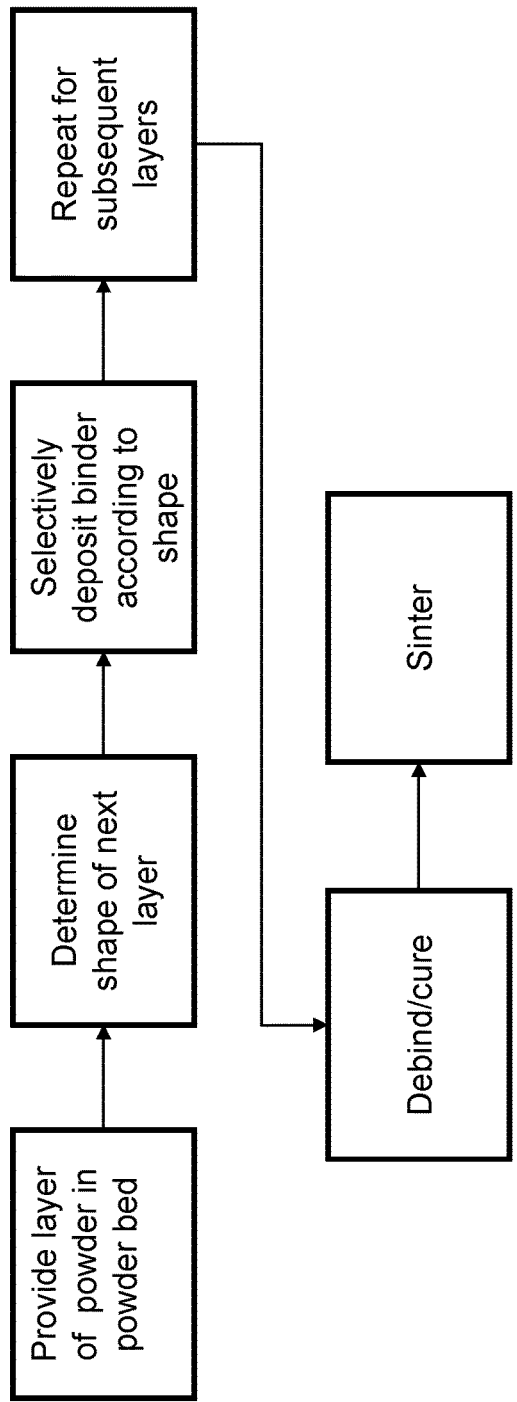
FIGS. 22A-22B are diagrams illustrating example processes for additive manufacturing of catalyst bed structures.

In some implementations, catalyst beds are fabricated using powder bed binder-jetting or a resin-based stereolithography/digital light projection-based process. In the case of powder bed binder-jetting, as shown in FIG. 22A, a ceramic (e.g., alumina or mullite), a metal (e.g., a refractory metal or another temperature-resistant metal), or a metal-ceramic mixture is made into a fine powder consistency. A layer of the powder is provided into a powder bed. An adhesive/polymer binder is deposited selectively in a determined cross-sectional shape onto the powder to provide structure, e.g., using an inkjet printer. After each layer, a dispenser deposits a fresh powder layer. After completion of printing, the printed structure undergoes a debinding/curing process in which the binder is pyrolized/burnt out of the structure (e.g., at an elevated temperature), leaving raw ceramic, metal, or metal-ceramic material behind. To increase the density of the structure, the structure (with binder removed) is sintered. The ceramic, metal, or hybrid metal-ceramic structure can then be coated with a catalyst as described above.

Figure 22B:
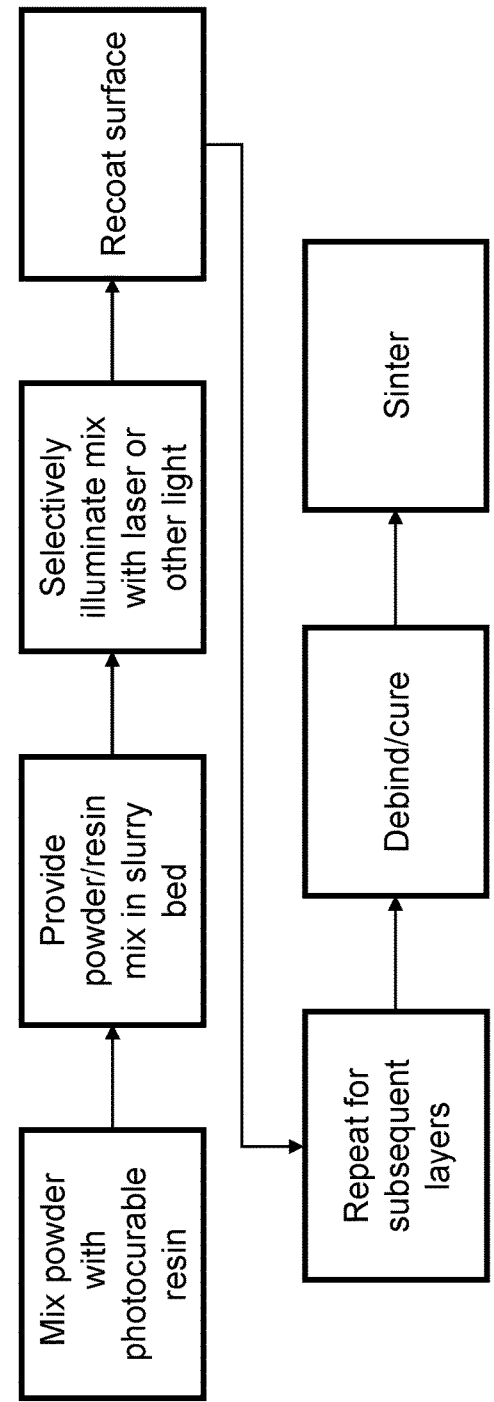

In the case of resin-based printing, as shown in FIG. 22B, the ceramic, metal, or metal-ceramic powder is mixed with a photocurable resin to produce a slurry. The slurry is provided into a slurry bed, and a laser or other light source is used to selectively illuminate the slurry in a determined cross-sectional shape. For example, the laser can selectively scan across a surface of the slurry, or a light projector can illuminate the shape in a simultaneous flash. Photo-reactive compounds in the resin react with the light to locally cure the resin in the desired shape. A wiper is swept across a surface of the slurry to provide a fresh coating, and the process repeats layer-by-layer. Post-processing to remove the resin and densify the metal, ceramic, or metal-ceramic can be performed as described in reference to FIG. 22A.

In some implementations, catalyst beds are fabricated using a directed energy deposition process. A source of material (e.g., a metal powder or a metal wire) is deposited onto surfaces of an existing structure, and the material is heated (e.g., by a laser, electron beam or plasma arc) to attach to the existing structure and build the structure layer-by-layer. For example, in some implementations, the metal is a catalyst material, and the formed structure is a body of a catalyst bed, the catalyst itself forming the body.

In implementations in which the catalyst is a coating on a monolithic support structure (e.g., as opposed to itself being the body of the structure of the catalyst bed), a catalyst layer can be added to the structure, such as by wash/dip coating (e.g., a slurry dip method), electroplating/electrodeposition, and/or chemical/physical vapor deposition. In some implementations, when electroplating/electrodeposition and/or chemical/physical vapor deposition is used, the metal of the support structure is a metal that can withstand high temperature oxidizing environments, such as a refractory metal.

Catalyst beds formed by additive manufacturing, as described herein, can be used in the contexts described in detail herein (e.g., in decomposition reactors for vehicles and other systems) and in other contexts. The catalyst beds can be used, for example, in any context in which a hot gas stream of decomposition products can be used. For example, the catalyst beds can be included in systems that includes turbines to generate hot gas streams for turbine jump-starting, e.g., for jet engines. For example, any of the systems described herein can include a turbine arranged to receive at least one decomposition gas to assist in jump-starting. Accordingly, the catalyst beds themselves are within the scope of this disclosure, even when not integrated into a larger system.

Moreover, as noted above, catalyst beds formed by additive manufacturing are not limited to catalyst beds including catalyst(s) for nitrous oxide but, rather, can be configured to catalyze decomposition of other or additional fluids as well, such as $H_2O_2$, $N_2H_4$, and/or ADN. The catalysts described above in reference to $N_2O$, such as materials including one or more platinum group elements, may, in some implementations, be included in catalyst beds for catalysis of these or other fluids. In some implementations, another type of catalyst may be used. For example, $H_2O_2$ decomposition can be catalyzed using a metal oxide, such as manganese oxide, and/or a metal, such as silver; $N_2H_4$ decomposition can be catalyzed by nickel; and ADN decomposition can be catalyzed by copper oxide compounds, to give several non-limiting examples.

In some implementations, to adapt the catalyst bed to various different decomposable fluids, one or more materials of the catalysis bed are selected for compatibility with temperatures associated with the decomposition. For example, when the catalyst bed includes a monolithic support, the monolithic support material(s) can be selected to be resistant to temperatures of the decomposition reaction, which can vary for different decomposing fluids.

Figure 8:
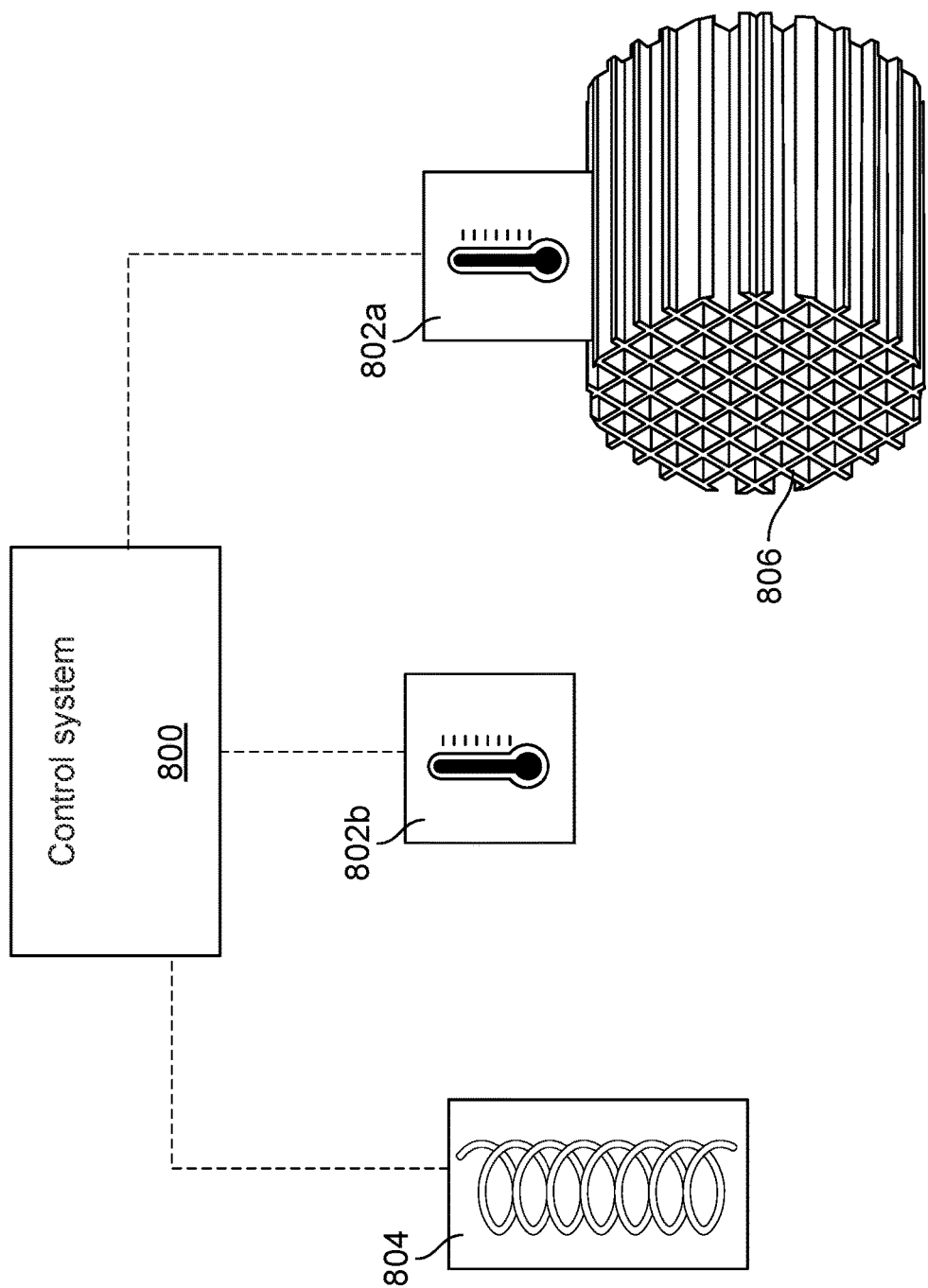
FIG. 8 is a diagram illustrating an example of temperature sensing and control.

As noted in reference to FIG. 5, in the presence of a catalyst, the decomposition temperature of nitrous oxide is reduced, e.g., to 300° C.-400° C. When the reactor is initially started up, a heating element can be used to heat the nitrous oxide enough to begin decomposition. However, because the oxygen gas and nitrogen gas-producing decomposition reaction is exothermic, decomposition in the presence of a catalyst heats up the catalyst bed and eventually becomes self-sustaining, at which point it can become unnecessary to continue applying heat with the heating element. Accordingly, in some implementations, as shown in FIG. 8, a control system 800 is coupled (e.g., electrically coupled) to one or more temperature sensors 802a, 802b and to a heating element 804, such as the heating element 108 or any other heating element described herein. The control system 800 monitors one or more temperature of the reactor (e.g., an ambient temperature in the reactor measured by temperature sensor 802b, and/or a temperature of a catalyst bed 806 (e.g., any of the catalyst beds described in reference to FIGS. 7A-7H) measured by temperature sensor 802a) and, when the one or more temperatures satisfy a predetermined condition, disables the heating element 804, e.g., by halting current flow through the heating element 804. For example, the predetermined condition can include a threshold temperature above which the heating element 804 is disabled, the threshold temperature associated with a self-sustaining decomposition reaction. The control system 800 may instead or additionally adjust the flow rate of the fluid as well, e.g., increasing the flow rate in response to temperatures that indicate the self-sustaining decomposition reaction. In some implementations, the threshold temperature is between 300° C. and 400° C. Measurement of ambient temperature, instead of in addition to the temperature of the catalyst bed 806, can be useful because the ambient temperature relates to conversion of liquid nitrous oxide to gaseous nitrous oxide before interaction with the catalyst bed 806, to promote more complete decomposition.

In some implementations, one or more heating elements are included exterior to the outer walls of the catalytic reactor, e.g., external to the reactor walls 122. The heating elements can include, for example, band-style heaters (e.g., electrical band-style heaters). The heating elements can be operated (e.g., by control system 800 and/or control system 2000) to heat one or more elements of the catalytic reactor system to a desired temperature, e.g., an operating temperature of the elements. For example, the heating elements can be arranged in proximity to a catalyst bed (e.g., catalyst bed 806 or any other catalyst bed described herein), a nozzle (e.g., nozzle 908 or any other nozzle described herein), and/or another component, so as to heat the component.

The catalyst bed, in combination with high temperatures in the reactor, causes decomposition of the initial material (e.g., nitrous oxide) into gaseous products (e.g., nitrogen gas and oxygen gas). These gases can be utilized for one or more of various purposes corresponding to various other structures of the reactor and/or of a larger system in which the reactor is embedded. Several of these purposes and structures are described below.

Figure 9:
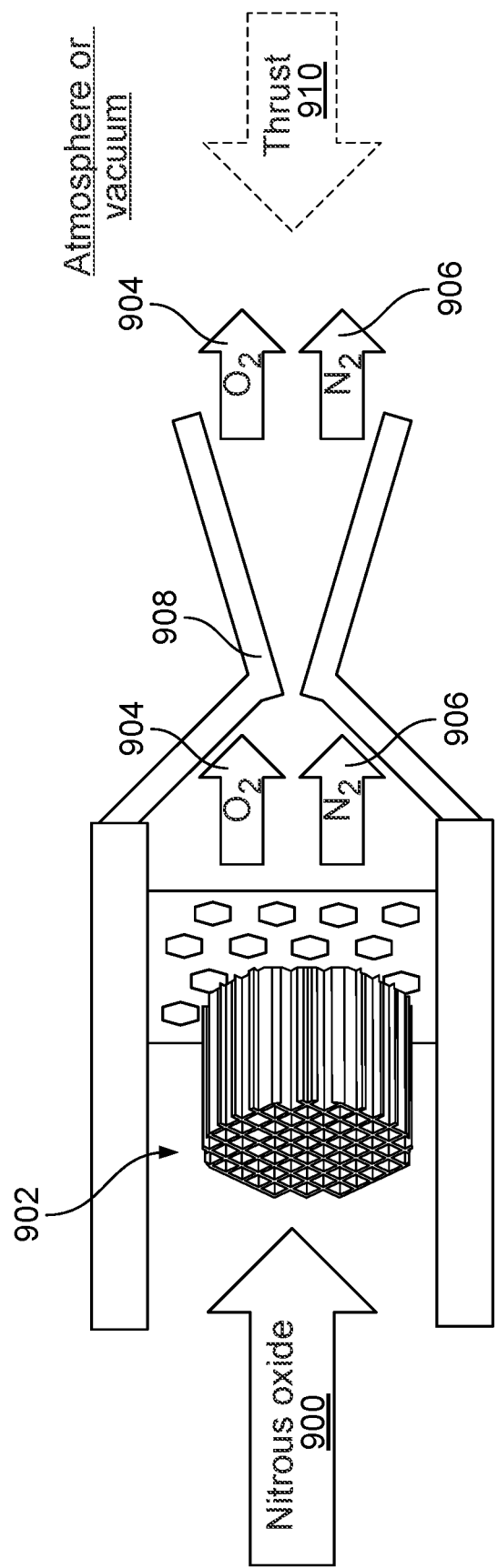
FIG. 9 is a diagram illustrating thrust using reaction products.

In some implementations, the gases are used in a hot gas propulsion system to deliver thrust. While the source of the gases is different from a conventional rocket engine (relatively simple decomposition versus a combustion reaction), the exploitation of the gases to provide thrust is similar in both cases. As shown in FIG. 9, nitrous oxide 900 is decomposed at a catalyst bed 902 to produce oxygen gas 904 and nitrogen gas 906. The gases 904, 906 pass through a nozzle 908 and produce a corresponding thrust 910. The catalytic decomposition reactor can be included in atmospheric planes, spacecraft, satellites, rockets, missiles, and other thrust-driven systems to provide powered motion using the thrust 910.

In this example, the nozzle 908 is a convergent-divergent nozzle that converts high-pressure low-velocity gases inside the reactor into low-pressure high-velocity (e.g., supersonic) gases outside the reactor. Other nozzle types are also within the scope of the disclosure, such as expansion-deflection nozzles, plug nozzles, aerospikes, and single-expansion ramp nozzles. In some implementations, the nozzle 908 is gimbaled or part of a Vernier-type thruster capable of providing thrust in multiple directions.

Figure 10:
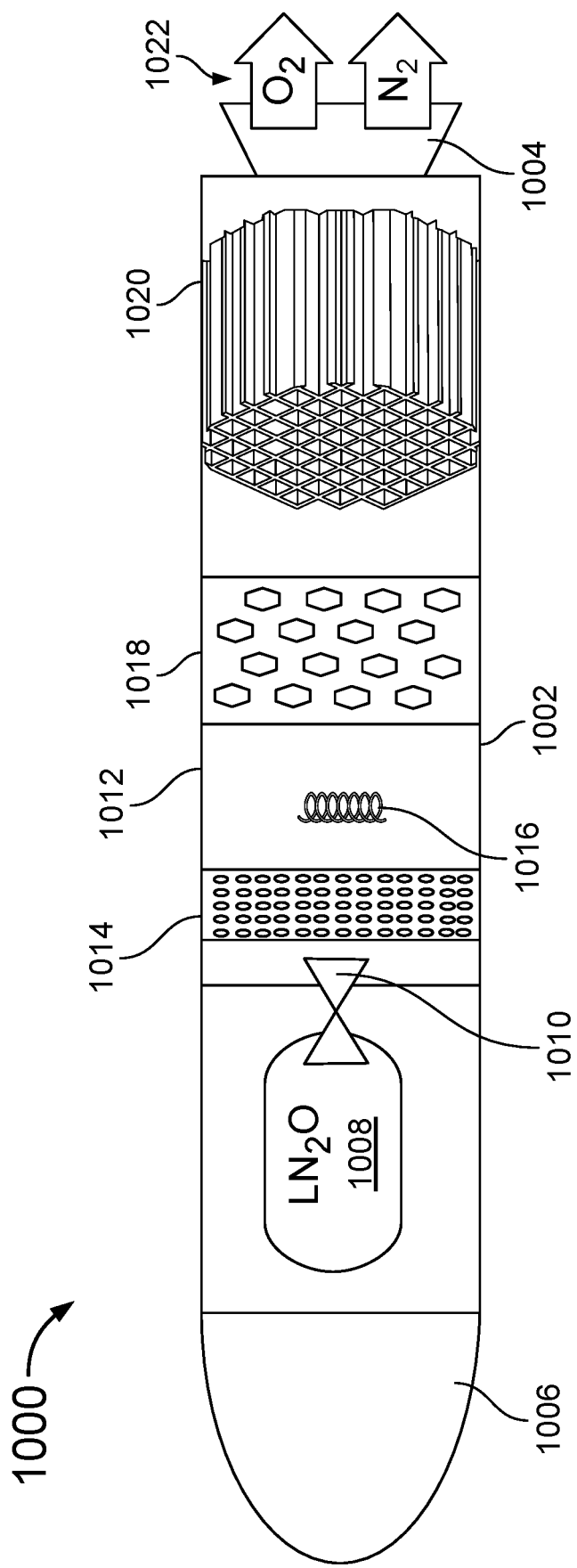
FIG. 10 is a diagram illustrating an example rocket.

As shown in FIG. 10, an example rocket 1000 (not shown to scale) generally includes a body 1002, a nozzle 1004 at one end of the body 1002, and a payload section 1006 at an opposite end. The body 1002 includes a nitrous oxide tank 1008 fluidically coupled, by a valve 1010, to a catalytic decomposition reactor 1012 in the body 1002. As described throughout this disclosure, the catalytic decomposition reactor 1012 includes an injector 1014, a heating element 1016, a distribution plate 1018, and a catalyst bed 1020. Gaseous products 1022 of the catalytic decomposition are directed out of the catalyst bed 1020 and through the nozzle 1004, driving the rocket 1000 forward. The rocket 1000 may include other elements (e.g., additional flow system components, instrumentation, etc.) not shown in this simplified system-level diagram. Elements of the rocket 1000 can have the characteristics described for corresponding elements throughout this disclosure, e.g., in reference at least to FIGS. 1-9.

In some implementations, the product gases are instead or additionally integrated into a thrust system such as a reaction control system (RCS) or a divert attitude control system (DACS). An RCS or DACS is capable of providing thrust in various directions, such as any desired direction or combination of directions, to provide attitude control and propulsion, e.g., stationkeeping in orbit, takeoff assistance, fine maneuvering, and/or orientation control. The RCS or DACS can also be used for divert maneuvers (e.g., roll/pitch/yaw) instead of or in addition to attitude control maneuvers. Although RCSs and DACSs can include adjustable thrusters (e.g., gimballed nozzles), more typically an RCS or DAC includes multiple fixed nozzles distributed throughout an aircraft or spacecraft that can be enabled or disabled in various combinations to obtain a desired overall thrust force. From an output side of the catalyst bed, the product gases can be distributed to one or more of these nozzles by appropriate configuration of pipes and valves. Some RCSs and DACSs are capable of providing torque to allow control of rotation (e.g., roll, pitch, and yaw).

In some embodiments, the product gases are used directly for the primary thrust of a vehicle, e.g., instead of or in addition to being used in a supplementary thrust system such as an RCS/DACS. A primary thrust system can include a nozzle through which the product gases are directed.

Instead of or in addition to being used independently for thrust, in some implementations one or more product gases are used for ignition of solid fuel grains. As described above, in a solid/hybrid rocket (or other vehicle) engine, a solid fuel grain is combined with an oxidizer and ignited to cause combustion and thrust. However, reliable and repeatable ignition presents possible challenges. Pyrotechnic ignitors such as zirconium-potassium perchlorate (ZPP) and boron-potassium nitrate (BKNO3) are reliable, but provide poor repeatability: a given ignition system will include a generally small fixed number of ignition charges that are depleted each time the engine is ignited. Spark ignitor systems, which create an electric arc across the solid fuel grain port to initiate ignition, can be used many times, but they are often associated with uneven regression (consumption of the solid fuel grain mass), which can lead to unpredictable thrust forces as the oxidizer/fuel reaction continues. Alternatively, one may use a self-igniting combination of fuel and oxidizer, but those combinations typically present toxicity and/or other safety risks. And, in terms of restart capabilities, some conventional engines can restart readily if the restart is performed soon after a previous burn ended (e.g., because the solid fuel grain mass is still hot enough to cause ignition by contact with the oxidizer), but cannot restart without stimulated re-ignition if the solid fuel grain mass has cooled down.

By contrast, gas products resulting from a catalyzed decomposition reaction, such as nitrogen gas and oxygen gas from nitrous oxide decomposition as described herein, can reliably aid solid fuel grain ignition/combustion, at least because the gas products are inherently hot because of their recent production in a decomposition reaction. Combustion can be restarted even when the solid fuel grain mass is initially cold, because the hot gases heat the solid fuel grain mass. Also, the gas products can be used for many engine restarts without needing replenishment, until the nitrous oxide supply runs out. Moreover, the gas products described herein are safer than conventional self-igniting compositions while being useful for other purposes, such as RCS/DACS thrusting and/or tank heating/pressurization.

Figure 11:
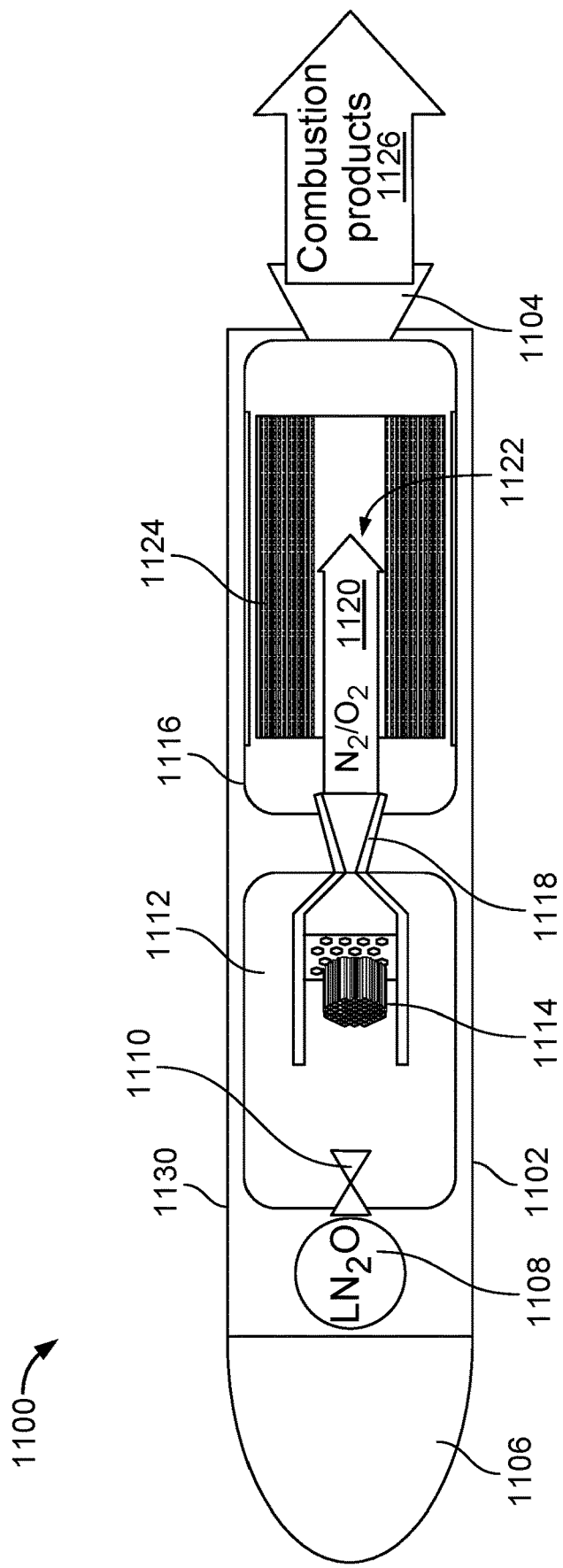
FIG. 11 is a diagram illustrating an example rocket with a combustion chamber.

For example, as shown in FIG. 11, an example rocket 1100 (not shown to scale) generally includes a body 1102, a primary nozzle 1104 at one end of the body 1102, and a payload section 1106 at an opposite end. The body 1102 includes a nitrous oxide tank 1108 fluidically coupled, by a valve 1110, to a catalytic decomposition reactor 1112 (e.g., as described for any of the decomposition reactors described in this disclosure) in the body 1102. For simplicity, only a catalyst bed 1114 of the catalytic decomposition reactor 1112 is shown. The body 1102 also includes a combustion chamber 1116. An interior nozzle 1118 (e.g., a convergent-divergent nozzle) directs one or more gases 1120 (products of the catalytic decomposition) into the combustion chamber 1116 and into a port 1122 of a solid fuel grain mass 1124. A casing 1130 (e.g., a steel and/or aluminum alloy) houses the body 1102. In some implementations, the casing 1130 defines at least a portion of an interior component such as the catalytic decomposition reactor 1112 and/or the combustion chamber 1116, e.g., forms a wall of one or more of the interior components.

The gases 1120 serve two purposes. First, the gases 1120 are hot (e.g., between 600° C. and 700° C., such as between 640° C. and 660° C., or another temperature), such that the gases 1120 heat the solid fuel grain mass 1124 and promote pyrolysis of the fuel. Second, oxygen in the one or more gases 1120 is itself an oxidant able to react with the fuel in a combustion reaction. The mixture of the pyrolized fuel gases with the hot oxygen causes ignition, after which an initial flame propagates along a length of the port 1122. The engine transitions into steady-state combustion, and combustion products 1126 are directed through the primary nozzle 1104 to drive the rocket 1100 forward. The primary nozzle 1104 extends beyond the casing 1130.

The port 1122 is a channel in fluidic contact with (spatially defined by) the solid fuel grain mass 1124. Combustion occurs at the exposed interface of the solid fuel grain mass 1124, shifting as the solid fuel grain mass 1124 is gradually consumed. Various implementations of the port 1122 and the solid fuel grain mass 1124 are within the scope of this disclosure.

Figure 12:
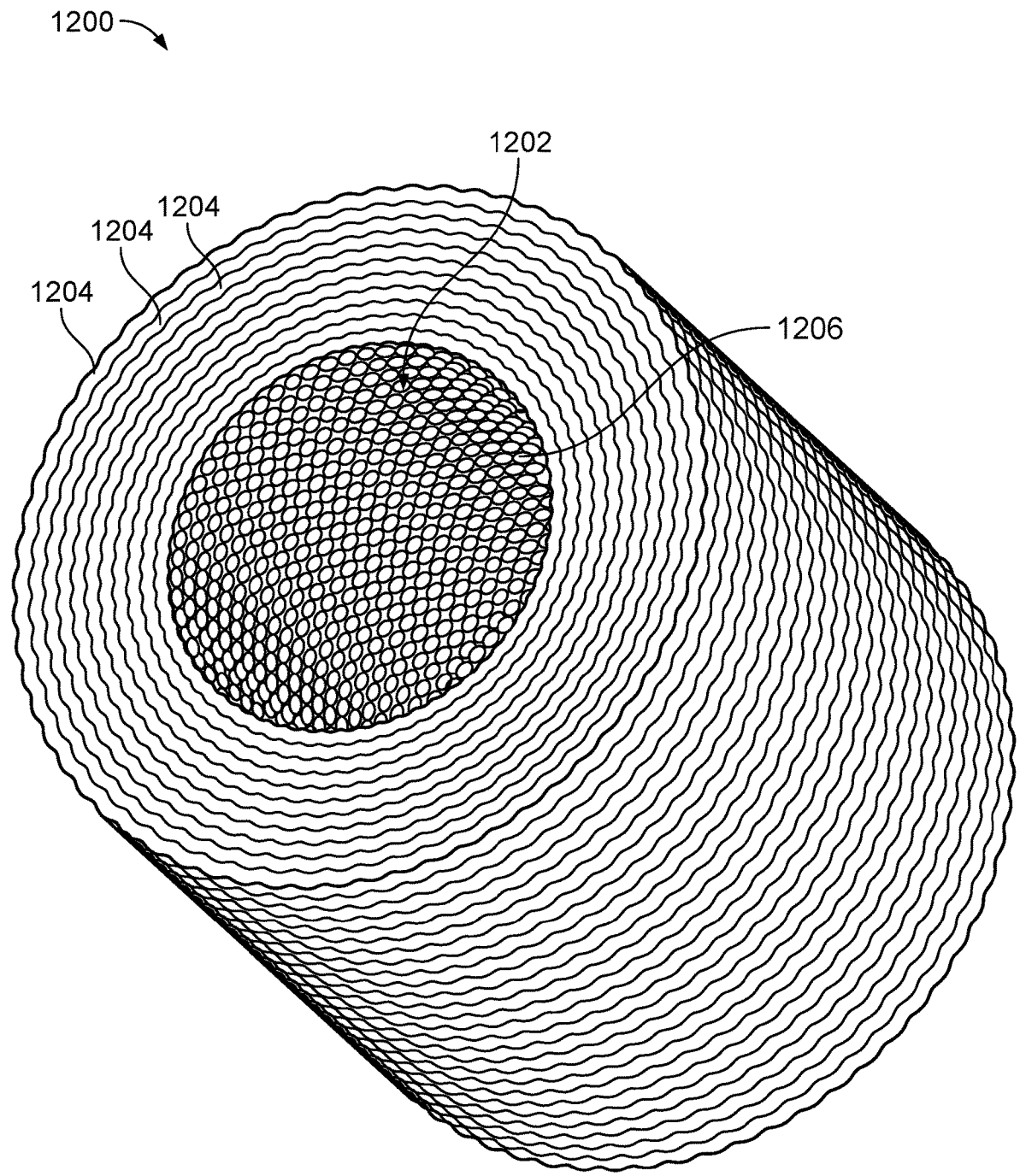
FIG. 12 is a perspective view of an example solid fuel grain mass.

As shown in FIG. 12, in some implementations a cylindrical solid fuel grain mass 1200 defines a circular port 1202 at a radial center of the solid fuel grain mass 1200. Other shapes and positions of the port are also within the scope of this disclosure. For example, ports can have other geometries, such as a star, a clover leaf, or another polygon, and need not be centrally positioned with respect to the solid fuel grain mass but, rather, can be off-center or even at an outer perimeter of the solid fuel grain mass (e.g., between the solid fuel grain mass and a combustion chamber sidewall), such as in a C-slot configuration. In some implementations, multiple ports are present in the solid fuel grain mass. Different port geometries correspond to different thrust curves and can be selected based on the rocket's intended purpose.

Various implementations of the solid fuel grain mass 1200 itself are also within the scope of this disclosure.

Typically, fuel is cast-molded, extruded, and/or machined to form a solid fuel grain mass. However, in some implementations, solid fuel grain masses can be additively manufactured to form a layered solid fuel grain mass such as the solid fuel grain mass 1200. In this example, each cross-section of the solid fuel grain mass 1200 is formed as a fused (bonded) stack of layers with each such layer formed as a series of abutting fused concentric rings 1204 of solidified material arrayed concentrically around the port 1202. The rings 1204 possess geometric patterns 1206 to present an irregular surface to the port 1202, increasing the surface area for combustion in a manner that is preserved as successive rings 1204 are consumed to expose more outer rings 1204. The irregular surface can induce eddy currents within the port 1202, improving convective heat transfer. In the context of ignition using decomposition gases from nitrous oxide decomposition, the enhanced convective heat transfer can reduce the amount of time it takes for the solid fuel grain mass 1200 to ignite in the presence of hot oxidizer flow.

The preservation of the irregular surface can be inconsistent with some other fabrication methods such as cast-molded constructions but can be achieved using additive manufacturing methods such as fused deposition, stereolithography, selective laser sintering, powder bed printing, and/or inkjet printing. Fuel grain material(s) that form the solid fuel grain mass 1200 can include, for example, thermoplastics, such as acrylonitrile butadiene styrene (ABS) thermoplastic or an ABS thermoplastic compound such as a compounded formulation of ABS thermoplastic and nanocomposite aluminum, nylon-based materials, PMMA, or other suitable materials. Further details on solid fuel grain mass fabrication, materials, and design, and solid fuel grain integration with other components of a rocket or other vehicle, can be found in U.S. Pat. Nos. 9,822,045, 9,453, 479, 9,890,091, 10,309,346, and 10,286,599, each of which is hereby incorporated by reference in its entirety.

Figure 13:
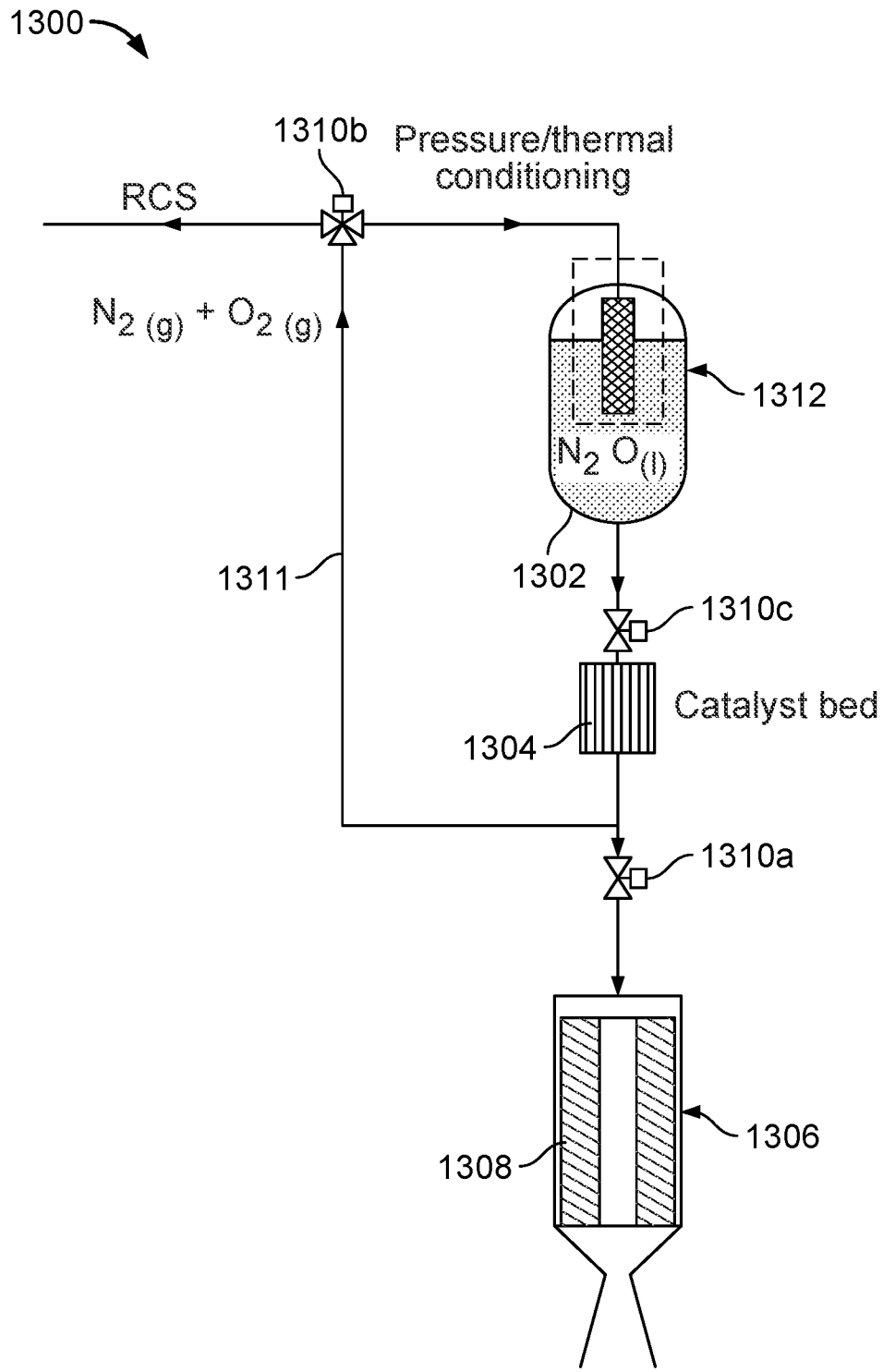
FIG. 13 is a diagram illustrating an example reactor system.

Other uses for decomposition gases, such as oxygen and/or nitrogen gas, are also within the scope of this disclosure. For example, instead of or in addition to being used for ignition and/or thrust, the gases can be fed back to interact with the liquid nitrous oxide supply to provide heat and/or pressure to the liquid nitrous oxide. As shown in FIG. 13, a reactor system 1300 includes a liquid nitrous oxide tank 1302, a catalyst bed 1304, and a combustion chamber 1306 including a solid fuel grain mass 1308. Valves 1310 control flow of nitrous oxide through the reactor system 1300. Other possible components (e.g., injector and heating element) are elided for simplicity; these components can be included, for example, at an input to the catalyst bed 1304, e.g., where valve 1310c is analogous to nitrous oxide inlet 102.

From the catalyst bed 1304, the gases can be routed to various components of the reactor system 1300. By adjustment of valve 1310a, the gases can be used for ignition/combustion in the combustion chamber 1306. By adjustment of valve 1310b, gases can be routed to either or both of an RCS and/or DACS (to provide thrust) and back to the liquid nitrous oxide tank 1302 for pressure and/or thermal conditioning using a tank coupling component 1312, as described in more detail below. By adjustment of valve 1310c, nitrous oxide is flowed into the reaction chamber. Note that both RCS/DACS and conditioning connections need not be present in every implementation; rather, in some implementations, the valve 1310b or an analogous valve would control gas flow to only one of an RCS/DACS or a tank coupling component. In addition, in some implementations decomposition gases can be vented (e.g., from valve 1310b, instead of or in addition to being provided to an RCS/DACS), such as when a pressure/temperature of the tank 1302 is already at a target pressure and/or temperature and conditioning is not currently necessary. Alternatively, or in addition, as described in reference to FIG. 17, in some implementations decomposition gases can be collected in an accumulator and used when desired.

Routing of fluids such as liquid nitrous oxide, gaseous nitrous oxide, and decomposition gases oxygen and nitrogen, can be performed using flow paths, such as flow path 1311. In various implementations and for various flow paths, a flow path can be defined by a casing of a vehicle, by sidewalls of a reactor chamber, or by flow lines such as stainless steel gas lines. For example, the flow path 1311 can be implemented as a stainless steel gas line that fluidically couples the catalyst bed 1304 to valve 1310b.

Pressure conditioning can help alleviate real-world challenges in reactor usage. In some cases, the fluid to be decomposed (e.g., liquid nitrous oxide) is not stored by itself but, rather, is pressurized by a non-condensable pressurant such as helium, to provide a high tank pressure that drives the nitrous oxide to the catalyst bed. However, as the nitrous oxide is depleted for decomposition, this pressure naturally drops. Accordingly, in some implementations one or more of the product gases are reintroduced into the liquid nitrous oxide tank 1302 to replace or supplement the helium pressurant. For example, as shown in FIG. 14A, in some implementations the tank coupling component 1312 includes a barbotage/aerating injector 1400 that is immersed in the liquid nitrous oxide tank 1402, introducing gaseous nitrogen and/or oxygen into nitrous oxide in the tank 1402. In barbotage injection, the gas is injected into the liquid nitrous oxide in the form of bubbles. For example, the barbotage/aerating injector 1400 can include a tube with holes drilled into it, or a mesh-like diffuser element, submerged in the tank 1402. Target pressures within the nitrous oxide tank 1402 vary depending on the implementation. For example, if nitrous oxide flow is being driven purely by the vapor pressure of the nitrous oxide, then the pressure should be sufficient to sustain the flow. Instead of or in addition to a barbotage injector, pressuring decomposition gases can be introduced into a head space in the tank 1402 that is vacated by depleted nitrous oxide.

Alternatively, or in addition, the tank coupling component 1312 can include a thermal coupling component such as a heat exchanger. In some cases, it is important that the liquid nitrous oxide tank 1302 be maintained within a certain temperature range, e.g., to aid in self-pressurization of the nitrous oxide to drive flow, and/or because liquid nitrous oxide in that temperature range has desirable flow/reaction characteristics for subsequent travel through and decomposition in the decomposition reactor. For example, in some implementations it is beneficial to maintain the liquid nitrous oxide tank at least at 10° C., at least at 15° C., at least at 20° C., or another threshold temperature. It can be beneficial to maintain the liquid nitrous oxide tank at temperatures below 35°. In some implementations, the decomposition gases are cooled before being used for thermal conditioning (e.g., using a heat exchanger in thermal contact with a cool exterior environment), and/or the decomposition gases are provided by a secondary catalyst bed configured to produce cooler gases than a primary catalyst bed, to reduce localized boiling/decomposition of the liquid nitrous oxide.

For systems subject to "cold soaking," such as missiles mounted under the wing of an aircraft, rockets launched in cold Earth conditions, or RCSs/DACSs activated after prolonged orbital residence, low nitrous oxide temperatures may inhibit on-command decomposition/ignition/thrust. The hot gaseous products of exothermic nitrous oxide decomposition can be used to heat the stored nitrous oxide to maintain its temperature within a desired range.

For example, as shown in FIG. 14B, in some implementations the tank coupling component 1312 includes a heat exchanger 1420 in thermal contact with the liquid nitrous oxide tank 1422. Heat 1424 flows from the heated decomposition product gases 1426 into the nitrous oxide tank 1422. Other implementations of the heat exchanger 1420 are also within the scope of this disclosure, e.g., different morphologies such as shell-and-tube heat exchangers and brazed plate heat exchangers. In some implementations, the thermal coupling is provided using a barbotage/aerating or other injector as described in reference to FIG. 14A, where not only pressure but also heat is supplied by injected gas.

In some implementations, the pressure conditioning component and/or the thermal coupling component are adjusted (e.g., enabled or disabled) based on measured states of the reactor. For example, one or more temperatures sensors can be thermally coupled to the liquid nitrous oxide tank, and, if the measured temperature is below a threshold value (such as a threshold value provided above), hot gas is flowed through the thermal coupling component to heat the liquid nitrous oxide tank. As another example, a rate of hot gas flow can be controlled to vary based on the measured liquid nitrous oxide tank temperature, where a lower temperature corresponds to more flow. The flow can be controlled so as to maintain the liquid nitrous oxide tank temperature at or within a predetermined variance from a target value. Referring to pressure conditioning, in some implementations one or more pressure sensors are embedded in the liquid nitrous oxide tank so as to measure the pressure therein, and, if the measured pressure is below a threshold value, gas from the decomposition reaction is injected into the liquid nitrous oxide tank by a barbotage/aerating or other injector. As another example, a rate of gas injection into the liquid nitrous oxide tank can be controlled to vary based on the measured tank pressure. A lower pressure corresponds to higher levels of injection. The injection can be controlled so as to maintain the liquid nitrous oxide tank pressure at or within a predetermined variance from a target value. These and other control operations can be performed by a control system coupled to the pressure conditioning component, the thermal coupling component, and/or gas control valves/regulators.

In some implementations, a gas separator is included in the reactor such that different gaseous components of the decomposition product are routed to different components of the reactor. For example, as shown in FIG. 15, input nitrogen gas and oxygen gas 1500 are routed into an oxygen concentrator (gas separator) 1502. Output nitrogen gas 1504 is routed into an RCS/DACS to provide controlled thrust (or, in some implementations, simply vented, and/or stored in an accumulator), while output oxygen gas 1506 is routed to a liquid nitrous oxide tank and injected into the tank to maintain pressurization in the tank. Using pure (or purer, compared to the as-produced product gas composition) oxygen for tank injection can avoid possible negative effects from nitrogen dilution when significant amounts of nitrogen are introduced into the liquid nitrous oxide tank, such as decreased energy output from subsequent combustion and combustion instability over time due to non-homogenous dilution of the bulk nitrous oxide. By contrast, the oxygen, being an oxidizer, can contribute to combustion. In some implementations, gas separators are included in controllable valves. For example, the oxygen concentrator 1502 can be included in valve 1310b in FIG. 13. An gas separator as shown in FIG. 15 can be included in any of the reactor system implementations described herein, by including the gas separator on a flow path that receives both oxygen and nitrogen and that provides at least one of the oxygen or nitrogen to at least one other component, such as a tank coupling component.

The above-described thermal and/or pressure conditioning configurations can instead, or additionally, be applied to components besides the tank or fluid in the tank. Such components include, as non-limiting examples, pressure system components such as valves (e.g., valves 1310 and/or other valves described herein), plumbing (e.g., fluid lines, pipes, etc.), and pressure regulators. To thermally condition a component, a heat exchanger 1420 can be provided in thermal contact with the component, such that one or more hot gaseous decomposition products warm the component. To perform pressuring condition on a component (e.g., to pressurize a valve or fluid line), an injector can be configured to inject one or more gaseous decomposition products into the component.

The above-described thermal and/or pressure conditioning configurations can be included in any of the implementations according to this disclosure that include gaseous decomposition products, e.g., the systems of FIGS. 1, 9, 10, 11, 13, 14A-14B, 15, 16, 17, 18A-18B, 19A-19B, and/or 20, e.g., by providing lines to transport the gaseous decomposition product(s) and one or more coupling components to condition one or more pressure system components.

Figure 16:
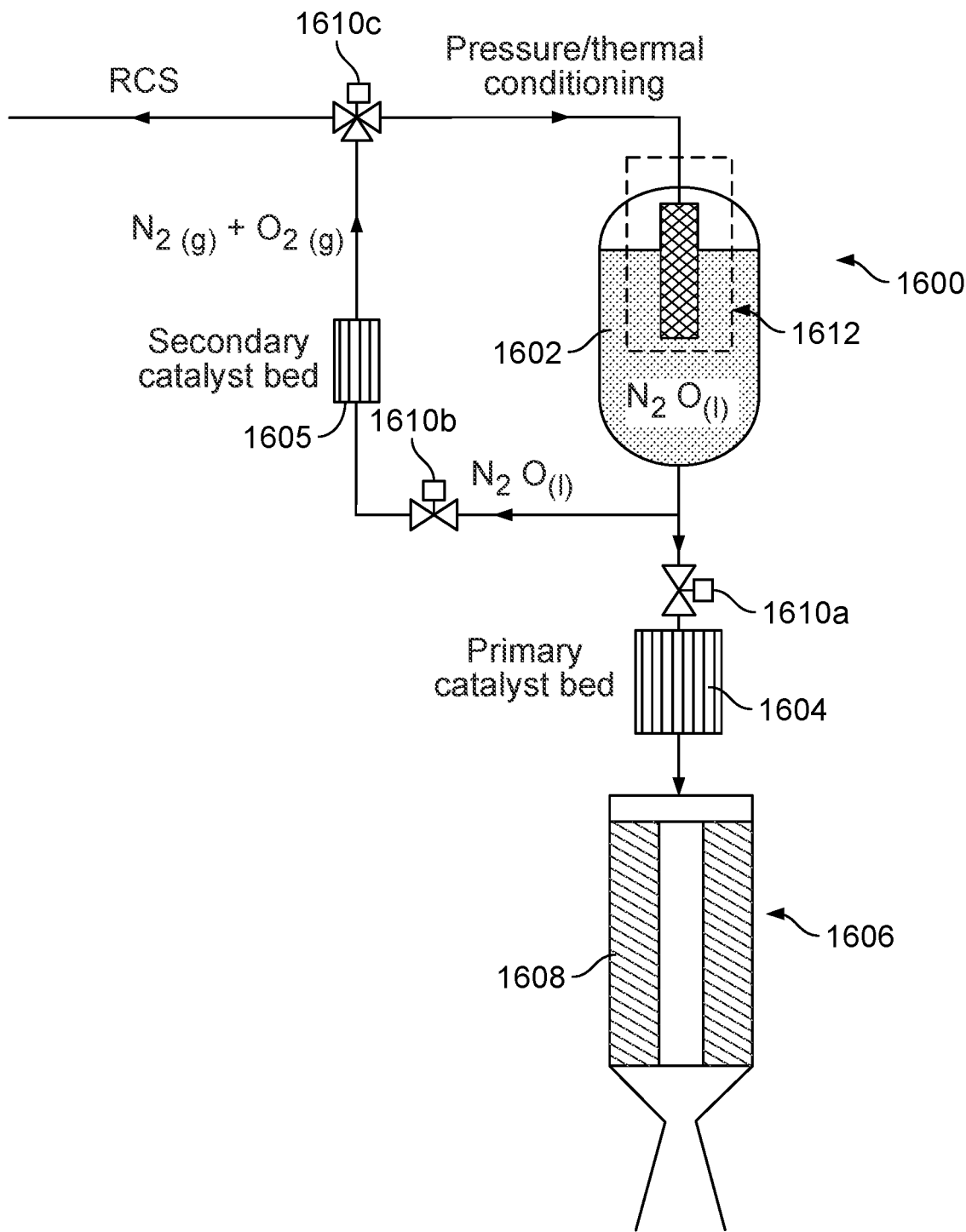
FIG. 16 is a diagram illustrating an example reactor system.

Although FIG. 13 shows gases being routed from a single catalyst bed 1304, some implementations according to this disclosure include multiple catalyst beds. For example, as shown in FIG. 16, in some implementations a reactor system 1600 includes a liquid nitrous oxide tank 1602, a primary catalyst bed 1604, a secondary catalyst bed 1605, and a combustion chamber 1606 including a solid fuel grain mass 1608. Valves 1610 control flow of nitrous oxide through the reactor system 1600. Valve 1610a can be controlled to provide nitrous oxide to the primary catalyst bed 1604 so that output gas from the primary catalyst bed 1604 flows directly into the combustion chamber 1606 to provide primary thrust; valve 1610b can be controlled to provide nitrous oxide to the secondary catalyst bed 1605; and valve 1610c can be controlled to direct output gas from the secondary catalyst bed 1605 for either or both of RCS/DACS thrusting and pressure/thermal conditioning of the liquid nitrous oxide tank 1602 using a tank coupling component 1612, e.g., as described for tank coupling component 1312. Other possible components (e.g., injector and heating element) are elided for simplicity; these components can be included, for example, at inlets to one or both of the catalyst beds 1604, 1605, where valves 1610a and/or 1610b are analogous to nitrous oxide inlet 102.

The incorporation of the secondary catalyst bed 1605, in addition to the primary catalyst bed 1604, can provide various advantages in some implementations. First, it can obviate the need for a valve after the primary catalyst bed 1604 (e.g., the valve 1310a in FIG. 13), allowing reactor topology after the primary catalyst bed 1604 to be optimized specifically for thrust generation through a nozzle or for solid fuel grain ignition/combustion by flow into a port of the solid fuel grain. The inclusion of an interceding valve can disrupt gas flow and worsen parameters such as thrust magnitude, thrust uniformity, and/or combustion rate. The interceding valve may instead or additionally introduce material constraints. With two catalyst beds 1604, 1605 included, multi-directional routing of input nitrous oxide can be performed to direct output gases to different components of the reactor system 1600, as opposed to only multi-directional routing of the output gases themselves.

In addition, different uses for output gases can require different gas parameters (e.g., flow rates of gas), and the use of separate catalyst beds can, in some implementations, allow for more fine-tuned optimization of aspects of the reactor system 1600. For example, in an operating state where output gases are being provided to multiple components of the reactor system 1600, typically a higher flow rate of gas is provided to the combustion chamber 1606 (or to a primary nozzle in place of the combustion chamber 1606) than is provided to the RCS/DACS and to the tank coupling component 1612. Also, in some cases a relatively small nitrous oxide flow rate through a large catalyst bed may exhibit poor flow characteristics and/or decomposition completeness, and the same can be true for a relatively large nitrous oxide flow rate through a small catalyst bed. With these considerations in mind, the secondary catalyst bed 1605 can be made smaller than the primary catalyst bed 1604 so that each catalyst bed 1604, 1605 is optimized for its respective typical flow rates.

Another consideration is that, with two separate catalyst beds 1604, 1605, temperatures can be regulated in each catalyst bed separately, such that, for example, if only the secondary catalyst bed 1605 is in use, and the secondary catalyst bed 1605 is hot enough to sustain continued nitrous oxide decomposition, a heating element can be disabled even if the primary catalyst bed 1604 is cold, and vice-versa. The secondary catalyst bed 1605, being (in some, though not all, implementations) smaller than the primary catalyst bed 1604 (e.g., having a smaller thermal mass), can also be independently heated to a required temperature more efficiently than the primary catalyst bed 1604, reducing energy needs of the reactor system 1600. The relative thermal masses of the catalyst beds also have ramifications for start-up times. For example, because the secondary catalyst bed 1605 is smaller than the primary catalyst bed 1604, the secondary catalyst bed 1605 can be brought to its operational temperature faster than the primary catalyst bed 1604, allowing thermal and pressure conditioning of the nitrous oxide (e.g., of a cold-soaked nitrous oxide tank) to begin more quickly than if the primary catalyst bed 1604 had to be used for thermal and pressure conditioning. Also, temperature requirements of different catalyst beds may be different, which can reduce the need for specialty valves/flow components rated for high gas temperatures in lower-temperature catalyst beds.

Figure 17:
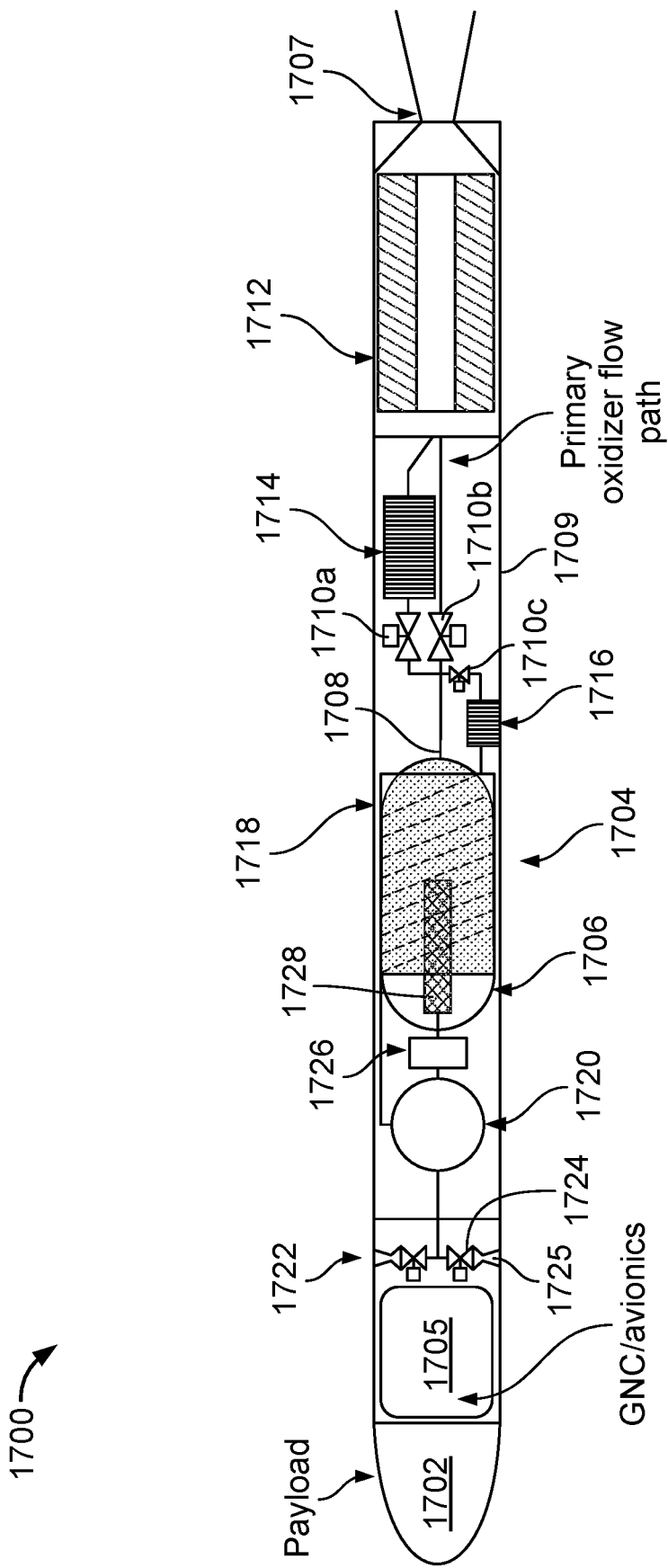
FIG. 17 is a diagram illustrating an example reactor system integrated into a missile.

FIG. 17 shows an example missile 1700 that (i) includes, in a unified manner, various systems described throughout this disclosure, and (ii) also illustrates several features not previously described. The missile 1700 includes a payload 1702, a body 1704, and a nozzle 1707. A control system 1705 within the body 1704 implements guidance, control, and navigation (GNC) operations and avionics operations, including control of valves and other adjustable components of the missile 1700, as described in more detail below with respect to FIG. 20. Internal components of the missile 1700 are enclosed by a casing 1709 as described for casing 1130. Note that the arrangement of components of the missile 1700 are also applicable to other vehicles such as rockets, spacecraft, etc.

Within the body 1704, a tank 1706 stores bulk liquid nitrous oxide. An output 1708 of the tank 1706 provides nitrous oxide into three possible flow paths, controlled by respective valves 1710a, 1710b, 1710c. A primary oxidizer flow path, through valve 1710b, provides liquid nitrous oxide directly into a hybrid engine 1712 including a solid fuel grain defining a port. An igniter flow path, through valve 1710a, flows the nitrous oxide into an igniter (primary) catalyst bed 1714. A secondary flow path, though valve 1710c, flows the nitrous oxide into a secondary catalyst bed 1716, which can be—but need not be—smaller than (e.g., have a smaller thermal mass than, and/or have a smaller catalyst bed loading than) the igniter catalyst bed 1714. Possible components such as injector/aerator, distribution plate, and/or pre-decomposition heating element are not shown, for simplicity; these components can be included, for example, at inlets to one or both of the catalyst beds 1714, 1716, where valves 1710a and/or 1710c are analogous to nitrous oxide inlet 102.

During operation, the valves 1710 can be initially configured such that flow through valve 1710a is higher than flow through valve 1710b, to provide a high flow of heated decomposition gases into the engine 1712 to cause ignition and initiate combustion. After ignition, flow through valve 1710a can be reduced or eliminated, and flow through valve 1710b can be increased, such that flow through valve 1710b (liquid nitrous oxide flowing into the engine 1712) is higher than flow through valve 1710a. In this manner, a high throughput (e.g., flow rate) of nitrous oxide can be provided into the engine 1712 for high levels of combustion/thrust during steady-state operation after combustion has been initiated. This high throughput may not be compatible with flow through a catalyst bed, which can slow flow, induce significant, undesired pressure drops in the nitrous oxide, and otherwise handicap combustion. Using this two-channel arrangement, in which the igniter catalyst bed 1714 can be bypassed for direct flow of liquid nitrous oxide into the engine 1712, can accordingly increase the strength and stability of combustion. Note that this arrangement can be included in any of the systems disclosed herein that use decomposition gases to cause ignition in a combustion chamber, including the systems described in reference to FIGS. 11, 13, and 16, by including, in the systems, suitable valve(s) coupled to an output of the nitrous oxide tank, and a corresponding primary flow path that provides liquid nitrous oxide into the combustion chamber and that bypasses the primary catalyst bed. Control of the valves that adjust flow through the various flow paths can be performed by a control system such as control system 2000, e.g., in response to receiving data from a temperature sensor that indicates ignition has occurred in the combustion chamber.

From the secondary catalyst bed 1716, hot decomposition gases flow into a heat exchanger 1718 (e.g., as described for heat exchanger 1420) that thermally couples the decomposition gases to liquid nitrous oxide inside the tank 1706, to maintain the liquid nitrous oxide above a target temperature. Flow of the decomposition gases continues into a gas accumulator 1720. The gas accumulator 1720 includes a pressurized tank in which the decomposition gases can accumulate (e.g., at increasing pressures as more gas is accumulated). The stored gases can then be flowed to other components of the missile 1700 (e.g., by control of output valve(s) of the gas accumulator 1720, not shown) when the gases are needed. This can improve the flexibility of operation of the missile 1700, because pre-stored decomposition gases can be utilized even when the secondary catalyst bed 1716 is not currently catalyzing decomposition. Note that gas accumulators can be included in any of the systems disclosed herein, including the systems described in reference to FIGS. 10, 11, 13, 16, 18A-18B, and 19A-19B, by including, in the systems, a gas accumulator between (i) an output of a catalyst bed and (ii) an input to another component that utilizes decomposition gases, such as an RCS and/or DACS, a heat exchanger, and/or a pressure-conditioning gas injector.

Decomposition gases from the gas accumulator 1720 can flow into an RCS 1722 (e.g., and/or a DACS), in which valves 1724 and corresponding thrusters 1725 (e.g., nozzles) control flow of the gases out of the missile 1700 to control motion/orientation of the missile 1700. The decomposition gases can also flow into a pressure regulator 1726 that is configured to maintain a pressure of the nitrous oxide inside the tank 1706 within a target range, e.g., above a target threshold pressure. For example, the pressure regulator 1726 can be configured to determine (digitally and/or through mechanical analog response) that the pressure of the nitrous oxide is less than the threshold pressure and, in response, allow flow of the decomposition gases through the pressure regulator 1726, through a barbotage or other injector 1728, and, subsequently, into the tank 1706 to raise the pressure of the nitrous oxide inside the tank 1706. In some implementations, flow into the barbotage injector 1728 can be regulated by a valve controlled by a control system, such as control system 2000.

In some implementations, decomposition gases from a secondary, smaller catalyst bed are provided into a primary, larger catalyst bed. These hot gases can provide some or all primary catalyst bed preheating to initiate self-sustaining decomposition in the primary catalyst bed. For example, in an alternative implementation, the missile 1700 can be modified to include an additional flow path, and corresponding control valve, between the output of the secondary catalyst bed 1716 and the input of the igniter catalyst bed 1714. Nitrous oxide flow can initially be controlled such that decomposition gases from the secondary catalyst bed 1716 flow into the igniter catalyst bed 1714 to heat the igniter catalyst bed to a decomposition temperature. The flow from the secondary catalyst bed 1716 can then be stopped, and flow through valve 1710a into the igniter catalyst bed 1714 can be started in order to ignite combustion in the hybrid engine 1712. After ignition, flow through valve 1710a can be reduced or stopped, and flow through valve 1710b can be started to provide primary oxidizer flow to the hybrid engine 1712.

Figures 18A, 18B:
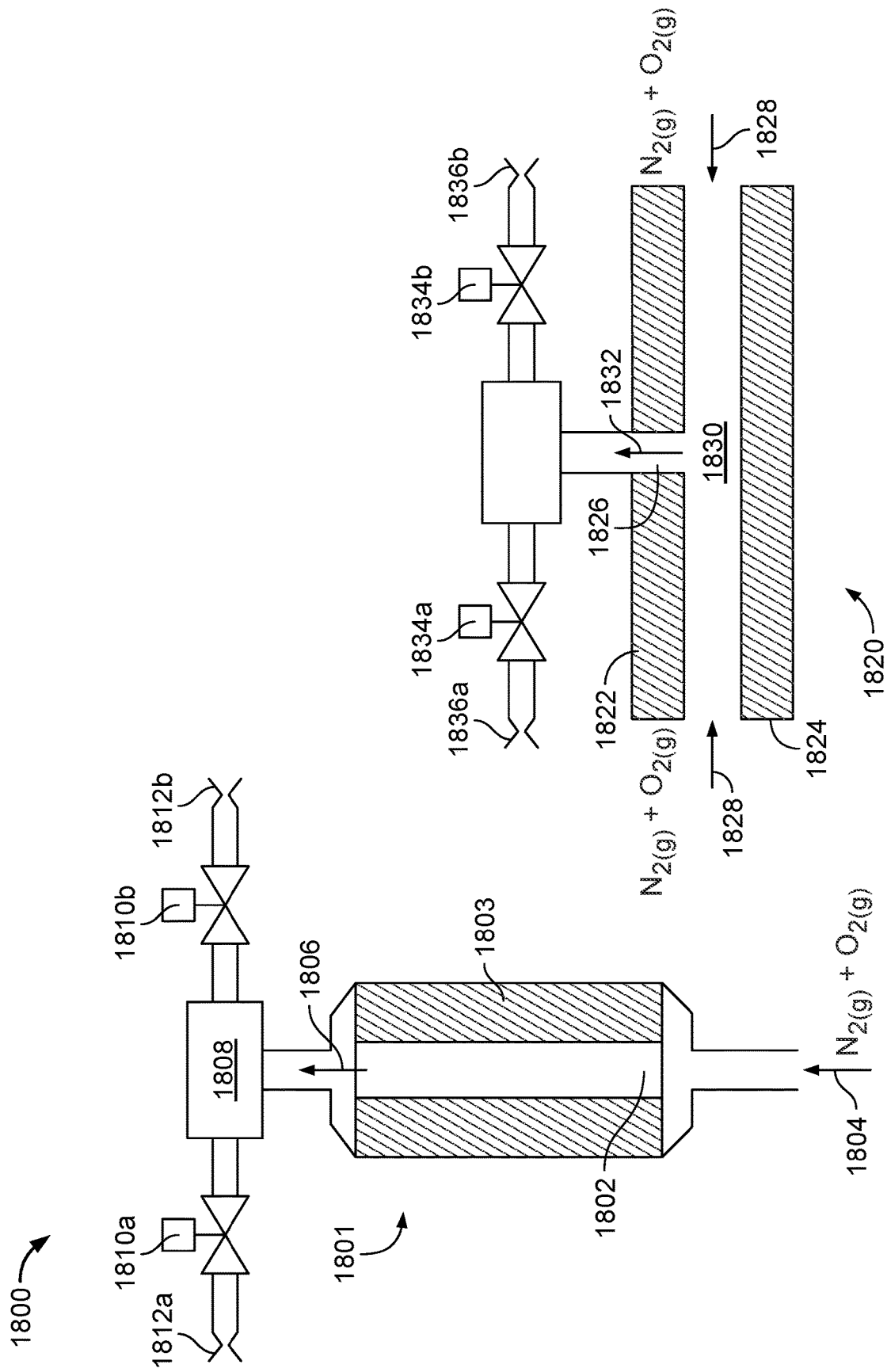
FIGS. 18A-18B are diagrams illustrating example secondary combustion chambers.

In some implementations, decomposition gases are provided into a secondary hybrid rocket engine—e.g., a rocket engine smaller than the primary rocket engine described above—to achieve thrust in conjunction with hot-gas valves. This thrust can be less powerful than that achieved by the primary rocket engine, but more powerful than that achieved on the basis of thrust from decomposition gases alone, and accordingly can be useful for applications such as attitude control, which may be beyond the power of the RCS. For example, as shown in FIG. 18A, a DACS 1801 includes a combustion chamber 1800 including a solid fuel grain mass 1803 defining a port 1802. Decomposition gases 1804 (e.g., from a catalyst bed such a primary catalyst bed or a secondary catalyst bed) flow into the combustion chamber, where combustion occurs to generate combustion products 1806. The combustion products 1806 flow into a hot-gas manifold 1808. Two hot-gas valves 1810a, 1810b control flow of the combustion products 1806 out of two respective nozzles 1812a, 1812b, so as to produce thrust as-desired in opposing directions. Additional hot-gas valves and corresponding nozzles could be used to provide thrust in additional corresponding directions.

The solid fuel grain mass 1803 used in the DACS 1801 can have smooth inner walls or can be ribbed with rings as described for solid fuel grain mass 1200. More complex geometries can instead or additionally be used. For example, in the DACS 1820 shown in FIG. 18B, solid fuel grain masses 1822, 1824 form a dual-endburning ("pancake") structure. For example, the solid fuel grain masses 1822, 1824 can be disk-shaped (shown in FIG. 18B in profile). The top solid fuel grain mass 1822 defines a cylindrical output port 1826. Decomposition gases 1828 are injected into a gap 1830 between the solid fuel grain masses 1822, 1824 at an outer perimeter of the disks of the solid fuel grain masses 1822, 1824. For example, the decomposition gases 1828 can be injected into the gap 1830 radially with respect to the disk-shaped solid fuel grain masses 1822, 1824 (and, accordingly, disk-shaped gap 1730), and/or the decomposition gases 1828 can be injected into the gap 1830 tangentially to form a vortex/swirling flow. Flow of combustion products 1832 through nozzles 1836a, 1836b, as controlled by hot-gas valves 1834a, 1834b, causes thrust.

The DACS 1801 and 1820 can be integrated into any of the systems described in this disclosure (e.g., the systems described in reference to FIG. 10, 11, 13, 16, or 17) by including decomposition gas flow paths leading from a primary or secondary catalyst bed to the solid fuel grain mass(es) of the DACS 1801, 1820, and by including hot-gas valves and nozzles at outputs of the solid fuel grain mass(es) as described for the DACS 1801, 1820.

Figure 19A:
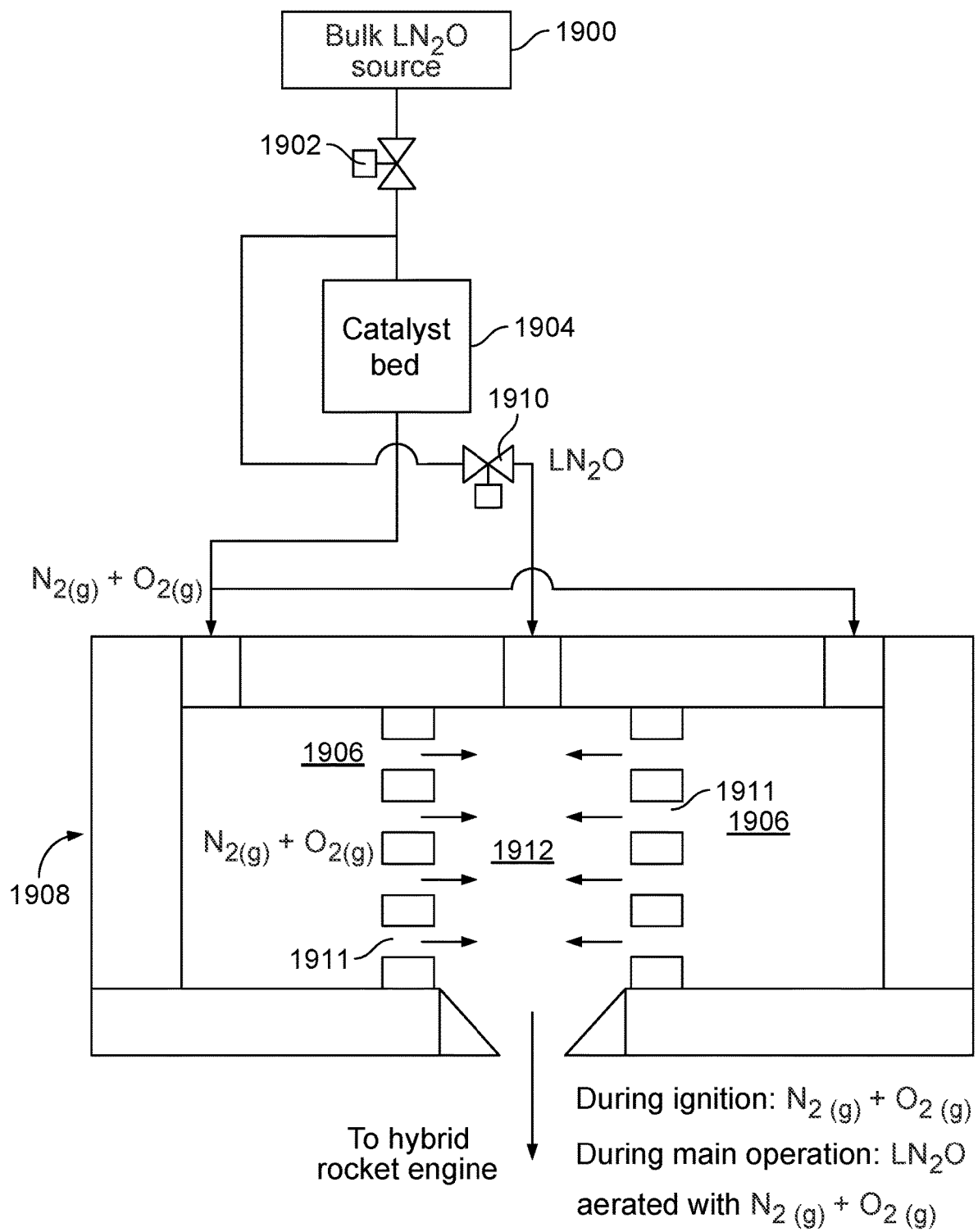
FIGS. 19A-19B are diagrams illustrating example reactor systems including a effervescent injectors.

Some implementations according to this disclosure include a combined igniter-effervescent injector. This injector type uses a gas stream to aerate a liquid flow, improving atomization of the liquid compared to non-aerated liquid flowing through the same atomizing structure. For example, as shown in FIG. 19A, liquid nitrous oxide flow from a bulk source 1900 (e.g., a nitrous oxide tank as described throughout this disclosure, in some cases pressure/temperature conditioned using decomposition gases), after flowing through a controllable valve 1902, is diverted along two paths. Along one path, the nitrous oxide is fed into a catalyst bed 1904 for catalytic decomposition as described throughout this disclosure. Before entry into the catalyst bed 1904, the nitrous oxide in some implementations can be otherwise atomized, pre-heated, and/or distributed over a diameter of the decomposition reactor, as described throughout this disclosure; for clarity, these components are not shown in FIG. 19A. Decomposition gases $N_2$ and $O_2$ from the catalytic decomposition flow into an annular gas channel 1906 of an effervescent injector 1908. In an initial ignition stage of operation, the $N_2$ and $O_2$ flow out of the effervescent injector 1908 into a hybrid rocket engine combustion chamber, causing combustion of a solid fuel grain mass as described throughout this disclosure.

Along a second (primary oxidizer) flow path, liquid nitrous oxide flows (controlled by a valve 1910) into a central liquid channel 1912 of the effervescent injector 1908. Gases flowing from the gas channel 1906 enter the central liquid channel 1912 through orifices 1911 and aerate the liquid nitrous oxide, which subsequently is injected into the combustion chamber. Direct liquid nitrous oxide flow into the combustion chamber through the effervescent injector 1908 can be activated or increased (e.g., by actuation/adjustment of the valve 1910) after combustion has already been ignited by decomposition gases from the catalyst bed 1904 flowing into the combustion chamber through the effervescent injector 1908. This can provide the advantages discussed with respect to FIG. 17. The flow change can be initiated by a control system (e.g., control system 2000) in response to detecting that combustion has been ignited, e.g., based on a temperature sensor in the engine.

This arrangement can have several positive effects in various implementations. First, the aeration promotes atomization of the nitrous oxide upon injection into the combustion chamber, improving combustion dynamics (e.g., making combustion more uniform/constant). Second, the hot decomposition gases pre-heat the liquid nitrous oxide prior to injection, increasing its energy content and potentially improving combustion in the engine (e.g., making combustion more rapid). Third, the effervescent injector 1908 combines ignition and injection functions into a unified element, improving efficiency. Fourth, this arrangement can reduce backflow of decomposition gases and/or nitrous oxide into the catalyst bed.

In some implementations, the annular gas channel 1906 of the effervescent injector 1908 itself includes a catalyst, such as any one or more of the catalyst materials described herein. For example, the catalyst can line/coat inner walls of the annular gas channel 1906. This catalyst can supplement operation of the catalyst bed 1904, increasing decomposition of the nitrous oxide flowing along that flow path. In some implementations, nitrous oxide decomposition is catalyzed primarily by catalyst at the effervescent injector 1908, for example, without the catalyst bed 1904.

Figure 19B:
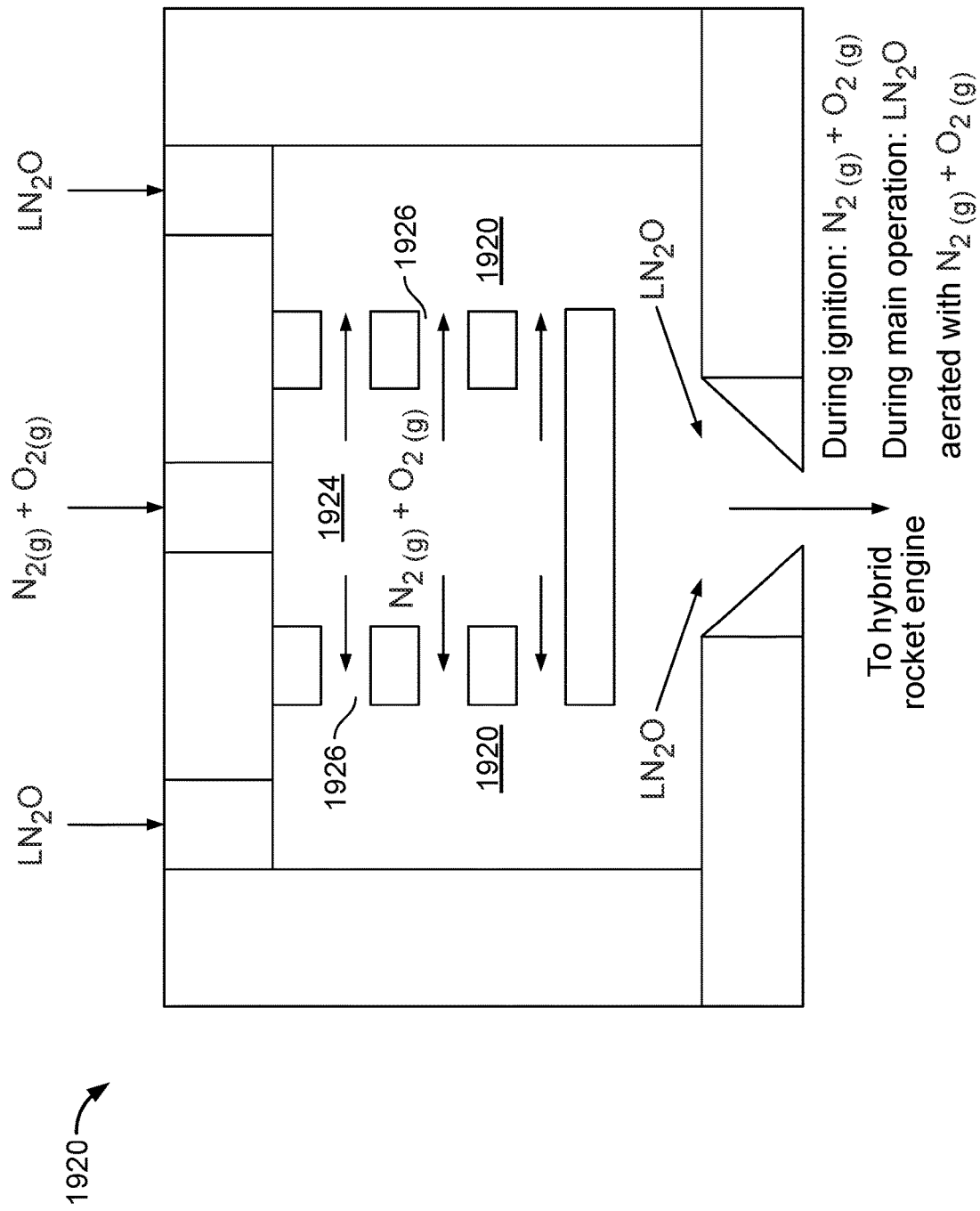
Figure 20:
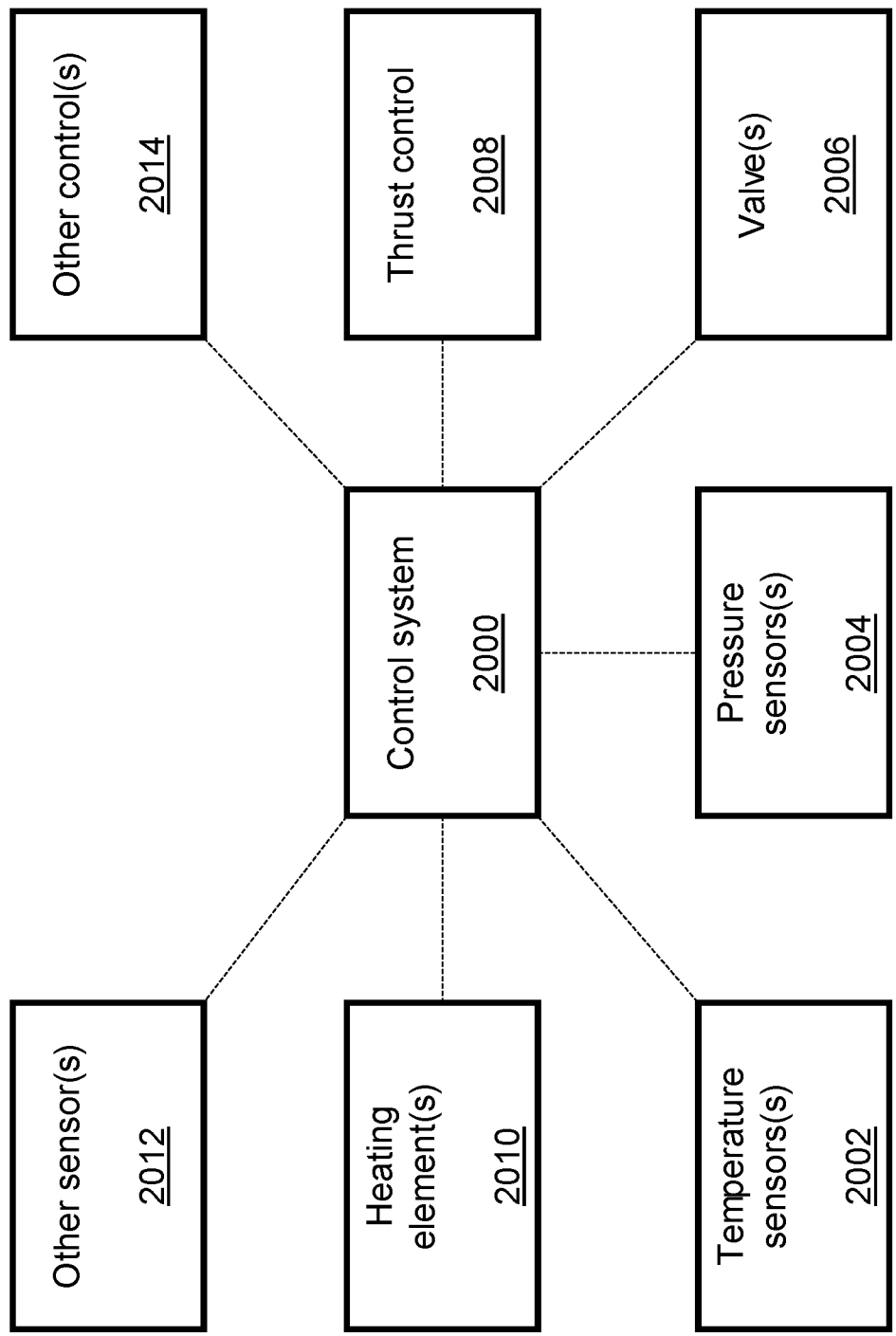
FIG. 20 is a diagram illustrating an example control system coupled to other components.

As shown in FIG. 19B, in another implementation, liquid nitrous oxide is provided into an annular channel 1922 of an effervescent injector 1920. Decomposition gases are provided into a central gas channel 1924, from which the decomposition gases pass through orifices 1926 and aerate the liquid nitrous oxide. The effervescent injector 1920 is an "inside-out" version of the effervescent injector 1908 and can provide the same benefits.

Systems described throughout this disclosure, such as the systems shown in FIGS. 11, 13, 16, and 17, can be modified to include an effervescent injector having combined gas and liquid in-flow for subsequent injection into a combustion chamber, as described in reference to FIGS. 19A-19B. The modification can include providing the effervescent injector having an output leading into a combustion chamber, providing a flow path of liquid nitrous oxide from the nitrous oxide tank into the effervescent injector, and providing a flow path of gas products from a primary or secondary catalyst bed into the effervescent injector.

Various aspects of the catalytic decomposition reactors and associated systems described in this disclosure are subject to measurement, regulation, and control. These operations can be performed by a control system such as the control system 2000 shown in FIG. 20, such as an on-board computer system including one or more processors coupled to a non-transitory storage, as described in more detail below. In some implementations, at least a portion of the control system 2000 is off-board, e.g., remote to the reactor, and transmits control signals that are received by on-board communication components to control components of the reactor and/or a vehicle holding the reactor.

The control system 2000, in various implementations, can be coupled (e.g., electrically and/or communicatively coupled) to at least one of: one or more temperature sensors 2002, such as sensors to measure ambient temperatures in the reactor, temperatures of liquid nitrous oxide in a tank, temperatures of a combustion chamber, and/or temperatures of catalyst beds; one or more pressure sensors 2004, such as sensors to measure ambient pressures in the reactor and/or pressures of liquid nitrous oxide in a storage tank; one or more valves 2006, such as inlet valves coupled to a nitrous oxide tank, valves to control nitrous oxide flow, and valves to control decomposition product gas flow; one or more thrust control components 2008 such as gimballed nozzles; one or more heating elements 2010 such as heating coils; one or more other sensors 2012, such as flow rate sensors; and one or more other controlled components 2014, such as gas separators and other systems of the vehicle, rocket, or missile that are less directly related to the catalytic decomposition process. Readings from the sensors, commands received from external sources, and/or internal operational guidance instructions are evaluated by the control system 2000, which provides corresponding control signals to other components to guide reactor and vehicle operation. Various examples of these control operations have been described above.

FIG. 23 shows an example method 2300 according to some implementations of this disclosure. A flow of a decomposable fluid is atomized to produce a spray of the decomposable fluid (2302). The spray of the decomposable fluid is heated (2304). A decomposition reaction of the heated spray of the decomposable fluid is chemically catalyzed to produce two or more gaseous decomposition products (2306). The gaseous decomposition products can be used for one or more purposes as described throughout this disclosure, such as for pressure system component conditioning, thrust (e.g., in an RCS), for combustion ignition, or for a combination of these purposes. Multiple catalyst beds can be used to provide decomposition gases to different portions of a system and/or to provide decomposition gases at different times. The decomposition reaction can be performed in a catalyst bed having a geometry that promotes decomposition, as described herein.

Figure 24:
FIG. 24 is a diagram illustrating an example catalysis method.

FIG. 24 shows an example method 2400 according to some implementations of this disclosure. A decomposition reaction of a spray of a decomposable fluid is chemically catalyzed to produce two or more gaseous decomposition products (2402). The decomposable fluid originates at a tank. At least one of heat or pressure is provided to bulk fluid in the tank using at least one of the two or more gaseous decomposition products (2404). For example, a heat exchanger can allow for heat flow from a decomposition gas to the bulk fluid. For example, the decomposition gas (e.g., nitrogen) can be provided into the tank to pressurize the tank.

FIG. 25 shows an example method 2500 of making a catalyst bed, according to some implementations of this disclosure. A structure of the catalyst bed is additively manufactured (2502). The structure defines a plurality of channels configured to receive flow of fluid to be chemically catalyzed. The plurality of channels are oriented at least partially non-parallel to an overall flow direction of the flow from inputs of the plurality of channels to outputs of the plurality of channels. A catalyst is exposed at an exterior of the structure. For example, the additive manufacturing can be performed as described in reference to FIG. 21 or FIGS. 22A-22B, and the structure can have a geometry and/or composition as described in reference to FIGS. 7A-7H. The channels can have various shapes/orientations as described throughout this disclosure to promote decomposition.

Particular example implementations have been described. However, other implementations are within the scope of this disclosure. For example, some implementations do not include an injector, or include an injector in a different location of the reactor (e.g., after a heating element rather than before). Some implementations do not include a heating element, or include one or more heating elements at different locations of the reactor, such as immediately at or following an inlet valve, and/or at a catalyst bed itself, and/or integrated into another component (e.g., integrated into a distribution plate). Some implementations do not include a distribution plate, or include one or more distribution plates at different locations of the reactor, such as prior to a heating element. Although "a reaction chamber" is referred to, in some implementations a flow of to-be-composed fluid (such as nitrous oxide) proceeds through multiple fluidically-coupled spaces in a reactor; these possible multiple spaces are together referred to as "a reaction chamber." Locations of valves can be different from the valve locations shown in FIGS. 13 and 16.

Various implementations of the systems and techniques described here, such as control systems and processes performed thereby, can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable processing system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to one or more programmable processors, including a machine-readable medium that receives machine instructions.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by the data processing apparatus, cause the apparatus to perform the operations or actions.

Although a few implementations have been described in detail above, other modifications are possible. Logic flows depicted in the figures do not require the particular order shown, or sequential order, to achieve desirable results. In addition, other actions may be provided, or actions may be eliminated, from the described flows, and other components may be added to, or removed from, the described systems.

Accordingly, other implementations are within the scope of the following claims.

What is claimed is:

1. A catalyzing reactor system comprising:
   an inlet valve configured to fluidically couple a tank for storing a decomposable fluid to a chamber;
   an injector arranged to receive the decomposable fluid from the inlet valve and inject a spray of the decomposable fluid through the chamber;
   a heating element disposed in the chamber and arranged to heat the spray of the decomposable fluid;
   a catalyst bed comprising a catalyst, the catalyst bed arranged such that heated spray of the decomposable fluid contacts the catalyst and the catalyst promotes decomposition of the heated spray of the decomposable fluid into two or more gaseous decomposition products;
   a solid fuel grain mass defining a port;
   a nozzle arranged to direct the two or more gaseous decomposition products into the port; and
   a flow path that fluidically couples the tank to the port and that bypasses the catalyst bed.

2. The catalyzing reactor system of claim 1, comprising a distribution plate disposed between the heating element and the catalyst bed, the distribution plate configured to promote dispersion of the heated spray of the decomposable fluid before the heated spray of the decomposable fluid interacts with the catalyst bed.

3. The catalyzing reactor system of claim 1, comprising a heat-resistant ceramic liner disposed on inner walls of the chamber.

4. The catalyzing reactor system of claim 1, wherein a heating power of the heating element is such that interaction between the heated spray of the decomposable fluid and the catalyst bed heats the catalyst bed to at least 300° C.

5. The catalyzing reactor system of claim 1, comprising a control system configured to perform operations comprising:
   monitoring a temperature of the catalyst bed during thermal decomposition of the heated spray of the decomposable fluid; and
   in response to determining that the temperature of the catalyst bed satisfies a condition, at least one of
   adjusting an intensity of the heating element, or
   adjusting a flow rate of the decomposable fluid.

6. The catalyzing reactor system of claim 1, wherein the catalyst bed comprises a plurality of ceramic pellets coated with the catalyst.

7. The catalyzing reactor system of claim 1, wherein the catalyst bed comprises a structure coated with the catalyst, the structure defining a plurality of channels through the structure.

8. The catalyzing reactor system of claim 1, wherein the catalyst bed comprises:
   a structure having a three-dimensional lattice structure, the three-dimensional lattice structure including gaps both axially along an overall flow direction of the heated spray of the decomposable fluid and radially transverse to the overall flow direction; and the catalyst coating the structure.

9. The catalyzing reactor system of claim 1, wherein the catalyst bed comprises:
a structure defining a plurality of channels that twist circumferentially with respect to an overall flow direction of the heated spray of the decomposable fluid; and
the catalyst coating the structure.

10. The catalyzing reactor system of claim 1, wherein the catalyst bed comprises a structure defining a plurality of channels configured to receive flow of the spray of the decomposable fluid,
wherein the plurality of channels are oriented at least partially non-parallel to an overall flow direction of the flow from inputs of the plurality of channels to outputs of the plurality of channels, and
wherein the catalyst is exposed at an exterior of the structure.

11. The catalyzing reactor system of claim 1, wherein the catalyst bed comprises an additively-manufactured structure.

12. The catalyzing reactor system of claim 1, wherein the catalyst comprises a reactive metal.

13. The catalyzing reactor system of claim 1, wherein the injector and the heating element are configured such that the heated spray of the decomposable fluid is gaseous when the heated spray of the decomposable fluid interacts with the catalyst bed.

14. The catalyzing reactor system of claim 1, wherein a first gaseous decomposition product of the two or more gaseous decomposition products comprises oxygen gas.

15. The catalyzing reactor system of claim 1, wherein the solid fuel grain mass comprises a plurality of concentric ring-shaped layers of fuel grain material surrounding the port.

16. The catalyzing reactor system of claim 1, wherein the nozzle is configured to produce thrust by ejection of at least one of the two or more gaseous decomposition products.

17. The catalyzing reactor system of claim 1, comprising:
a coupling component configured to provide at least one of pressure or heat to a pressure system component using at least one of the two or more gaseous decomposition products.

18. The catalyzing reactor system of claim 17, wherein the coupling component comprises a heat exchanger that is arranged to thermally couple the pressure system component to the at least one of the two or more gaseous decomposition products.

19. The catalyzing reactor system of claim 17, wherein the coupling component comprises a second injector arranged to inject the at least one of the two or more gaseous decomposition products into the pressure system component.

20. The catalyzing reactor system of claim 19, comprising a gas separator configured to separate a first gaseous decomposition product of the two or more gaseous decomposition products from a second gaseous decomposition product of the two or more gaseous decomposition products and to direct the first gaseous decomposition product to the second injector.

21. The catalyzing reactor system of claim 20, wherein the first gaseous decomposition product comprises oxygen.

22. The catalyzing reactor system of claim 17, wherein the pressure system component comprises the tank, a valve, a fluid line, or a pressure regulator.

23. The catalyzing reactor system of claim 17, wherein the catalyst bed is a secondary catalyst bed, wherein an output of the secondary catalyst bed directs at least one of the two or more gaseous decomposition products into the coupling component, and wherein the catalyzing reactor system comprises a primary catalyst bed having a second output that directs at least one further gaseous decomposition product from the primary catalyst bed into another component distinct from the coupling component.

24. The catalyzing reactor system of claim 23, wherein the component into which the at least one further gaseous decomposition product from the primary catalyst bed is directed comprises the solid fuel grain mass, and
wherein the at least one further gaseous decomposition product comprises oxygen gas.

25. The catalyzing reactor system of claim 1, wherein the decomposable fluid comprises nitrous oxide.

26. The catalyzing reactor system of claim 1, wherein the heating element comprises a metal catalyst arranged to contact the spray of the decomposable fluid.

27. The catalyzing reactor system of claim 1, comprising a turbine arranged to receive at least one of the two or more gaseous decomposition products.

28. The catalyzing reactor system of claim 1, wherein the heating element comprises a resistive heater, a cartridge heater, or a glow plug.

29. The catalyzing reactor system of claim 1, wherein the heating element comprises a catalytic layer.

30. The catalyzing reactor system of claim 1, wherein the heating element is free of catalytic material.

31. The catalyzing reactor system of claim 1, wherein the chamber in which the heating element is disposed is separate from a chamber in which the catalyst bed is disposed.

32. A catalyzing reactor system comprising:
an inlet valve configured to fluidically couple a tank for storing a decomposable fluid to a reaction chamber;
a catalyst bed disposed in the reaction chamber and comprising a catalyst, the catalyst bed arranged such that spray of the decomposable fluid from the tank contacts the catalyst and the catalyst promotes decomposition of the spray of the decomposable fluid into two or more gaseous decomposition products;
a tank coupling component configured to provide at least one of pressure or heat to bulk fluid in the tank using at least one of the two or more gaseous decomposition products;
a solid fuel grain mass defining a port;
a nozzle arranged to direct the two or more gaseous decomposition products into the port; and
a flow path that fluidically couples the tank to the port and that bypasses the catalyst bed.

33. The catalyzing reactor system of claim 32, comprising a distribution plate configured to promote dispersion of the spray of the decomposable fluid before the spray of the decomposable fluid interacts with the catalyst bed.

34. The catalyzing reactor system of claim 32, wherein the catalyst bed comprises:
a structure having a three-dimensional lattice structure, the three-dimensional lattice structure including gaps both axially along an overall flow direction of the spray of the decomposable fluid and radially transverse to the overall flow direction; and
the catalyst coating the structure.

35. The catalyzing reactor system of claim 32, wherein the catalyst bed comprises:
a structure defining a plurality of channels that twist circumferentially with respect to an overall flow direction of the spray of the decomposable fluid; and
the catalyst coating the structure.

36. The catalyzing reactor system of claim 32, wherein the catalyst bed comprises a structure defining a plurality of channels configured to receive flow of the spray of the decomposable fluid,
  wherein the plurality of channels are oriented at least partially non-parallel to an overall flow direction of the flow from inputs of the plurality of channels to outputs of the plurality of channels, and
  wherein the catalyst is exposed at an exterior of the structure.

37. The catalyzing reactor system of claim 32, wherein the catalyst bed comprises an additively-manufactured structure.

38. The catalyzing reactor system of claim 32, wherein the tank coupling component comprises a heat exchanger configured to provide heat to the bulk fluid in the tank.

39. The catalyzing reactor system of claim 32, wherein the tank coupling component comprises an injector arranged to inject the at least one of the two or more gaseous decomposition products into the tank.

40. The catalyzing reactor system of claim 39, comprising a gas separator configured to separate a first gaseous decomposition product of the two or more gaseous decomposition products from a second gaseous decomposition product of the two or more gaseous decomposition products and to direct the first gaseous decomposition product to the injector.

41. The catalyzing reactor system of claim 40, wherein the first gaseous decomposition product comprises oxygen.

42. The catalyzing reactor system of claim 32, wherein the catalyst bed is a secondary catalyst bed, wherein an output of the secondary catalyst bed directs at least one of the two or more gaseous decomposition products into the tank coupling component, and wherein the catalyzing reactor system comprises a primary catalyst bed having a second output that directs at least one further gaseous decomposition product from the primary catalyst bed into another component distinct from the tank coupling component.

43. The catalyzing reactor system of claim 42, wherein the at least one further gaseous decomposition product comprises oxygen gas.

44. The catalyzing reactor system of claim 32, wherein the decomposable fluid comprises nitrous oxide.

45. A catalyzing reactor system comprising:
  an inlet valve configured to fluidically couple a tank for storing a decomposable fluid to a chamber;
  an injector arranged to receive the decomposable fluid from the inlet valve and inject a spray of the decomposable fluid through the chamber;
  a heating element disposed in the chamber and arranged to heat the spray of the decomposable fluid;
  a catalyst bed comprising a catalyst, the catalyst bed arranged such that heated spray of the decomposable fluid contacts the catalyst and the catalyst promotes decomposition of the heated spray of the decomposable fluid into two or more gaseous decomposition products;
  a coupling component configured to provide at least one of pressure or heat to a pressure system component using at least one of the two or more gaseous decomposition products, wherein the coupling component comprises a second injector arranged to inject the at least one of the two or more gaseous decomposition products into the pressure system component; and
  a gas separator configured to separate a first gaseous decomposition product of the two or more gaseous decomposition products from a second gaseous decomposition product of the two or more gaseous decomposition products and to direct the first gaseous decomposition product to the second injector.

46. The catalyzing reactor system of claim 45, wherein the first gaseous decomposition product comprises oxygen.

47. The catalyzing reactor system of claim 45, wherein the pressure system component comprises the tank, a valve, a fluid line, or a pressure regulator.

48. The catalyzing reactor system of claim 45, wherein the catalyst bed is a secondary catalyst bed, wherein an output of the secondary catalyst bed directs at least one of the two or more gaseous decomposition products into the coupling component, and wherein the catalyzing reactor system comprises a primary catalyst bed having a second output that directs at least one further gaseous decomposition product from the primary catalyst bed into another component distinct from the coupling component.

49. The catalyzing reactor system of claim 48, wherein the component into which the at least one further gaseous decomposition product from the primary catalyst bed is directed comprises a solid fuel grain mass configured to undergo combustion, and
  wherein the at least one further gaseous decomposition product comprises oxygen gas.

50. A catalyzing reactor system comprising:
  an inlet valve configured to fluidically couple a tank for storing a decomposable fluid to a chamber;
  an injector arranged to receive the decomposable fluid from the inlet valve and inject a spray of the decomposable fluid through the chamber;
  a heating element disposed in the chamber and arranged to heat the spray of the decomposable fluid;
  a secondary catalyst bed comprising a catalyst, the secondary catalyst bed arranged such that heated spray of the decomposable fluid contacts the catalyst and the catalyst promotes decomposition of the heated spray of the decomposable fluid into two or more gaseous decomposition products;
  a coupling component configured to provide at least one of pressure or heat to a pressure system component using at least one of the two or more gaseous decomposition products,
  wherein an output of the secondary catalyst bed directs the at least one of the two or more gaseous decomposition products into the coupling component; and
  a primary catalyst bed having a second output that directs at least one further gaseous decomposition product from the primary catalyst bed into another component distinct from the coupling component.

51. The catalyzing reactor system of claim 50, wherein the coupling component comprises a heat exchanger that is arranged to thermally couple the pressure system component to the at least one of the two or more gaseous decomposition products.

52. The catalyzing reactor system of claim 50, wherein the coupling component comprises a second injector arranged to inject the at least one of the two or more gaseous decomposition products into the pressure system component.

53. The catalyzing reactor system of claim 52, comprising a gas separator configured to separate a first gaseous decomposition product of the two or more gaseous decomposition products from a second gaseous decomposition product of the two or more gaseous decomposition products and to direct the first gaseous decomposition product to the second injector.

54. The catalyzing reactor system of claim 53, wherein the first gaseous decomposition product comprises oxygen.

55. The catalyzing reactor system of claim 50, wherein the pressure system component comprises the tank, a valve, a fluid line, or a pressure regulator.

56. The catalyzing reactor system of claim 50, wherein the component into which the at least one further gaseous decomposition product from the primary catalyst bed is directed comprises a solid fuel grain mass configured to undergo combustion, and
    wherein the at least one further gaseous decomposition product comprises oxygen gas.

\* \* \* \* \*